(12) United States Patent
Vohra et al.

(10) Patent No.: US 9,162,902 B2
(45) Date of Patent: Oct. 20, 2015

(54) REMOVAL OF AQUEOUS PHASE SELENITE AND SELENATE USING ARTIFICAL AND SOLAR RADIATION ENERGIZED PHOTOCATALYSIS

(71) Applicants: King Fahd University of Petroleum and Minerals, Dhahran (SA); King Abdulaziz City of Science and Technology, Riyadh (SA)

(72) Inventors: Muhammad Shariq Vohra, Dhahran (SA); Bashir Alhaji Labaran, Khobar (SA)

(73) Assignees: KING FHAD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

(21) Appl. No.: 14/172,370

(22) Filed: Feb. 4, 2014

(65) Prior Publication Data

US 2015/0218014 A1      Aug. 6, 2015

(51) Int. Cl.
*C02F 1/32* (2006.01)
*C02F 1/72* (2006.01)

(52) U.S. Cl.
CPC .. *C02F 1/32* (2013.01); *C02F 1/725* (2013.01)

(58) Field of Classification Search
USPC ............... 210/749, 206, 153, 748.01, 748.04, 210/748.05, 748.1, 748.14; 422/20, 22, 24, 422/186, 186.3
See application file for complete search history.

(56) References Cited

U.S. PATENT DOCUMENTS 5,730,884 A    3/1998  Kikuchi
2010/0025339 A1*  2/2010  Lundquist et al. ............ 210/749

OTHER PUBLICATIONS

Journal of Photochemistry and Photobiology, "Photocatalytic reduction of selenite and selenate using TiO2 photocatalyst" by: Vi Nu Hoai Nguyen p. 113-120. published Apr. 30, 2005.*
Suzuki T, et al., "Influence of speciation on the response from selenium to UV-photochemical vapor generation", 2012, (1 pages).
Sumiko Sanuki, et al., "Photocatalytic Reduction of Selenate and Selenite Solutions Using $TiO_2$ Powders", Feb. 1999, Metallurgical and Materials Transactions B, vol. 30B, (6 pages).

(Continued)

*Primary Examiner* — Walter D Griffin
*Assistant Examiner* — Cameron J Allen
(74) *Attorney, Agent, or Firm* — Oblon, McClelland, Maier & Neustadt, L.L.P.

(57) ABSTRACT

A method for the removal of aqueous phase selenite and selenate species using $TiO_2$ assisted photocatalysis employing the use of artificial light, or solar radiation, in conjunction with EDTA as a hole scavenger. Among the two processes, UV-lamp assisted photocatalysis has the highest efficiency comparatively followed by solar light assisted photocatalysis. $TiO_2$ mediated photocatalysis in conjunction with EDTA as an $h^+$ scavenging agent is an efficient technique for selenium ion removal.

14 Claims, 92 Drawing Sheets

(56) References Cited

OTHER PUBLICATIONS

Vi Nu Hoai Nguyen, et al., "Photocatalytic reduction of selenite and selenate using $TiO_2$ photocatalyst", Apr. 2005, Journal of Photochemistry and Photobiology A: Chemistry, vol. 171, Issue 2, (1 pages).

Thatt Yang Timothy Tan, "Photocatalytic Reduction of Selenate and Selenite: Water/Wastewater Treatment and the Formation of Nano-Selenium Compounds", Jul. 2003, The University of New South Wells, The School of Chemical Engineering and Industrial Chemistry, (201 pages).

* cited by examiner

FG. 4

REMOVAL OF AQUEOUS PHASE SELENITE AND SELENATE USING ARTIFICAL AND SOLAR RADIATION ENERGIZED PHOTOCATALYSIS

BACKGROUND OF THE INVENTION

1. Technical Field

The present invention relates to a method for using ethylenediaminetetraacetic acid (EDTA) and unmodified $TiO_2$ for the photocatalyic removal of selenium-containing materials from an aqueous solution in which EDTA is used as a hole scavenger and the method includes the use of artificial light, or solar radiation, photocatalysis for the removal of aqueous phase selenite and selenate species.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Enhanced industrial practices such as mining, fossil fuel extraction/use, etc., mobilize an otherwise bound selenium species into a natural environment. For example, erosion of soils due to agricultural practices leads to increased selenium in ground and surface water (D. Wang, G. Alfthan, A. Aro, P. Lahermo, and P. Vaananen, *The impact of selenium fertilisation on the distribution of selenium in rivers in Finland*, Agric., Ecosys. Environ. 50 (1994), pp. 133-149-incorporated herein by reference in its entirety) whereas leaching from mining sites' soils/rocks also releases selenium species into natural waterways (J. Högberg and J. Alexander, *Chapter 38—Selenium*, in *Handbook on the Toxicology of Metals*, Gunnar F. Nordberg, Bruce A. Fowler, Monica Nordberg and Lars Friberg, Third Edition, Academic Press, Burlington, 2007, pp. 783-807; ATSDR, *Toxicological profile for selenium*, ATSDR, 2003; P. Zhang and D. L Sparks, *Kinetics of selenate and selenite adsorption/desorption at the goethite/water interface,* Environmental Science & Technology. 24 (1990), pp. 1848-1856—each incorporated herein by reference in its entirety). Furthermore, effluents from industries such as oil refineries & power plants and use of selenium based chemicals in several industrial processes, also discharge selenium into the natural environment. Though selenium is an essential micronutrient, a relatively thin margin exists between selenium amounts resulting in deficiency and toxicity and a significant exposure causes serious ecological concerns (U. Tinggi, *Essentiality and Toxicity of Selenium and its Status in Australia: a Review*, Toxic. Let. 137 (2003), pp. 103-110; J. O. Hall, *Chapter 34—Selenium*, in Veterinary Toxicology, C. G. Ramesh, Academic Press, Oxford, 2007, pp. 453-460; U. Tinggi, *Selenium: its role as antioxidant in human health*, Environ Health Prey. Med. 13 (2008), pp. 102-108; R. A. Sunde, Selenium", in: *Present Knowledge in Nutrition, Bowman, B. A. and Russell,* 9th edition, R. M., ILSI Press, Washington, D.C., 2006, pp. 480-497; A. D. Lemly, *Ecosystem recovery following selenium contamination in a freshwater reservoir,* Ecotox. Environ. Safi 36 (1997), pp. 275-281; A. D. Lemly, *Aquatic Hazard of Selenium pollution from Mountaintop Removal Coal Mining*, Appalachian Cent. For the Econ. & the Environ. And the Sierra Club, 2009. Available at http://www.filonverde.org/images/informe_selenio_en_minas_a_cielo_abierto.pdf; R. L. J. P. Skorupa and L. A. Peltz, *Areas Susceptible to Irrigation-Induced Selenium Contamination of Water and Biota in the Western United States*, U.S. Dept. of the Interior, U.S. Geological Survey 1999. Available at http://pubs.usgs.gov/circ/circ1180/—each incorporated herein by reference in its entirety). The respective selenium drinking water and wastewater discharge standards are very stringent.

Typically selenium occurs in four natural oxidation states: i.e., elemental selenium (0), selenide (−2), selenite (+4) and selenate (+6) (F. Seby, M. Potin-Gautier, E. Giffaut, G. Borge and O. F. X. Donard, *A Critical Review of Thermodynamic Data for Selenium Species at* 25° C., Chem. Geo. 171 (2001), pp. 173-194—incorporated herein by reference in its entirety). Out of these selenite and selenate (inorganic oxyanion species) are the most dominant in the aqueous phase because of their high solubility and mobility. Selenate is most dominant because of its low adsorption on to naturally occurring surfaces and is not well retarded in the natural environment while selenite's mobility is mainly governed by adsorption/desorption processes occurring on to various solid surfaces such as metal oxyhydroxides (D. G. Barceloux, *Selenium*, J. Toxicol Clin Toxicol. 37 (1999): 145-172—incorporated herein by reference in its entirety). Several technologies including adsorption, reverse osmosis, nano-filtration, evaporation ponds, ferrous hydroxide treatment, biological processes, and constructed wetlands have been used for the above mentioned selenium oxyanions removal, with each of these methods having its own advantages and disadvantages (L. Twidwell, J. McCloskey, H. Joyce, E. Dahlgren, and A. Hadden, *Removal of selenium oxyanions from mine waters utilizing elemental iron and galvanically coupled metals*, In *Innovations in Natural ResourceProcessing*—Proceedings of the Jan. D. Miller Symposium; SSEMP, *Draft technologies and management techniques to limit exposures to selenium*, available at http://www.water.ca.gov/saltonsea/historicalcalendar/wg/03.04.2005/SeleniumMgmtTech.pdf—each incorporated herein by reference in its entirety). Titanium dioxide ($TiO_2$) assisted photocatalytic degradation (PCD) which is an advanced treatment technology has also been widely studied for the removal of both organic and inorganic pollutants from contaminated water bodies (A. Fujishima, T. N. Rao and D. A. Tryk, *Titanium dioxide photocatalysis*, J. Photochem. Photobio. C: Photochem. Rev. 1 (2000): pp. 1-21; K. Hashimoto, H. Irie, and A. Fujishima, *$TiO_2$ photocatalysis: a historical overview and future prospects*, AAPS Bulletin. 17 (2007), pp. 8269-8285—each incorporated herein by reference in its entirety). When feasible, the PCD process offers several advantages including minimum waste by-products, low operational temperature, use of a non-toxic and reusable photocatalyst, no specific chemical requirement, and possible use of sun light as an energy source.

Furthermore the Kingdom of Saudi Arabia (KSA) is fortunate to have an abundant year round supply of solar energy and KSA is one of the only few regions in world that receive the highest amount of solar radiation (World Solar Commission, *World Solar Programme* 1996-2005: *Africa (ASP). Mechanisms of Implementation (An Outline)*, Prepared by the Secretariat of the World Solar Commission, (2001)—incorporated herein by reference in its entirety). Among many other uses, this virtually unlimited source of energy can be utilized for environmental cleanup as well. Use of solar radiation for several environmental applications including advanced wastewater treatment have also been reported for other locations (J. Blanco, S. Malato, P. Fernandez-Ibañez, D. Alarcon, W. Gernjak, and M. I. Maldonado, *Review of easible solar energy applications to water processes*, Renewable and Sustainable Energy Reviews 13 (2009), pp. 1437-1445; Julian Blanco-Galvez, Pilar Fernández-Ibáñez and Sixto Malato-Rodríguez, *Solar photocatalytic detoxification and*

*disinfection of water: recent overview*, J. Sol. Energy Eng. 129 (2006), pp. 4-15; Antonio E. Jimenez, Claudio A. Estrada, Alma D. Cota, and Alberto Román, *Photocatalytic degradation of DBSNa using solar energy*, Solar Energy Materials and Solar Cells 60 (2000), pp. 85-95; C. Karunakaran and R. Dhanalakshmi, *Semiconductor-catalyzed degradation of phenols with sunlight*, Solar Energy Materials and Solar Cells 92 (2008), pp. 1315-1321; S. Malato. P. Fernández-Ibáñez, M. I. Maldonado, J. Blanco, and W. Gernjak, *Decontamination and disinfection of water by solar photocatalysis: Recent overview and trends*, Catalysis Today 147 (2009), pp. 1-59; B. Neppolian, H. C. Choi, S. Sakthivel, B. Arabindoo, and V. Murugesan, *Solar light induced and TiO2 assisted degradation of textile dye reactive blue 4*, Chemosphere 46 (2002), pp. 1173-1181; S. S. Priya, S. Shanmuga M. Premalatha, and N. Anantharaman, *Solar Photocatalytic Treatment of Phenolic Wastewater Potential, Challenges and Opportunites*. Journal of Engineering and Applied Sciences, 3 (2008). pp. 36-41; M. Saquib, M. Abu Tariq, M. M. Hague, and M. Muneer, *Photocatalytic degradation of disperse blue 1 using UV/TiO$_2$/H$_2$O$_2$ process*, Journal of Environmental Management 88 (2008), pp. 300-306; C. Sichel, P. Fernández-Ibañez, M. de Cara, and J. Tello, *Lethal synergy of solar UV-radiation and H$_2$O$_2$ on wild Fusarium solani spores in distilled and natural well water*," Water Research 43 (2009), pp. 1841-1850—each incorporated herein by reference in its entirety). As mentioned above, one such advanced oxidation process (AOP) that can be used to treat industrial wastewaters includes solar radiation energized titanium dioxide (TiO$_2$) assisted photocatalytic degradation process or TiO$_2$-Photocatalysis (SPCD).

For example the SPCD technology has been widely studied in many regions around the globe (Detlef Bahnemann, *Photocatalytic water treatment: solar energy applications*, Solar Energy 77 (2004), pp. 445-459; Pilar Fernandez-Ibañez, Sixto Malato, and Octav Enea, *Photoelectrochemical reactors for the solar decontamination of water*, Catalysis Today 54 (1999), pp. 329-339; S. Malato, J. Blanco, C. Richter, B. Braun, and M. I. Maldonado, *Enhancement of the rate of solar photocatalytic mineralization of organic pollutants by inorganic oxidizing species*, Applied Catalysis B: Environmental 17 (1998), pp. 347-356; S. Malato, J. Blanco, C. Richter, B. Milow, and M. I. Maldonado, *Solar photocatalytic mineralization of commercial pesticides: Methamidophos*, Chemosphere 38 (1999), pp. 1145-1156; S. Malato, J. Caceres, A. Agüera, M. Mezcua, D. Hernando, J. Vial, and A. R. Fernandez-Alba, *Degradation of Imidacloprid in Water by Photo-Fenton and TiO2 Photocatalysis at a Solar Pilot Plant: A Comparative Study*, Environmental Science & Technology 35 (2001), pp. 4359-4366; S. Malato, J. Blanco, A. Vidal, P. Fernandez, J. Caceres, P. Trincado, J. C. Oliveira, and M. Vincent, *New large solar photocatalytic plant: set-up and preliminary results*, Chemosphere 47 (2002), pp. 235-240; M. Mehos, C. Turchi, J. Pacheco, A. J. Boegel, T. Merrill, and R. Stanley, *Pilot-scale study of the solar detoxification of VOC-contaminated groundwater*, Technical Report submitted at American Institute of Chemical Engineers (AIChE) summer national meeting, Minneapolis, Minn. (United States) (1992); J. E. Pacheco and C. E. Tyner, Enhancement of processes for solar photocatalytic detoxification of water, ASME international solar energy conference, Miami, Fla. (USA) (1990); W. Scott Rader, Ljiljana Solujic, Emil B. Milosavljevic, James L. Hendrix, and John H. Nelson, *Sunlight-induced photochemistry of aqueous solutions of hexacyanoferrate(II) and -(III) ions*, Environmental Science & Technology 27 (1993), pp. 1875-1879; Didier Robert and Sixto Malato, *Solar photocatalysis: a clean process for water detoxification*, Science of The Total Environment 291 (2002), pp. 85-97; Manuel Romero, Julián Blanco, Benigno Sanchez, Alfonso Vidal, Malato Sixto, Ana I. Cardona, and Elisa Garcia, *Solar photocatalytic degradation of water and air pollutants: challenges and perspectives*, Solar Energy 66 (1999), pp. 169-182; Julian Blanco Galvez and Sixto Malato Rodriguez, *Solar detoxification in Renewable energy series*, edited by Julian Blanco Galvez and Sixto Malato Rodriguez, UNESCO (2003); Susana Flores Villanueva and Susana Silva Martínez, *TiO2-assisted degradation of acid orange 7 textile dye under solar light*, Solar Energy Materials and Solar Cells 91 (2007), pp. 1492-1495; Archis A. Yawalkar, Dhananjay S. Bhatkhande, Vishwas G. Pangarkar, and Anthony ACM Beenackers, *Solar-assisted photochemical and photocatalytic degradation of phenol*, Journal of Chemical Technology & Biotechnology 76 (2001), pp. 363-370—each incorporated herein by reference in its entirety). The SPCD technology incorporates use of the catalyst TiO$_2$ and solar UV light to degrade the target pollutant. Use of solar radiation instead of artificial UV light lamps during the SPCD advanced oxidation process is expected to be efficient and economical in regions that are rich in solar energy such as KSA. Hence the abundant solar energy natural resource of Kingdom of Saudi Arabia offers an opportunity to utilize it for respective environmental applications. Considering the concerns related with selenium pollution an appropriate treatment of respective streams is required to mitigate those adverse concerns and also to meet the selenium discharge limits.

The essential or toxic character of selenium depends on its concentration in food, water and other living organisms, as well as its chemical speciation and distribution in soils, wetlands and aqueous ecosystems. Atmospheric deposition, surface runoff, and subsurface drainage account for selenium contamination in surface water. Use of fossil fuels also introduces selenium species into natural environment.

When present, Se (IV), selenite and Se (VI), selenate are typical selenium species in respective water bodies.

Selenium can occur with and replaces sulfur because of the similarities in their chemical properties. Selenium combines with metals and many nonmetals directly or in aqueous solution. (Ana Benedicto, Tiziana Missana, and Claude Degueldre, *Predictions of TiO$_2$ driven migration of Se(IV) based on an integrated study of TiO$_2$ colloid stability and Se(IV) surface adsorption*, Science of the Total Environment 449 (2013), pp. 214-222—incorporated herein by reference in its entirety).

In the 13$^{th}$ century, Marco Polo noticed the presence of certain poisonous plants that had serious effects on the beasts that consume it in the province of Shanxi. This description made before the discovery of selenium, is probably a symptom of its toxicity (Helina Hartikainen, *Biogeochemistry of selenium and its impact on food chain quality and human health*, J. of Trace Elements in Medicine and Biology 18 (2005) pp. 309-318—incorporated herein by reference in its entirety).

Selenium poisoning clinical signs include hair loss, fingernails changes and brittleness, gastrointestinal disturbances, skin rash, garlic breath, and abnormal functioning of the nervous system (Miguel Navarro-Alarcon and Carmen Cabrera-Vique, *Selenium in food and the human body: A review*, Sc. of the Total Env. 400 (2008) pp. 115-141—incorporated herein by reference in its entirety).

The health effects are recorded on humans as a result of high selenium status (M. P. Rayman, *Selenium and human health*, The Lancet 379 (2000) pp. 1256-1268—incorporated herein by reference in its entirety).

Maximum contaminant levels for selenium have been made by different authorities based on the extent of the results of some field studies. MCLs for WHO, Health Canada and Australia are set at 0.01 mg/L while USEPA currently has MCLs of 0.05 mg/L (Health Canada, *Environmental and workplace health: Selenium*, available at http://www.hc-sc.gc.ca/ewh-semt/pubs/water-eau/selenium/index-eng.php; WHO, *Selenium in drinking-water*, World Health Organization (2011); NPI, *Selenium & compounds: Health effects*, Commonwealth of Australia—each incorporated herein by reference in its entirety). However, a more stringent freshwater discharge standard of 5 µg/L is set up by EPA (USEPA, *National recommended water quality criteria*, (1995)—incorporated herein by reference in its entirety).

PCD Process $TiO_2$ used in the photocatalytic degradation (PCD) process is an n-type semiconductor and both the anatase and rutile crystal forms of $TiO_2$ have been widely used in the PCD studies. Furthermore $TiO_2$ possesses a void energy region also known as band gap (BG) between its valence band (VB) and conduction band (CB), extending from the top of the electronfilled VB to the bottom of the vacant CB. Thus when a $TiO_2$ particle is exposed to a UV light source with energy hv equivalent to or higher than the bandgap energy (BGE) the VB electrons are transferred to CB thus creating an electron-hole pair ($e^-/h^+$) as given in reaction 2-1:

$$TiO_2 + h^v \rightarrow e^- + h^+ \quad (2\text{-}1)$$

$e^-$-$h^+$ recombination can occur in the bulk and/or on the surface (Equation 2-2). When the $h^+$ and $e^-$ are successfully transferred to the $TiO_2$ surface, the $h^+$ can oxidize an electron donor such as an organic compound (Equation 2-3) while the $e^-$ can reduce an electron acceptor e.g., selenite (Equation 2-4) and selenate (Equation 2-5).

$$e^- + h^+ \rightarrow heat \quad (2\text{-}2)$$

$$\text{organic compound} + h^+ \rightarrow \text{oxidized products} \quad (2\text{-}3)$$

$$SeO_3^{2-} + 6H^+ + 4e^- \leftrightarrow Se^0 + 3H_2O \quad (2\text{-}4)$$

$$SeO_4^{2-} + 8H^+ + 6e^- \leftrightarrow Se^0 + 4H_2O \quad (2\text{-}5)$$

Furthermore reactions 2-6 and 2-7 are also typically used to represent the naked-$TiO_2$ surface in contact with the water molecules (W. Stumm, *Aquatic Surface Chemistry: Chemical Processes at the Particle-Water Interface*, Wiley, (1987)—incorporated herein by reference in its entirety):

$$Ti-OH_2^+ \leftrightarrow Ti-OH + H^+ \quad (2\text{-}6)$$

$$Ti-OH \leftrightarrow Ti-O^- + H \quad (2\text{-}7)$$

The $h^+$ species produced in reaction 2-1 is electron deficient and hence reacts with an adsorbed hydroxyl molecule $OH^-$ on the $TiO_2$ surface to produce an OH. radical (Reaction 2-8):

$$Ti-OH^- + h^+ \rightarrow Ti-OH \quad (2\text{-}8)$$

The OH radicals are powerful and non-selective oxidants that can typically simultaneously remove both organic and inorganic pollutants from the concerned wastewaters. However direct oxidation of organic compounds by holes/$h^+$ has been reported as well. Furthermore the electrons/$e^-$ produced in Equation 2-1 could be consumed by a suitable electron acceptor such as $O_2$ or a metal species. In case of selenite or selenate, the e species could possibly be utilized for their reduction and consequent removal from the aqueous phase (Equations 2-4 and 2-5).

An earlier work on $TiO_2$ photocatalytic reduction of selenium oxyanions was carried out by E. Kikuchi (E. Kikuchi, S. Itou, M. Kobayasi and H. Sakamoto, *Reduction and removal of selenate ion by TiO2 photo-catalyst*, J. NIRE. 6 (1997), pp. 173-177—incorporated herein by reference in its entirety). Since then these systems have been examined by several other groups (S. Sanuki, T. Kojima, K. Arai, S. Nagaoka and H. Majima, *photocatalytic reduction of selenate and selenite solutions using TiO2 powders*, Met. Mat. Trans. B. 30 (1999), pp. 15-20; S. Sanuki, K. Shako, S. Nagaoka and H. Majima, *Photocatalytic reduction of Se ions using suspended anatase powders*, Mat. Trans., JIM. 41 (2000), pp. 799-805; T. Tan, D. Beydoun and R. Amal, *Effect of organic holes scavengers on the photocatalytic reduction of selenium anions*, J. Photochem. Photobio. A: Chem. 159 (2003), pp. 273-280—each incorporated herein by reference in its entirety). Many of these studies have also investigated the role of hole ($h^+$) scavengers such as formic acid during $TiO_2$ assisted photocatalytic reduction of selenite and selenate and report significant removal of selenium contamination from the aqueous phase (V. N. H. Nguyen, R. Amal and D. Beydoun, *Photocatalytic reduction of selenium ions using different $TiO_2$ photocatalysts*, Chem. Eng. Sci. 60 (2005), pp. 5759-5769; V. N. H. Nguyen, D. Beydoun and R. Amal, *Photocatalytic reduction of selenite and selenate using $TiO_2$ photocatalysts*, Journal of Photochem. and Photobio. A: Chem. 171 (2005), pp. 113-120—each incorporated herein by reference in its entirety). Recently Aman et al. (N. Aman, T. Mishra, J. Hait and R. K. Jana, *Simultaneous photoreductive removal of copper (II) and selenium (IV) under visible light over spherical binary oxide photocatalyst*, J. Haz. Mater. 186 (2011), pp. 360-366—incorporated herein by reference in its entirety) also reported using a modified Ti—Zr based photocatalyst and EDTA (as a hole scavenger) for selenite/selenate removal from the aqueous phase. Nevertheless the role of EDTA as a hole scavenger for the removal of respective selenium species using unmodified $TiO_2$ photocatalysis, has not been investigated. Aman et al. report on simultaneous photo-reductive removal of copper (II) and selenium (IV) using Ti, Ti—Zr, and Ti—Si binary oxide photocatalysts and visible light under a varying set of conditions including single and mixed copper and selenium systems. The prepared catalysts had high specific surface area and were mesoporous. TiZr-10 was noted to be the best photocatalyst. Also pH 3 was noted to be the optimum and yielded highest photocatalytic selenite reduction in a mixed solution. Out of many hole scavengers tested, formic acid and ethylenediaminetetraacetic acid (EDTA) were best for the reduction of selenium oxyanions. The $h^+$ species produced in Equation 2-1 are consumed by the $h^+$ scavengers, resulting in reduced $e^-/h^+$ recombination (Equation 2-2) and thus leaving more $e^-$ species for reduction of selenite (analogous to Equation 2-4). Furthermore for single pollutant system, formic acid yielded better results for Se(IV) reduction whereas EDTA was noted to be better for Cu(II) reduction. However for mixed systems, both formic acid and EDTA showed better metal reduction results and the copper selenide was noted to be deposited at the catalyst surface. Nguyen et al. noted that in the presence of formic acid as a hole scavenger both selenite and selenate were photoreduced to Se(0) in illuminated $TiO_2$ suspensions. Findings from the UV-Vis reflectance indicated that compared to pure $TiO_2$ the Se/$TiO_2$ sample had a red-shift; an additional absorbance peak at approx. 680 nm was assigned to Se(0). The elemental selenium species accumulated on the $TiO_2$ particles either in a particulate or film form. It was proposed that the formation of Se(0) particles was due to a chemical reaction between Se(IV) and $Se^{2-}$ whereas a direct reduction of Se(IV) by the conduction band electrons ($TiO_2$) resulted in the formation of a Se(0) film. The $Se^{2-}$ species was suggested to result either from photoreduction of Se(0) or because of reduction of Se(IV). Shi et al. who investigated selenite sorption on $TiO_2$ indicated that selenite sorption is a function of pH and its kinetics can be given as a pseudo-second-order model (K. Shi, X. Wang, Z. Guo, S. Wang, and W. Wu, Se(IV) sorption on $TiO_2$: Sorption kinetics and surface complexation modeling, Colloids and Surf. A: Physicochem. and Eng. Asp. 349 (2009), pp. 90-95—incorporated herein by reference in its entirety). The authors also employed the constant capacitance model to predict selenite sorption on to $TiO_2$. Tan et al. also investigated the reduction of selenium oxyanions (selenite and selenate) to elemental selenium using $TiO_2$ assisted photocatalysis. The authors employed several hole scavenging agents including acetic acid, methanol, ethanol, salicylic acid, formic acid, and sucrose. Significant reduction of selenium oxyanions was possible using ethanol, formic acid, and methanol, with following order: formic acid >methanol >ethanol. This high capability of formic acid to reduce selenium oxyanions was explained based on its effective mineralization, formation reducing radicals, and adsorption of both the selenium species and formic acid onto $TiO_2$. Insignificant adsorption of ethanol and methanol was explained based on competitive selenium species adsorption on to the $TiO_2$ surface, resulting in reduced role of hole scavenger ethanol and methanol resulting in their reduced efficiency. For the formic acid case the optimum pH for selenium oxyanions photoreduction was 3.5-4. For methanol and ethanol the optimum pH value was 2.2.

Tan et al. investigated the PCD initiated reduction of selenate using $TiO_2$ and Ag-loaded $TiO_2$ and formic acid; selenate was successfully reduced to elemental selenium species employing the said photocatalysts and hole scavenger. The formation of $Se^{2-}$ followed $H_2Se$ formation using pure $TiO_2$ whereas using Ag-loaded $TiO_2$ photocatalyst $H_2Se$ and selenate reduction were noted to occur in parallel. Also pH 3.5 was noted to be optimum for reduction of selenate using 0.5% Ag loading. This high efficiency was explained based on electronic changes from $TiO_2$—Ag—Se interaction and decreased $e^-/h^+$ recombination. In another study, Tan et al. report that the adsorption of formate and selenate onto $TiO_2$ surface is a prerequisite for selenate reduction to elemental selenium which could further be reduced to $H_2Se$ (after selenate reduction to elemental form) (T. T. Y. Tan, and D. Beydoun, *Photocatalytic reduction of Se(VI) in aqueous solutions in UV/TiO2 system: Importance of optimum ratio of reactants on $TiO_2$ surface*, J. Mol. Cat. A: Chem. 202 (2003), pp. 73-85—incorporated herein by reference in its entirety). The authors also report for optimum selenate reduction, a 3:1 formate:selenate ratio (on to $TiO_2$ surface). This ratio could be maintained by controlling factors such as concentration of respective species and the aqueous phase pH. Also the noted 3:1 of formate:selenate ratio (on to $TiO_2$ surface) strongly co-related with the stoichiometric ratio of 3 moles of formic acid to 1 mole of selenate for effective reduction. Tan et al. described selenate reduction rates in presence of formic acid employing Langmuir-Hinshelwood competitive adsorption models for selenate and formate ions onto $TiO_2$ surface (T. T. Y. Tan, and D. Beydoun, *Photocatalytic reduction of Se(VI) in aqueous solutions in UV/TiO2 system: Kinetic modeling and reaction mechanism*, J. Phy. Chem. B. 107 (2003), pp. 4296-4303—incorporated herein by reference in its entirety). The respective models allowed for the modeling of formic acid and selenate adsorption on to $TiO_2$. Furthermore a 3:1 formate:selenate ratio (on to $TiO_2$ surface) was also obtained using the kinetic modeling exercise.

Zhang et al. also investigated sorption of selenium species on to $TiO_2$ (L. Zhang, N. Liu, L. Yang, and Q. Lin, *Sorption behavior of nano-$TiO_2$ for the removal of selenium ions from aqueous solution*, J. Haz. Mater. 170 (2009), pp. 1197-1203—incorporated herein by reference in its entirety). The maximum sorption was noted at pH 2-6. Also the sorption reached equilibrium within 5 min. The adsorption could be described both by boundary layer diffusion and intra-particle diffusion. Furthermore the adsorption kinetics results showed a second order kinetic model and the Langmuir adsorption isotherm was useful in modeling the respective findings.

Though many solar photocatalytic degradation (SPCD) studies have been reported on several aqueous phase pollution control issues, removal of selenite and selenate using SPCD process (using naked $TiO_2$ and EDTA) has not been investigated. Augugliaro et al. studied cyanide degradation employing the $TiO_2$ assisted photocatalysis using sun light as the energy source (V. Augugliaro, J. Blanco Gálvez, J. Cáceres Vázquez, E. Garcia López, V. Loddo, M. J. López Muñoz, S. Malato Rodriguez, G. Marci, L. Palmisano, M. Schiavello, and J. Soria Ruiz, *Photocatalytic oxidation of cyanide in aqueous $TiO_2$ suspensions irradiated by sunlight in mild and strong oxidant conditions*, Catalysis Today 54 (199), pp. 245-253—incorporated herein by reference in its entirety). The authors report successful degradation of cyanide with nitrite, nitrate, cyanate, and carbonate as the reaction end products. In mixed systems containing both cyanide and phenol, the overall cyanide degradation efficiency decreased. Banu et al. investigated treatment of dairy wastewater by using a hybrid of biological and SPCD technologies (J. Rajesh Banu, S. Anandan, S. Kaliappan, and Ick-Tae Yeom, *Treatment of dairy wastewater using anaerobic and solar photocatalytic methods*, Solar Energy 82 (2008), pp. 812-819—incorporated herein by reference in its entirety). Using only biological treatment the authors noted about 84% reduction in the chemical oxygen demand (COD) value of respective wastewater. However an integration of biological and solar photocatalytic degradation processes caused 95% COD removal from the dairy wastewater. Choi et al. who studied degradation of several aqueous phase polychlorinated dibenzo-p-dioxins (PCDDs), report good removal of octa-chlorinated dibenzo-p-dioxin using the SPCD process (Wonyong Choi, Soo Jin Hong, Yoon-Seok Chang, and Youngmin Cho, *Photocatalytic Degradation of Polychlorinated Dibenzo-p-dioxins on TiO2 Film under UV or Solar Light Irradiation*, Environmental Science & Technology 34 (2000), pp. 48104815—incorporated herein by reference in its entirety). Furthermore the SPCD process was noted to be as effective as a 200 W mercury lamp for the respective application.

Cho et al. studied ex-situ treatment of petroleum contaminated groundwater at a gas station site using the solar radiation energized PCD process (Il-Hyoung Cho, Lee-Hyung Kim, Kyung-Duk Zoh, Jae-Hong Park, and Hyun-Yong Kim, *Solar photocatalytic degradation of groundwater contaminated with petroleum hydrocarbons*, Environmental Progress 25 (2006), pp. 99-109—incorporated herein by reference in its entirety). The authors report more than 70% reduction in the total petroleum hydrocarbons and BTEX compounds (benzene, toluene, ethylbenzene, xylene). Curco et al. report notable phenol removal using the SPCD technology that also showed linear dependence on the square root of photonic flow entering the wastewater treatment reactor (D. Curcó, S. Malato, J. Blanco, J. Giménez, and P. Marco, *Photocatalytic degradation of phenol: Comparison between pilot-plant-scale and laboratory results*," Solar Energy 56 (1996), pp. 387-400—incorporated herein by reference in its entirety).

Furthermore the phenol degradation was noted to be of first order with respect to its concentration.

Giménez et al. report similar observations for aqueous phase phenol removal using the SPCD process (Jaime Giménez, David Curcó, and Pilar Marco, *Reactor modelling in the photocatalytic oxidation of wastewater*, Water Science and Technology 35 (1997), pp. 207-213—incorporated herein by reference in its entirety).

Dias and Azevedo also report SPCD initiated removal of three commercially used acid dyes from the aqueous phase (M. G. Dias and E. B. Azevedo, *Photocatalytic Decolorization of Commercial Acid Dyes using Solar Irradiation*, Water Air Soil Pollut. 204 (2009), pp. 79-87—incorporated herein by reference in its entirety). Though direct photolysis of respective wastewater sample was effective only for one pollutant, the use of $TiO_2$ mediated solar PCD technology caused removal of all dyes with acceptable reaction rates. The reaction rates for the three studied dyes were in the following order: Acid Red 51>Acid Yellow 23>Acid Blue 9. More than 99% mineralization was also noted within 120 min of reaction time.

Huang report notable silver ions removal from the aqueous phase using the SPCD process (Min Huang, Erwin Tso, Abhaya K. Datye, Michael R. Prairie, and Bertha M. Stange, *Removal of Silver in Photographic Processing Waste by TiO2-Based Photocatalysis*, Environmental Science & Technology 30 (1996), pp. 3084-3088—incorporated herein by reference in its entirety).

Jiménez et al. noted about 94% removal of a widely used surfactant, i.e., sodium dodecylbenzene sulfonate (DBSNa), using the solar PCD process. The use of an additional oxidant, i.e., $H_2O_2$, during the PCD process, caused complete degradation of DBSNa.

Kumara et al. also report complete removal of phenol and methyl violet from aqueous phase using the solar irradiated PCD process (G. R. R. A. Kumara, F. M. Sultanbawa, V. P. S. Perera, I. R. M. Kottegoda, and K. Tennakone, *Continuous flow photochemical reactor for solar decontamination of water using immobilized $TiO_2$*," Solar Energy Materials and Solar Cells 58 (1999), pp. 167-171—incorporated herein by reference in its entirety). However phenol degradation was noted to be faster than methyl violet. The authors also report complete removal of reaction intermediates as well.

Kuo and Ho investigated solar PCD of methylene blue contaiminated water (W. S. Kuo and P. H. Ho, *Solar photocatalytic decolorization of methylene blue in water*," Chemosphere 45 (2001), pp. 77-83—incorporated herein by reference in its entirety). The authors report that employing solar radiation (in the absence of $TiO_2$) only up to 50% color removal transpired. Near complete color removal occurred with the addition of $TiO_2$ to the same reactor system. The de-colorization efficiency was higher (near twice) using solar radiation than the artificial UV light source. Such a phenomenon was ascribed to higher excitation of target dye by the visible wave length portion of solar light, which was lower in the artificial UV light source.

Malato et al. report significant increase in solar initiated PCD of pentachlorophenol in presence of peroxydisulphate. Malato et al. studied large scale solar photocatalytic degradation reactors for the degradation of several aqueous phase pesticides. The authors report significant increase in the degradation and mineralization of target pollutants in the presence of peroxydisulphate. This modification is of great practical significance as higher solar PCD reaction rate using peroxydisulphate means an overall smaller reactor size and in turn reduced overall footprint requirements for real life solar PCD applications. Malato et al. noted successful removal of imidacloprid (which is a widely used insecticide in the agricultural areas of Mediterranean region) using solar PCD. The authors report about 95% substrate and TOC removal within 450 min of reaction time. Oxalate, formate and acetate were reported to be the intermediates. Malato et al. who investigated use of a pilot scale solar assisted photocatalysis for the destruction of aqueous phase cyanide noted significant target pollutant removal. Removal of high initial cyanide concentration (1000 mg/L) was also stated to be degraded completely using the solar PCD system. It was suggested that complete mineralization of cyanide would transpire with end product nitrates containing most N-initial.

Marques et al. noted successful treatment of aqueous phase atrazine and also of an olive oil industry's wastewater using the solar PCD process in the presence of sodium persulfate (P. A. S. S. Marques, M. F. Rosa, F. Mendes, M. Collares Pereira, J. Blanco, and S. Malato, *Wastewater detoxification of organic and inorganic toxic compounds with solar collectors*, Desalination 108 (1997), pp. 213-220—incorporated herein by reference in its entirety). Significant total organic carbon removal was also observed indicating mineralization of the said waste streams and confirming that no possible toxic reaction intermediates are left behind. Nagaveni et al. also report significant phenol removal from the aqueous phase using sunlight energized $TiO_2$ photocatalysis process (K. Nagaveni, G. Sivalingam, M. S. Hegde, and Giridhar Madras, *Photocatalytic Degradation of Organic Compounds over Combustion-Synthesized Nano-$TiO_2$*, Environmental Science & Technology 38 (2004), pp. 1600-1604—incorporated herein by reference in its entirety). Use of specific combustion $TiO_2$ that was prepared using a special technique yielded catalyst that was very effective in removing phenol from the aqueous phase, and the results were comparable for both artificial and sun radiation experiments.

Neppolian et al. studied SPCD initiated removal of aqueous phase textile dye reactive blue 4. Using solar energy and $TiO_2$, the target pollutant was mineralized within 24 h. The results showed that the dye molecules were completely degraded to $CO_2$, $SO_2$, $NO_3^-$, $NH_4^+$, and $H_2O$. Furthermore, quick removal of reaction intermediates was observed in the presence of hydrogen peroxide during the PCD process.

Pacheco et al. investigated the wastewater flow rates (for the SPCD reactor) that yield about 95% trichloroethylene removal for different locations across the U.S (J. Pacheco, M. Prairie, and L. Yellowhorse, *Photocatalytic destruction of chlorinated solvents with solar energy* (1990)—incorporated herein by reference in its entirety). It was noted that states such as New Mexico and Texas that receive higher amount of solar energy yield highest flow rates. Furthermore at any given location significantly higher wastewater flow was processed during the months of June and July as compared to the yearly-average flow rates. The study also showed highest trichloroethylene removal during noon time for different seasons (because of higher light intensity received at that time). These trends are consistent with the artificial UV light PCD findings.

For example Wei and Wan who studied the PCD of phenol report much lower phenol removal at low light intensities (Io) whereas with an increase in the light intensity from 30% to 77% (of maximum light intensity) a sharp increase in phenol removal was observed (Tsong Yang Wei and Chi Chao Wan, *Heterogeneous photocatalytic oxidation of phenol with titanium dioxide powders*, Industrial & Engineering Chemistry Research 30 (1991), pp. 1293-1300—incorporated herein by reference in its entirety).

Peterson et al. (1991) also report that at higher light intensity values, the PCD rate would be directly proportional to the Io1/2 while at low light intensities PCD rate would be a linear function of Io (Peterson, M. W., Turner, J. A., and Nozik, A. J., *Mechanistic studies of the photocatalytic behavior of $TiO_2$ particles in a photoelectrochemical slurry cell and the relevance to photodetoxification reactions*. J. Phys. Chem. 95 (1991), pp. 221-225—incorporated herein by reference in its entirety). Sichel et al. investigated water disinfection using solar irradiation and a $TiO_2$ catalyst (C. Sichel, J. Tello, M. de Cara, and P. Fernández-Ibáñez, *Effect of UV solar intensity and dose on the photocatalytic disinfection of bacteria and fungi*, Catalysis Today 129 (2007), pp. 152-160—incorporated herein by reference in its entirety). The experiments were performed with different illuminated reactor surfaces, in different seasons of the year, and under changing weather conditions. The findings indicate that SPCD process initiated disinfection is more susceptible to changes in solar irradiation and transpired only at increased sun light intensities.

Villaneuva and Martinez studied solar radiation energized photocatalytic degradation of aqueous phase acid orange 7 (AO7) (Susana Flores Villanueva and Susana Silva Martínez, *$TiO_2$-assisted degradation of acid orange 7 textile dye under solar light*, Solar Energy Materials and Solar Cells 91 (2007), pp. 1492-1495—incorporated herein by reference in its entirety). The authors report approx. 85% color removal from an AO7 solution in 2 h reaction time. Faster color removal was noted at acidic pH. However the quantification of AO7 mineralization employing the chemical oxygen demand (COD) test indicated insignificant COD reduction. Nevertheless, more than 70% COD removal transpired upon use of persulphate along with $TiO_2$ and solar radiation. Wang investigated PCD of eight commercial dyes using $TiO_2$ assisted photocatalysis and solar irradiation (Yizhong Wang, *Solar photocatalytic degradation of eight commercial dyes in $TiO_2$ suspension*, Water Research 34 (2000), 990-994—incorporated herein by reference in its entirety). The findings indicate that the target dyes could be degraded and mineralized to end products including chloride and sulfate.

Wei et al. studied disinfection of *E. coli* contaminated water using PCD initiated by UV-visible light with wavelength higher than 380 nm (Chang Wei, Wen Yuan Lin, Zulkarnain Zainal, Nathan E. Williams, Kai Zhu, Andrew P. Kruzic, Russell L. Smith, and Krishnan Rajeshwar, *Bactericidal Activity of $TiO_2$ Photocatalyst in Aqueous Media: Toward a Solar-Assisted Water Disinfection System*, Environmental Science & Technology 28 (1994), pp. 934-938—incorporated herein by reference in its entirety). The authors report significant bacterial kill with the reaction rate following first order kinetics. The kinetic analysis indicated a pseudo first order kinetics with respect to the initial concentration of methylene blue as per the Langmuir-Hinshelwood model. The total organic carbon (TOC) removal showed two distinct regions, i.e., an initial pseudo first order kinetics that was noted till full color removal was followed by a slower TOC removal.

Furthermore continuous supply of oxygen gas during the SPCD process did not show any significant effect on the overall process efficiency as compared to an 'open to air' study. Zhang et al. studied removal of methylene blue using the solar PCD process (Tianyong Zhang, Toshiyu ki Oyama, Satoshi Horikoshi, Hisao Hidaka, Jincai Zhao, and Nick Serpone, *Photocatalyzed N-demethylation and degradation of methylene blue in titania dispersions exposed to concentrated sunlight*, Solar Energy Materials and Solar Cells 73 (2002), pp. 287-303—incorporated herein by reference in its entirety). The authors observed notable removal of target pollutant under a varying set of conditions.

It is evident from the above that the removal of selenite and selenate using UV-lamp energized pure $TiO_2$ photocatalysis along with hole scavenger EDTA has not been studied. Furthermore use of solar energized $TiO_2$ photocatalytic degradation (SPCD) process to treat wastewater streams containing selenite and selenate species, has also not been explored. Hence the main goal of this present disclosure is to study removal of selenite and selenate species using $TiO_2$ assisted advanced oxidation process using both UV-lamp and solar energy as the light energy source.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

One embodiment of the disclosure includes a method for using ethylenediaminetetraacetic acid (EDTA) and $TiO_2$ for the photocatalyic removal of selenium-containing materials from an aqueous solution.

In another embodiment of the disclosure the method is used to remove selenite and selenate.

In another embodiment EDTA is used as a hole scavenger.

In another embodiment the method for photocatalytic removal of selenium-containing materials from an aqueous solution uses artificial light, and solar radiation photocatalysis processes.

In another embodiment photocatalyzing an aqueous solution is carried out in the presence of unmodified $TiO_2$ and EDTA.

In another embodiment solarizing the aqueous solution is carried out in the presence of a $TiO_2$ photocatalyst.

In another embodiment UV-lamp assisted photocatalysis has the highest efficiency of removing selenium-containing material from the aqueous solution.

In another embodiment selenium-containing materials are removed when the pH of the photocatalyzing system is equal to or less than 4.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
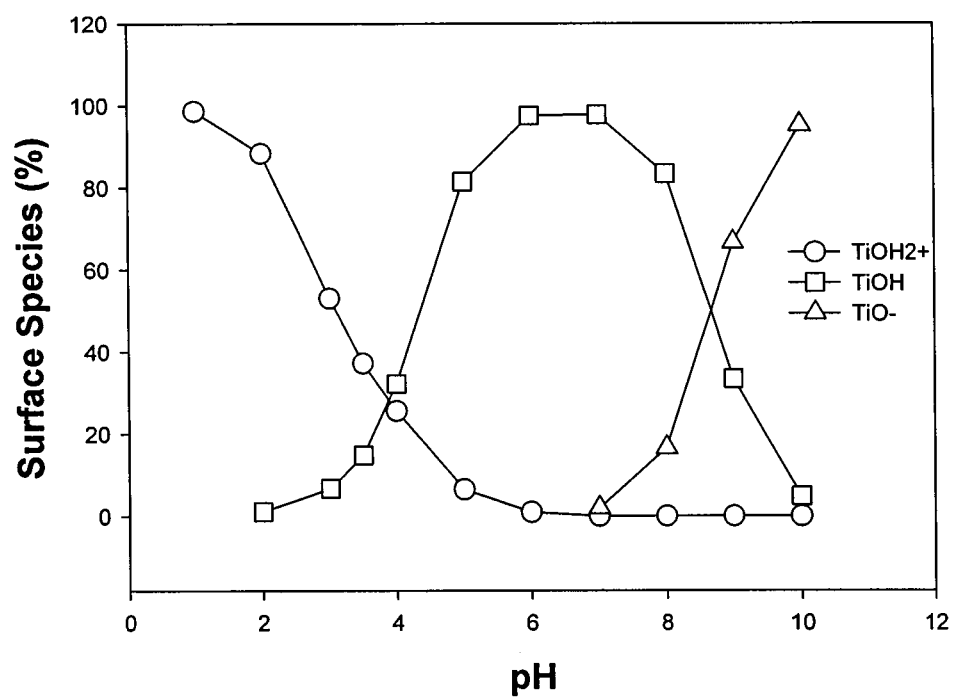
FIG. 1 is a graph of naked $TiO_2$ surface speciation.

Referring now to the drawings, wherein like reference numerals designate identical or corresponding parts throughout the several views.

Though PCD studies have explored removal of selenite and selenate from the aqueous phase, nevertheless the role of EDTA as a hole scavenger for the removal of respective selenium species using unmodified $TiO_2$ photocatalysis, has not been investigated. The use of solar energized $TiO_2$ assisted photocatalysis for the removal of aqueous phase selenite and selenate has also not been investigated.

The role of thiocyanate (as a hole scavenger is also investigated for the PCD studies.

$TiO_2$ speciation with pH (FIG. 1) also plays an important role during photocatalysis. $TiO_2$ assisted photocatalysis using artificial and solar radiation were employed for the removal of aqueous phase selenite and selenate species in conjunction with EDTA as a hole scavenger. For the UV-lamp light assisted photocatalysis, faster removal was noted at pH 4 and pH 6 for the binary selenite/EDTA system compared to selenate/EDTA system that showed a gradual change over the reaction course. The effect-of-pH studies indicated high selenite, selenate, and EDTA removal in the acidic pH range, with following specific trend: pH 4>pH 6>pH 12. Furthermore thiocyanate alone did not initiate photo-reduction of selenium oxyanions. However addition of EDTA species to respective selenite/selenate/thiocyanate system at pH 4 did yield near complete removal of selenite and selenate (via the reduction route). The marginal role of thiocyanate as a hole scavenger to expedite selenite/selenate reduction, was attributed to its negligible adsorption on to $TiO_2$ surface as compared to EDTA which indeed showed adsorption especially at the acidic pH values. Furthermore selenate reduction increased with an increase in its initial concentration (at pH 4) with near complete removal transpiring within 3 h. Solar light assisted photocatalysis also showed high efficiency for the removal of selenite, selenate and EDTA at pH 4 and pH 6 with a specific trend pH 4>pH 6>pH 8. Selenite again showed faster removal compared to selenate species. Initial EDTA concentration had the most significant effect among the parameters studied. Among the three processes studied, UV-lamp assisted photocatalysis had the highest efficiency comparatively followed by solar light assisted photocatalysis. In general, findings from the present work indicate that both $TiO_2$ mediated photocatalysis and photo-Fenton processes in conjunction with EDTA as an $h^+$ scavenging agent are efficient techniques for selenium ions removal.

Various studies have investigated the use of $TiO_2$ assisted photocatalytic removal of aqueous phase selenite and selenate species using UV-lamp as the energy source and many organic hole scavengers. Use of EDTA as an organic hole scavenger however has not been investigated for unmodified $TiO_2$ photocatalytic removal of selenium oxyanions. Use of $TiO_2$ assisted solar photocatalytic degradation (SPCD) advanced oxidation process (AOP) has been explored for the removal of other aqueous phase pollutants as well. Nevertheless, use of SPCD AOP for the removal of aqueous phase selenite/selenate species has not been investigated, to the best of our knowledge. Considering the above mentioned gaps in existing literature on the removal of selenite and selenate, the present disclosure is thus tailored to investigate the removal of selenite and selenate species using $TiO_2$ assisted advanced oxidation process using both UV-lamp and solar light as the light energy sources. The specific objectives include: to disclose selenite and selenate species removal using titanium dioxide assisted photocatalysis energized by artificial and solar radiation; to investigate the optimum process pH for photocatalytic process; to disclose the effect of hole scavengers on process efficiency; and to disclose the effect of initial pollutant concentration on the process efficiency.

Figure 2:
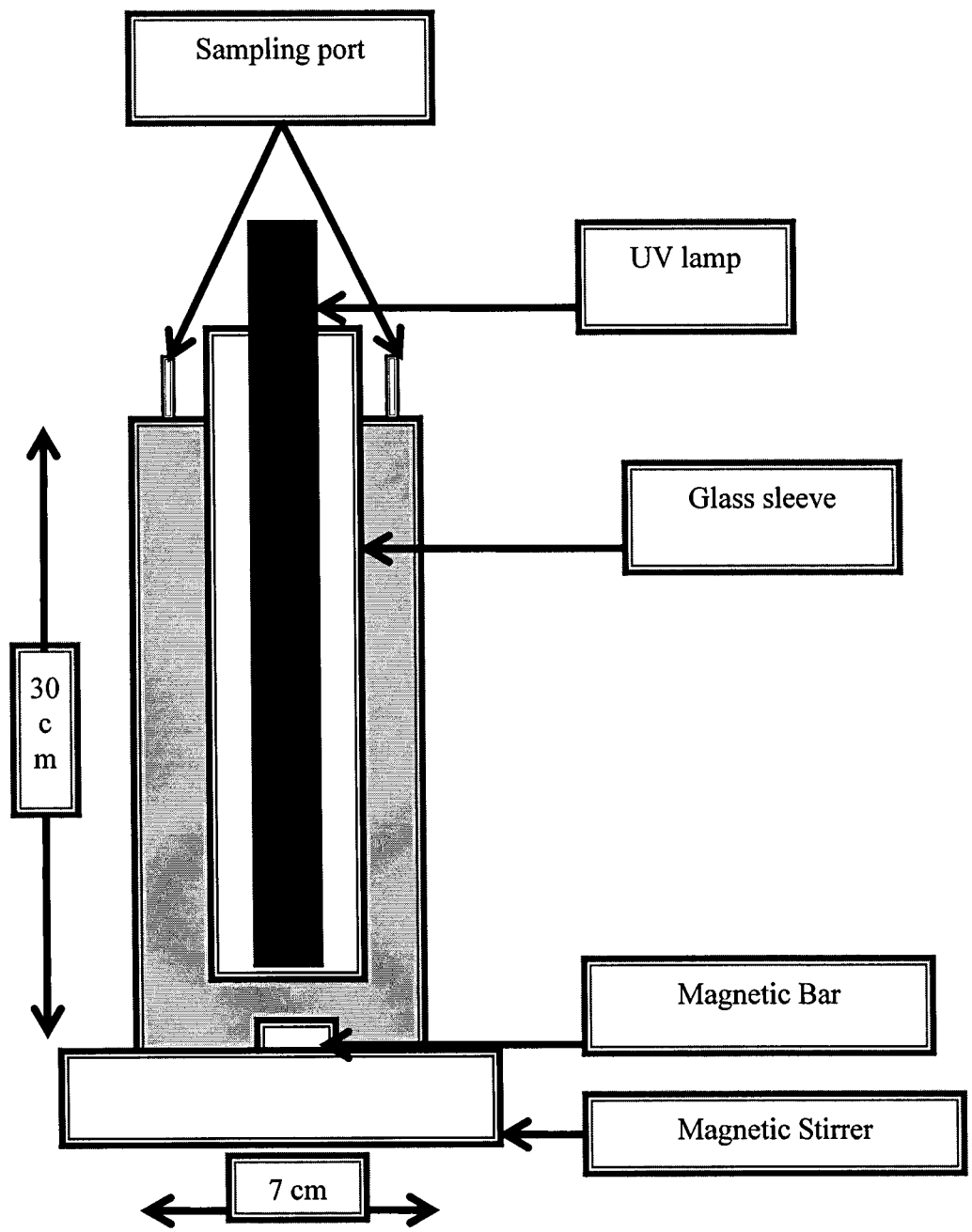
FIG. 2 is a schematic of a reactor setup used for photocatalysis.
Figure 3:
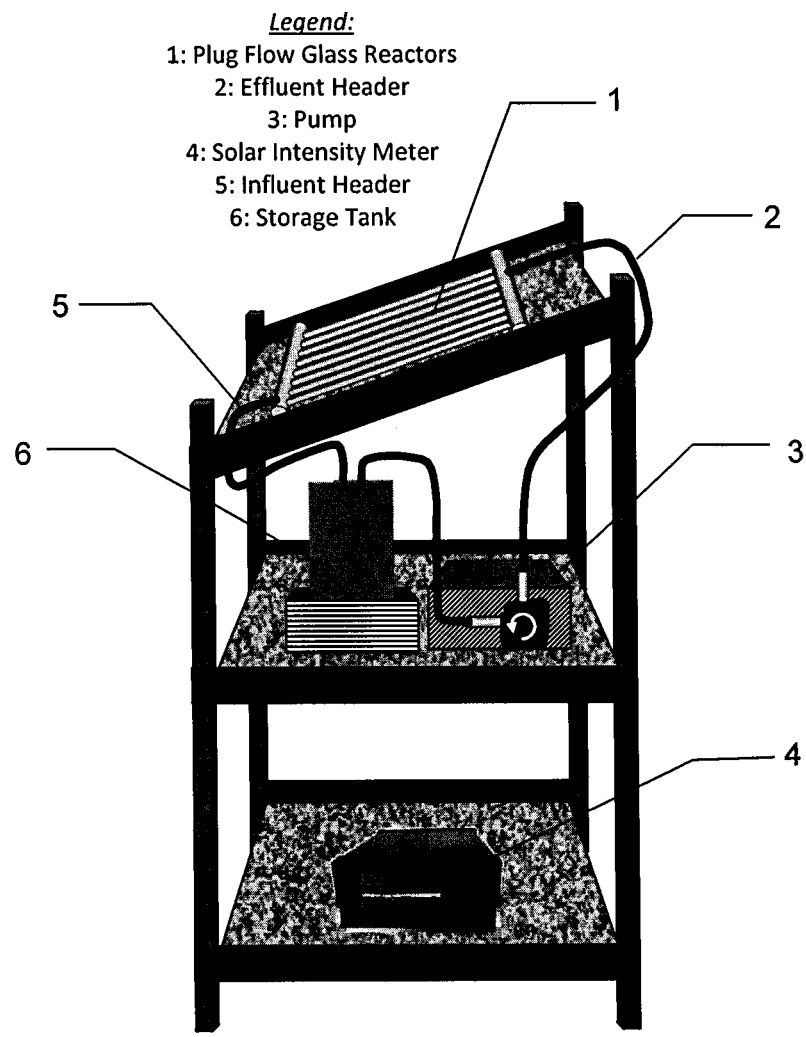
FIG. 3 is a schematic of solar photocatalytic degradation (SPCD) reactor and support hardware.

All chemical used were of high purity reagent grade quality, including $TiO_2$ powder (P25, DEGUSSA), potassium selenate (ALDRICH), sodium selenite (ALDRICH), potassium thiocyanate (BDH), disodium EDTA (FISHER), sodium cyanide (FISHER), potassium cyanate (FLUKA), sodium hydroxide (FISHER), and pH calibration standards (FISHER). Magnetic stirrer, 15 W UV lamp, 0.2 μm filter papers, pH meter, ion electrodes, furnace, TOC analyzer, Ion Chromatograph, etc., are some of the basic materials and equipments used. Artificial and solar light experiments were carried out using Pyrex-glass batch type reactor (30 cm long and 7 cm diameter) and One-Sun type reactor respectively. FIG. 2 and FIG. 3 present the layout of UV lamp and solar light assisted experimental reactors. FIG. 2 is a schematic of the reactor setup used for the photocatalysis experiments. FIG. 3 is a schematic of the solar photocatalytic degradation (SPCD) reactor and support hardware wherein 1 represents the SPCD glass reactor, 2 represents an effluent header, 3 represents a pump, 4 represents a solar intensity meter, 5 represents an influent header, and 6 represents a storage tank.

A Pyrex glass batch type reactor of 1000 mL was used for UV-lamp assisted photocatalysis experiments (FIG. 2). Batches of test solutions were prepared using high purity water (CORNING Mega Pure™ System) and stock solutions of respective chemicals. 1.1 L of the test solution was prepared for each experiment, out of which 0.1 L was taken as a blank sample before the addition of photocatalyst. After this 1 g $TiO_2$ photocatalyst was added to remaining 1 L test solution and initial pH was adjusted to the desired value using HCl or NaOH solutions. The system was kept in suspension using a magnetic stirrer set up and was allowed to equilibrate for 20 min. This test solution was then transferred to the batch reactor (FIG. 2). A 15 W UV lamp (F15T8-BLB 15 W, Sankyo Denki, Japan) with 315-400 nm wavelength range and peak maximum at ~352 nm was positioned at the reactor centre and separated from the test solution using a glass sleeve. Another blank sample was collected before turning on the UV lamp, to note any change in target pollutant concentration before photocatalysis because of adsorption. The PCD reactor was fully covered with aluminium foil during experiment to ensure that light from UV lamp is the only light source. The UV lamp was then turned on and several samples were collected via sampling port at different time intervals from 0 to 360 min. Additional samples were taken if deemed necessary. UV lamp light assisted photocatalysis experimental plan is shown in Table 4.1.

TABLE 4.1

UV lamp assisted photocatalysis experimental plan.

| Variable | System | Experimental conditions | Variation |
|---|---|---|---|
| pH Effect | Selenite/ EDTA | 20 ppm selenite 300 ppm EDTA 1 g/L $TiO_2$ | pH 4 pH 6 pH 12 |
| | Selenate/ EDTA | 20 ppm selenate 300 ppm EDTA 1 g/L $TiO_2$ | pH 4 pH 6 pH 12 |
| | Selenite/ thiocyanate | 20 ppm selenite 10 ppm Thiocyanate 1 g/L $TiO_2$ | pH 4 pH 6 |
| | Selenate/ thiocyanate | 20 ppm selenate 10 ppm thiocyanate 1 g/L $TiO_2$ | pH 4 pH 6 |
| | Selenite/ selenate/ thiocyanate | 20 ppm selenite 20 ppm selenate 10 ppm thiocyanate 1 g/L $TiO_2$ | pH 4 pH 6 |
| Initial EDTA Concentration Effect | Selenate | 20 ppm selenate 300 ppm EDTA pH 4 1 g/L $TiO_2$ | 3 ppm EDTA 150 ppm EDTA 300 ppm EDTA |
| | Selenite/ thiocyanate | 20 ppm selenite 10 ppm Thiocyanate pH 4 1 g/L $TiO_2$ | 0 ppm EDTA 150ppm EDTA 300 ppm EDTA |
| | Selenate/ thiocyanate | 20 ppm selenate 10 ppm thiocyanate pH 4 1 g/L $TiO_2$ | 0 ppm EDTA 150 ppm EDTA 300 ppm EDTA |
| | Selenite/ selenate/ thiocyanate | 20 ppm selenite 20 ppm selenate 10 ppm thiocyanate pH 4 1 g/L $TiO_2$ | 0 ppm EDTA 150 ppm EDTA 300 ppm EDTA |
| Initial Selenate Concentration Effect | Selenate/ EDTA | 300 ppm EDTA pH 4 1 g/L $TiO_2$ | 20 ppm selenate 100 ppm selenate |

Figure 4:
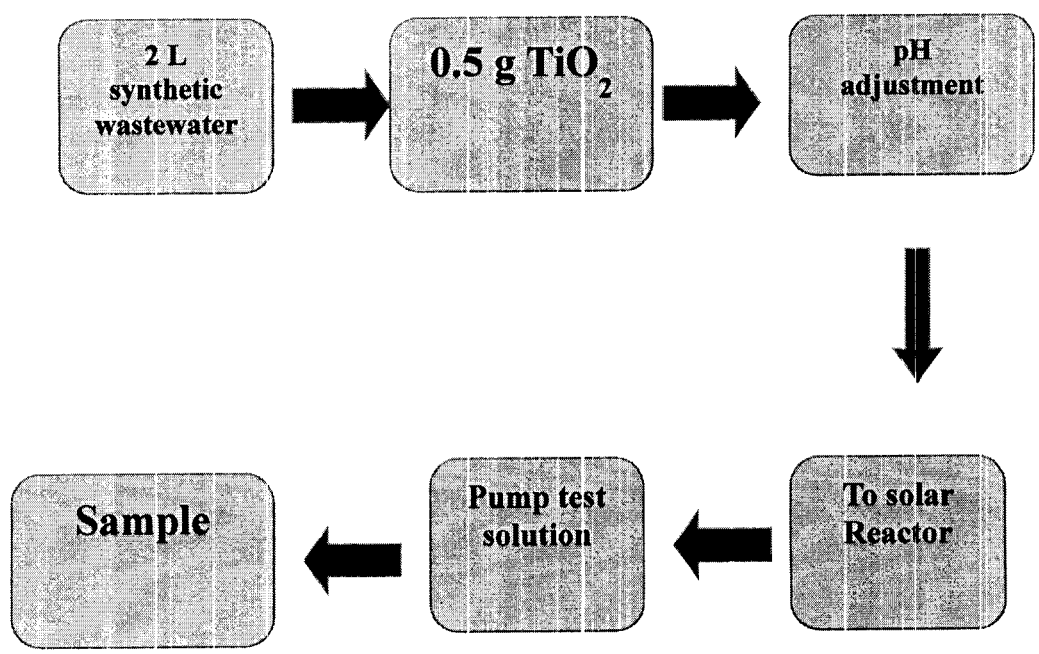
FIG. 4 depicts a solar photocatalytic degradation (SPCD) experiment general plan.
Figure 5:
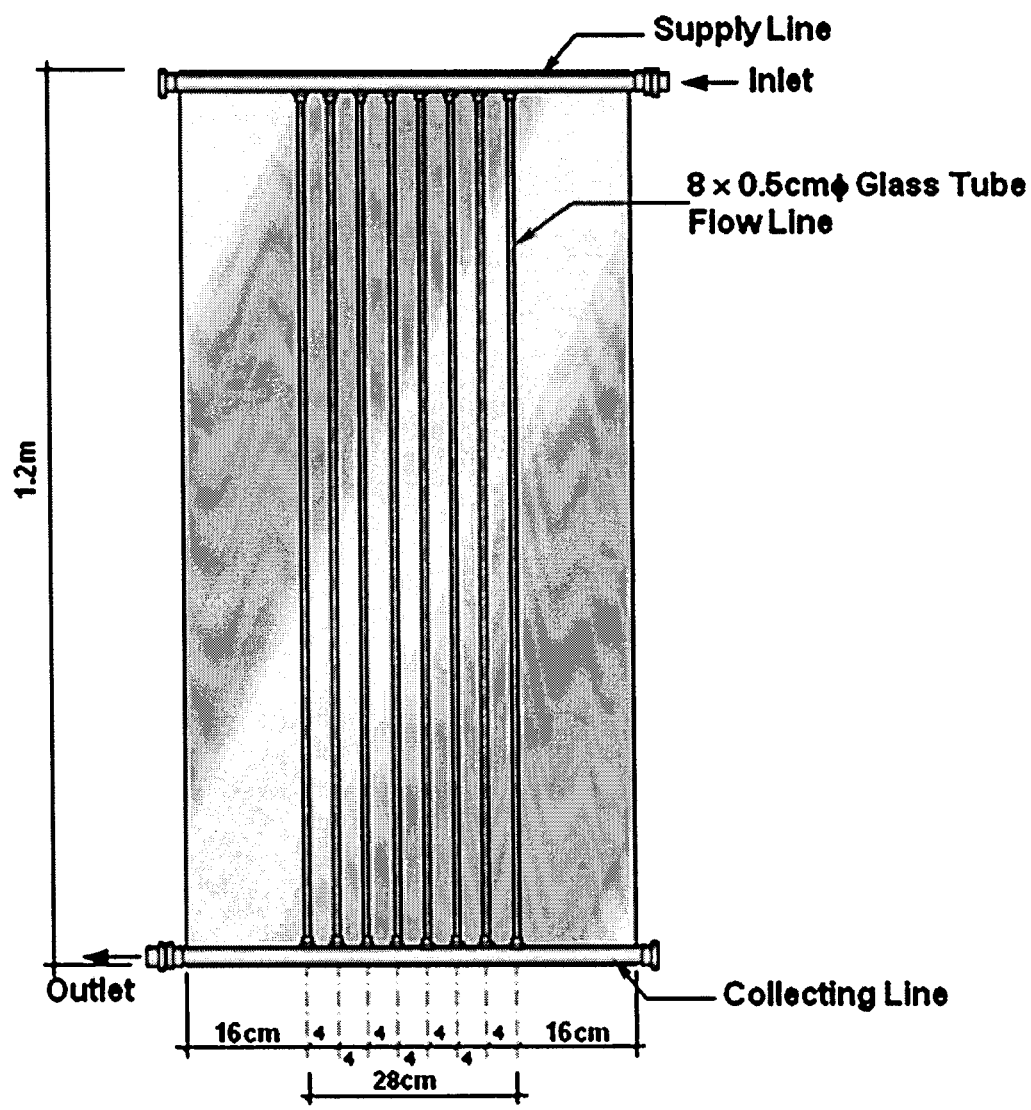
FIG. 5 is a schematic of the layout of the SPCD reactor.

The SPCD experiments were conducted using a re-circulating one-sun type plug flow type reactor. FIG. 3 and FIG. 4, provide some basic reactor setup and experimental plan details. FIG. 5 is a schematic of the layout of the SPCD reactor. The reactor itself is made from Pyrex glass. It consists of an influent header pipe and an effluent header pipe, which are connected by a series of parallel & thin pipes (FIG. 3, and FIG. 5). The parallel thin pipes are the main plug flow reactors. Batches of test solutions were prepared using high purity water (CORNING Mega Pure™ System) and stock solutions of respective chemicals. Initially a 2 L test solution was prepared for each solar experiment, and a blank sample was collected before the addition of photocatalyst (for SPCD studies). After this $TiO_2$ photocatalyst was added (for the SPCD process) to remaining test solution at 0.25 g/L, and initial pH was adjusted to the desired value using HCl or NaOH solutions. For SPCD study, the respective system was mixed using a magnetic stirrer set up and was allowed to equilibrate for 20 min after which a sample was taken. Such a blank accounted for any initial substrate loss because of reasons other than the SPCD initiated reactions. The synthetic wastewater sample containing both the target pollutant and the $TiO_2$ was then introduced to the solar reactor via the influent header (using pump setup) from where it flowed through the solar reactor. To assure mixing, the wastewater storage tank incorporated a magnetic stirrer setup as well. As the wastewater and $TiO_2$ flow through the reactor, the aqueous pollutants were exposed to the solar radiation, initiating the degradation of target pollutant. The effluent was collected at the effluent header where it was returned back to batch tank from where it was again recirculated to the reactor for further treatment. During the course of solar experiments, several samples were collected at appropriate time intervals, to assess the degree of pollutant species removal. The solar UV-light intensity was also measured during each solar experiment. Solar light assisted PCD experimental plans are shown in Table 4.2.

Table 4.2 is shown below.

TABLE 4.2

Solar light assisted photocatalysis experimental plan.

| Variable | System | Experimental conditions | Variation |
|---|---|---|---|
| pH Effect | Selenite/ EDTA | 20 ppm selenite 150 ppm EDTA 0.25 g/L $TiO_2$ | pH 4 pH 6 pH 8 |

TABLE 4.2-continued

Solar light assisted photocatalysis experimental plan.

| Variable | System | Experimental conditions | Variation |
|---|---|---|---|
| | Selenate/ EDTA | 20 ppm selenate 150 ppm EDTA 0.25 g/L TiO$_2$ | pH 4 pH 6 pH 8 |
| Initial EDTA Concentration Effect | Selenite | 20 ppm selenite pH 4 0.25 g/L TiO$_2$ | 0 ppm EDTA 75 ppm EDTA 150 ppm EDTA 300 EDTA 450 ppm EDTA |
| | Selenate | 20 ppm selenate pH 4 0.25 g/L TiO$_2$ | 150 EDTA 300 ppm EDTA 450 ppm EDTA |
| | Selenite/ EDTA | 150 ppm EDTA pH 4 0.25 g/L TiO$_2$ | 10 ppm selenite 20 ppm selenite 30 ppm selenite |
| Initial pollutant Concentration Effect | Selenate/ EDTA | 150 ppm EDTA pH 4 0.25 g/L TiO$_2$ | 10 ppm selenate 20 ppm selenate 30 ppm selenate |

Sample aliquots of required volume collected at appropriate time intervals were filtered through 0.2-µm membrane filters (Whatman, Germany) and analyzed for the respective pollutants. An ion chromatograph set-up (Metrohm, Switzerland) equipped with a conductivity detector was used for $SeO_4^{2-}$, $SeO_3^{2-}$, $NO_2^-$, $OCN^-$, and $NO_3^-$ analysis. The eluent composition was 1 mM $NaHCO_3$ and 3.2 mM $Na_2CO_3$ and eluent flow rate was 1 ml/min. A metrosep Anion Dual 2 IC column (6.1006.100, 4.6 mm×75 mm, Metrohm, Switzerland) was used for respective analysis. The EDTA concentration was quantified via Total Organic Carbon (TOC) analysis. A TOC Analyzer (Shimadzu, Japan) was used for this purpose. An ion specific electrode (Orion 9606 BNWP, USA) with mV readings option meter setup (Orion, USA) was used for aqueous cyanide analyses. All equipments and analyzers were regularly calibrated before each analysis exercise, using respective calibration standards. The pH analyses were conducted using a standard pH electrode-meter setup (AccuTupH$^+$ 13-620-185 electrode, Accumet XL15 pH meter) which was also regularly calibrated using pH calibration standards.

Figure 6:
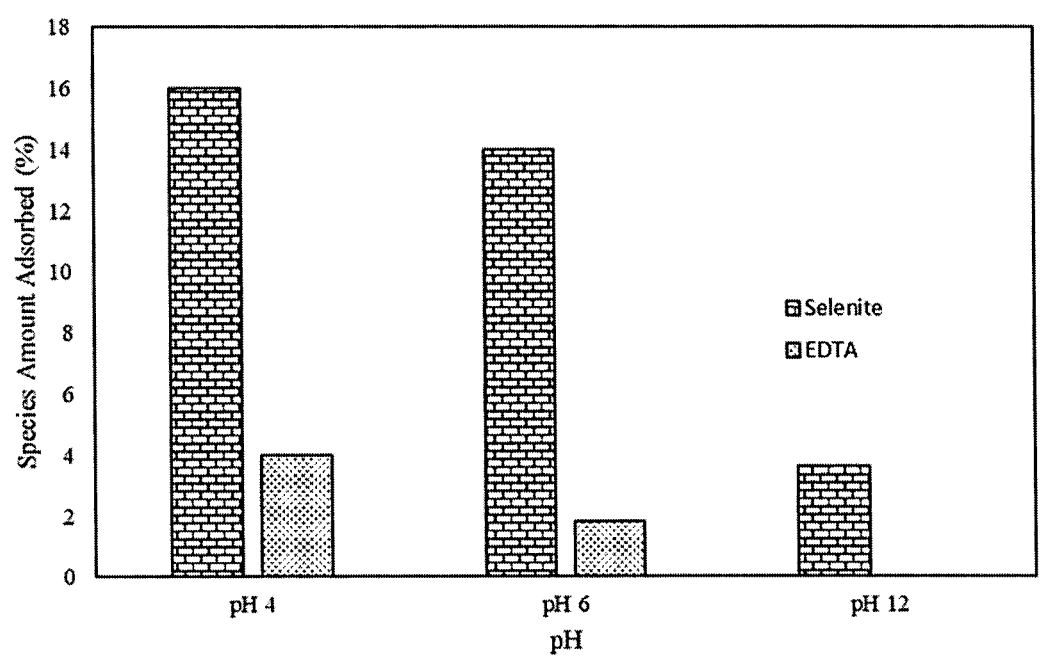
FIG. 6 is a graph of the adsorption of selenite and EDTA at different pH levels.
Figure 7:
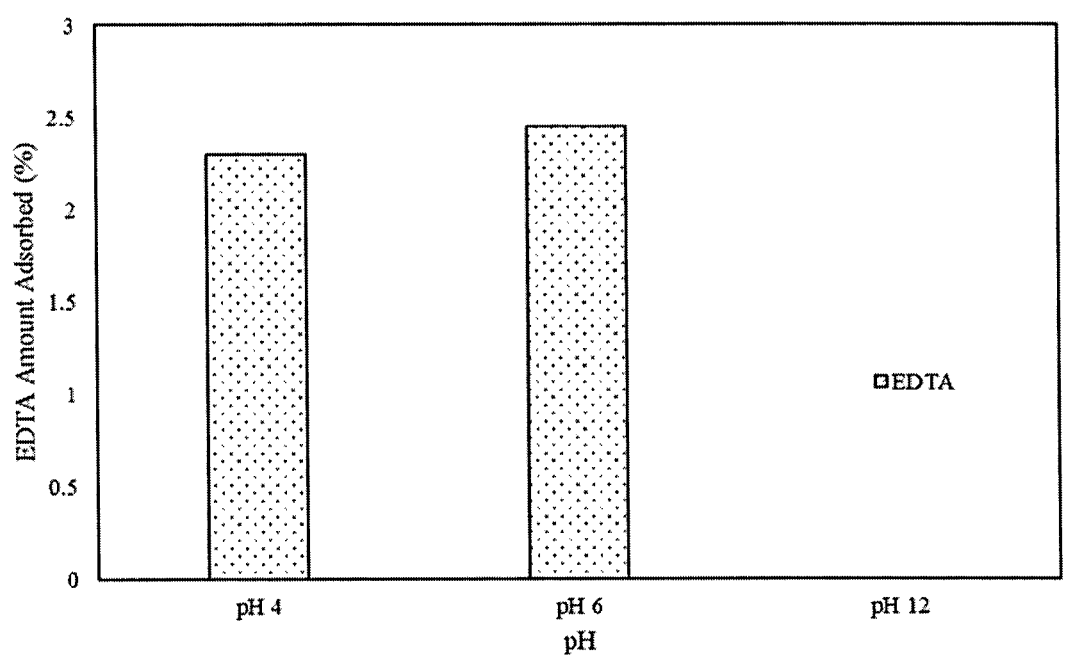
FIG. 7 is a graph of the adsorption of EDTA at different pH levels.
Figure 8:
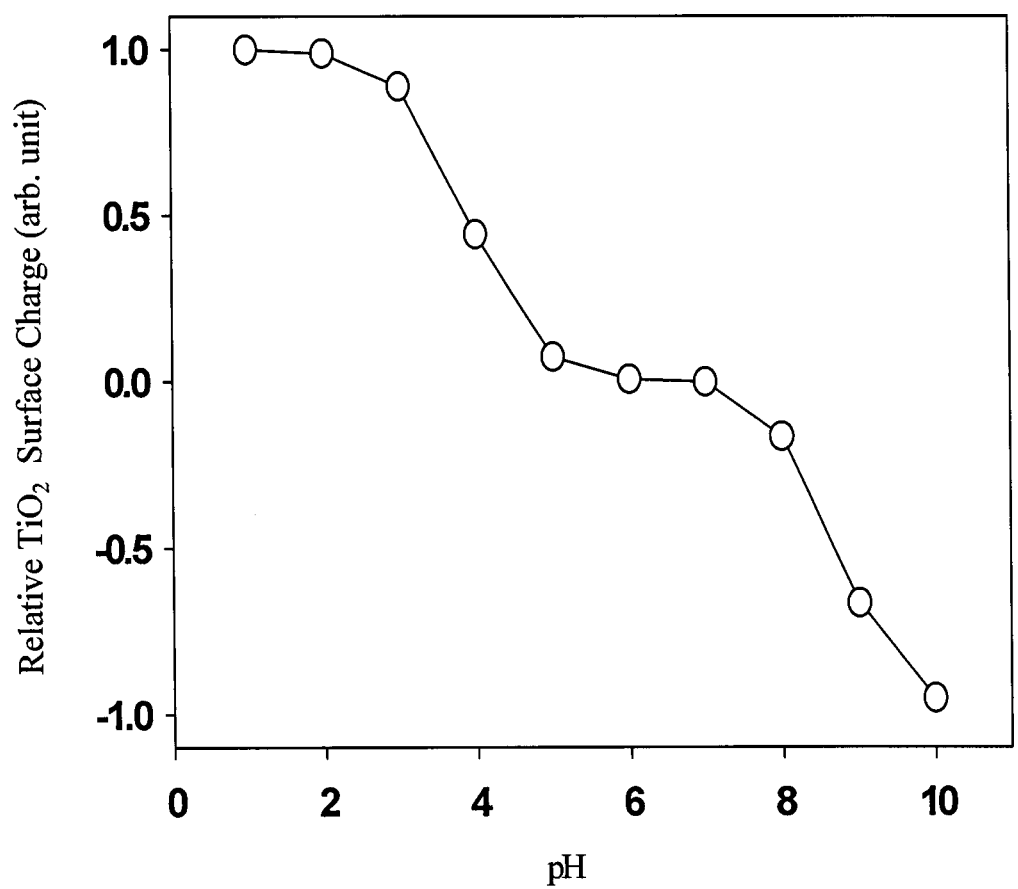
FIG. 8 is a graph of the calculated relative $TiO_2$ surface charge at different pH levels.

Adsorption of selenite, selenate and hole (h$^+$) scavenging agent onto TiO$_2$ was first explored because of their importance in photocatalytic reduction of selenium oxyanions. FIG. 6 and FIG. 7 illustrate the effect of pH on initial adsorption (from the selenite/EDTA and selenate/EDTA systems respectively) on to TiO$_2$ surface. FIG. 6 is a graph of the adsorption of selenite and EDTA at different pH (20 ppm selenite, 300 ppm EDTA, 1 g/L TiO$_2$). FIG. 7 is a graph of the adsorption of EDTA at different pH (20 ppm selenate, 300 ppm EDTA, 1 g/L TiO$_2$). Though significant selenite adsorption is noted at respective pH values (FIG. 6) however selenate adsorption was noted to be negligible. (It should be noted that though selenate adsorption onto TiO$_2$ has been reported earlier but the used TiO$_2$ amount was very high compared to what was employed in the present work.) A greater adsorption of selenite, compared to selenate is attributed to their structural differences, which affect the nature of bonds formed during their adsorption (S. Sharmasarkar and G. F. Vance, *Selenite-selenate sorption in surface coal mine environment*, Adv. in Env. Res. 7 (2002), pp. 87-95—incorporated herein by reference in its entirety). Furthermore both EDTA and selenite adsorption decreases with an increase in pH, with EDTA showing much lower adsorption compared to selenite (FIG. 6). FIG. 7 also shows decreased EDTA adsorption at pH 12. The noted decrease in selenite and EDTA adsorption at higher pH possibly transpires because of 1) Competitive OH ions adsorption on to the TiO$_2$ surface sites and 2) Electrostatic repulsion because of an increasing TiO$_2$ negative surface charge with an increase in pH (Y. T. Chan, W. H. Kuan, T. Y. Chen, and M. K. Wang, *Adsorption mechanism of selenate and selenite on the binary oxide systems*, Wat. Res. 43 (2009), pp. 4412-4420—incorporated herein by reference in its entirety); FIG. 1 and FIG. 8 which provide the surface speciation and surface charge trends for Degussa P25 TiO$_2$ also indicate that above pHzpc of 6.25 the photocatalyst's surface will be pre-dominantly negatively charged, hence resulting in electrostatic repulsion of respective anionic species and in turn their decreased adsorption as observed in FIG. 8. FIG. 8 is a graph of the calculated relative TiO2 surface charge [Using MINTEQA2/PRODEFA2 software and considering Ti—OH 2$^+$, Ti—OH and Ti—O$^-$ surface species].

Figure 9:
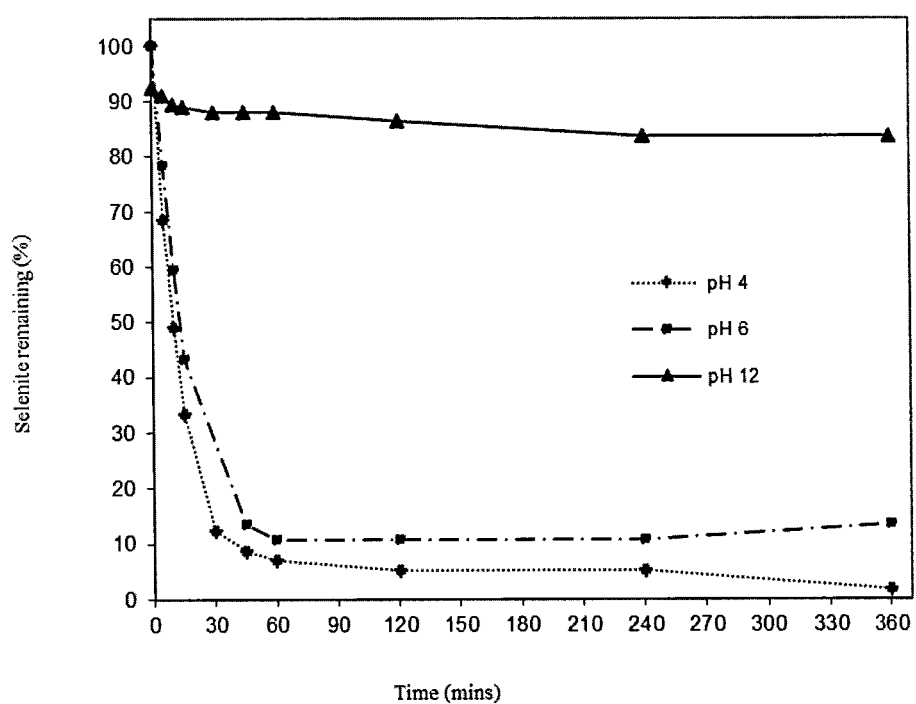
FIG. 9 is a graph of the effect of pH on UV-light photocatalytic reduction of selenite.

Photocatalytic removal of selenite and selenate was first studied in the presence of EDTA, which was employed as a hole/h$^+$ scavenging agent. Three different pH values of 4, 6, and 12 were investigated and the individual results are reported in FIG. 58-FIG. 63. FIG. 9 and Table 5.1 which summarize the respective findings shows that approx. 98% selenite removal at pH 4 and 6 h reaction time, whereas approx. 86% removal transpires at pH 6 and 6 h.

Figure 58:
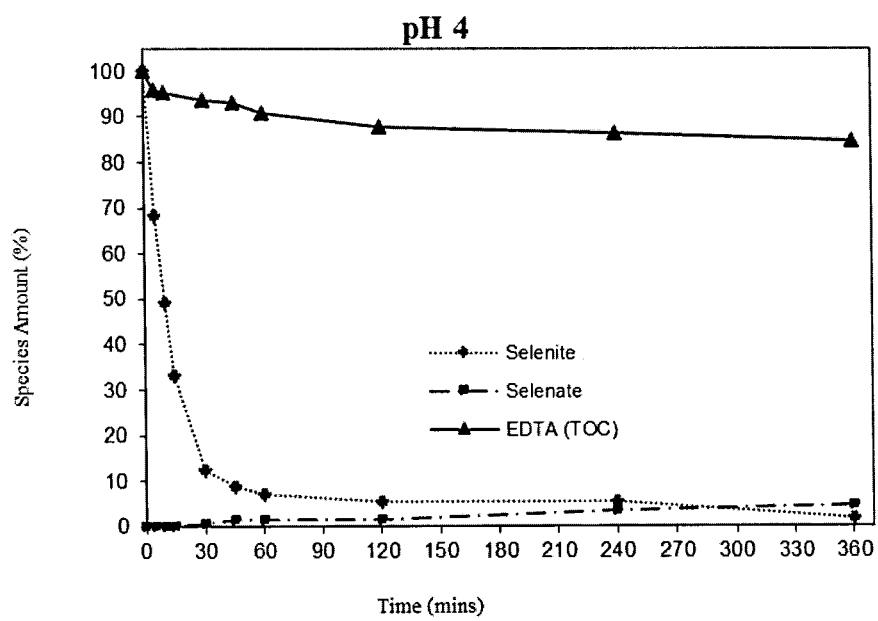
FIG. 58 is a graph of the UV-light photocatalytic reduction of selenite at pH 4.
Figure 59:
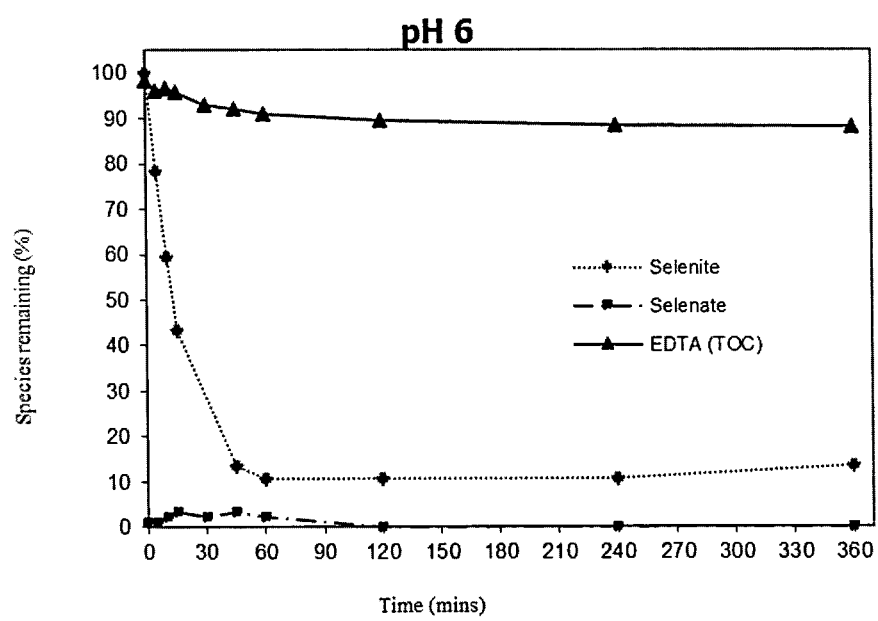
FIG. 59 is a graph of the UV-light photocatalytic reduction of selenite at pH 6.
Figure 60:
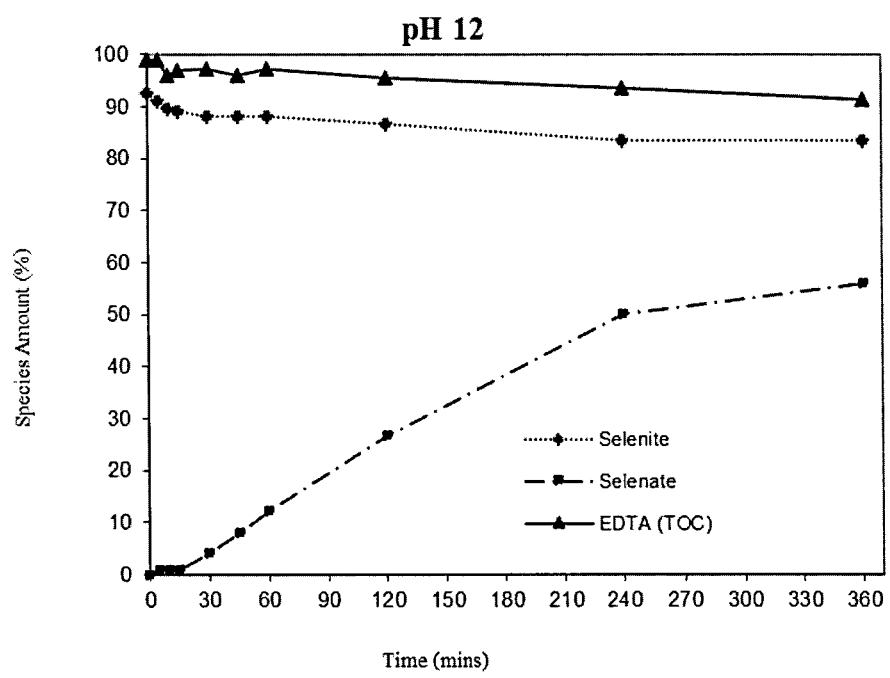
FIG. 60 is a graph of the UV-light photocatalytic reduction of selenite at pH 12.
Figure 61:
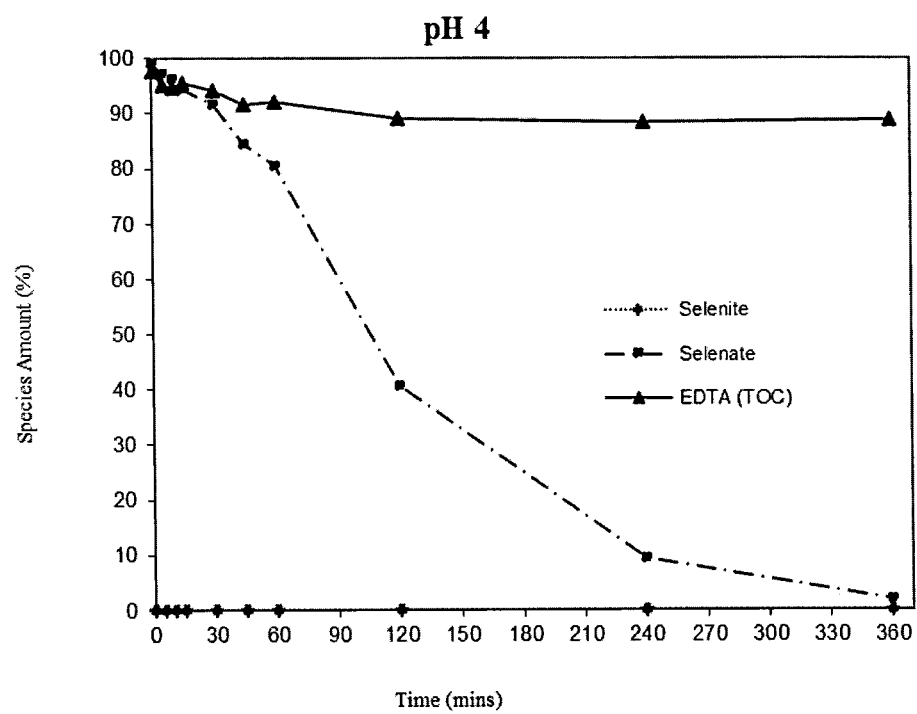
FIG. 61 is a graph of the UV-light photocatalytic reduction of selenate at pH 4.
Figure 62:
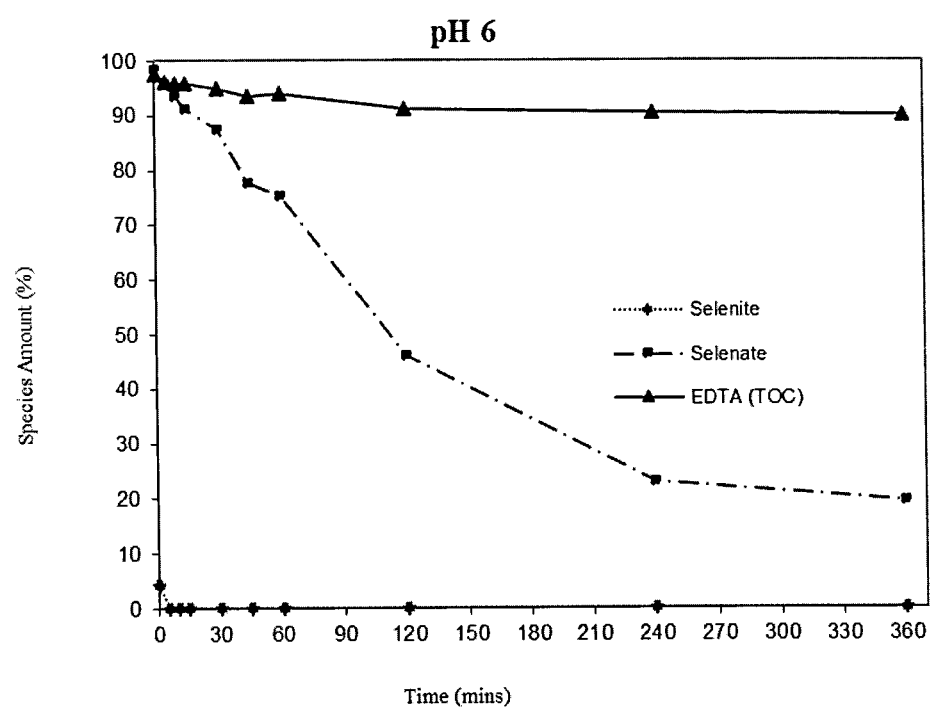
FIG. 62 is a graph of the UV-light photocatalytic reduction of selenate at pH 6.
Figure 63:
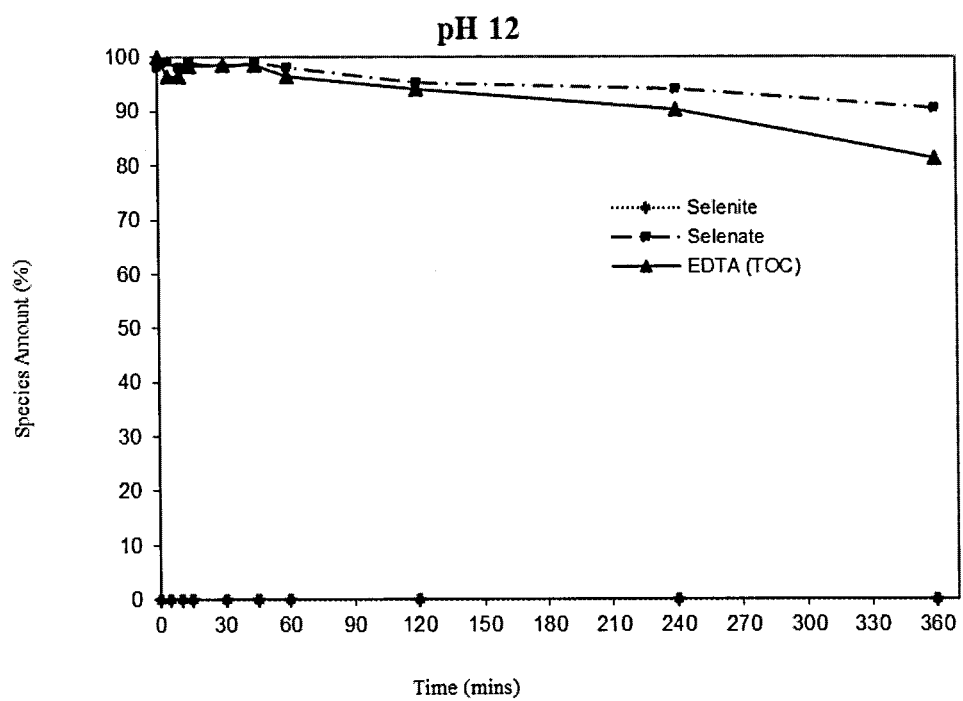
FIG. 63 is a graph of the UV-light photocatalytic reduction of selenate at pH 12.

FIG. 9 is a graph of the effect of pH on UV-light photocatalytic reduction of selenite (20 ppm selenite, 300 ppm EDTA). FIG. 58 is a graph of the UV-light photocatalytic reduction of selenite (20 ppm selenite, 300 ppm EDTA, pH 4). FIG. 59 is a graph of the UV-light photocatalytic reduction of selenite (20 ppm selenite, 300 ppm EDTA, pH 6). FIG. 60 is a graph of the UV-light photocatalytic reduction of selenite (20 ppm selenite, 300 ppm EDTA, pH 12). FIG. 61 is a graph of the UV-light photocatalytic reduction of selenate (20 ppm selenate, 300 ppm EDTA, pH 4). FIG. 62 is a graph of the UV-light photocatalytic reduction of selenate (20 ppm selenate, 300 ppm EDTA, pH 6). FIG. 63 is a graph of the UV-light photocatalytic reduction of selenate (20 ppm selenate, 300 ppm EDTA, pH 12).

Figure 10:
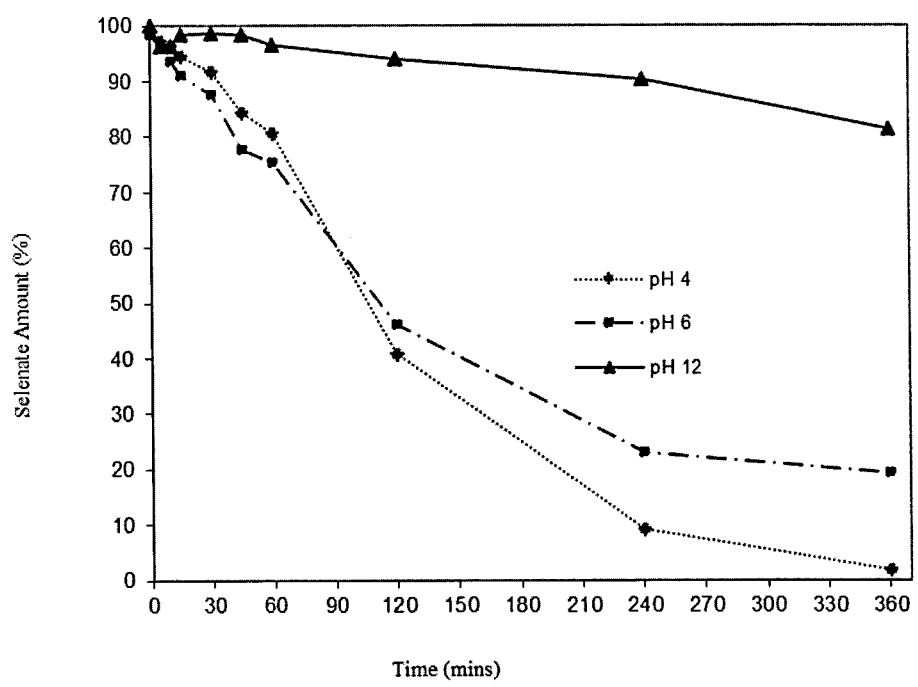
FIG. 10 is a graph of the effect of pH on UV-light photocatalytic reduction of selenate.

However negligible selenite removal is noted at pH 12. Similar to selenite findings, selenate removal decreases with an increase in the initial pH; at 6 h reaction time, approx. 98% and 82% selenate removal transpires at pH 4 and pH 6 respectively as shown in FIG. 10 and Table 5.2. However, similar to selenite findings negligible selenate removal results at pH 12. The respective high selenite and selenate removal at pH 4 and pH 6 is elucidated based upon h$^+$ scavenging action of EDTA. The reaction of h$^+$ species with the organic hole scavenger EDTA may be given as:

$$EDTA + h^+ \rightarrow Intermediates \rightarrow CO_2 + H_2O \qquad (5\text{-}1)$$

Thus higher h$^+$ species scavenging by EDTA results in increased electrons/e species availability (as produced in Equation 5-1), which in turn could be utilized by a suitable electron acceptor such as O$_2$ or a metal species (M. R. Prairie, L. R. Evans, B. M. Stange, and S. L. Martinez, *An investigation of titanium dioxide photocatalysis for the treatment of water contaminated with metals and organic chemicals*, Environ. Sci. & Technol. 27 (1993), pp. 1776-1782; M. R. Prairie, B. M. Stange, and L. R. Evans, *TiO2 Photocatalysis for the Destruction of Organics and the Reduction of Heavy Metals*, in *Photocatalytic Purification and Treatment of Water and Air*, Ollis, D. F., and Al-Ekabi, H., Eds. Elsevier, Ontario, 1993b, pp. 353-363-each incorporated herein by reference in its entirety). In case of selenite or selenate the following reaction is expected:

$$Selenite/Selenate + e^- \rightarrow Reduced\ Selenium \qquad (5\text{-}2)$$

Furthermore during selenium removal from the aqueous phase at pH 4 and pH 6, a change in suspension color from white to orange/pink was observed as well. This indicated reduction of selenium oxyanion species on to $TiO_2$ surface as also suggested by other investigators. Prairie et al. also report CB $e^-$ species mediated mercury reduction with simultaneous oxidation of an organic pollutant. As the mercury species accepts $e^-$, more $h^+$ are left for degradation of pollutant. A similar mechanism is expected for selenite and selenate reduction as well (Eq. 5-2).

Further to present findings, though both selenite and selenate show significant removal at pH 4 and pH 6, however the change is faster in case of selenite, and photoreduction of selenate is found to be more gradual. Furthermore, in case of selenite, most change is noted within 60 min. This may be due to fact that selenate is first reduced to selenite followed by reduction to elemental selenium. However in case of selenite, the first reaction step is not needed. The noted faster selenite removal kinetics could also result because of structural differences between two species or due to number of electrons required during the reduction process. Selenite adsorbs more on to $TiO_2$ surface compared to selenate at respective pH values. The adsorption of both selenite/selenate and $h^+$ scavenging agent on to $TiO_2$ is expected to have an important effect on to reduction of former species. For example the significance of formic acid's adsorption on to $TiO_2$ during reduction of selenite & selenate has been well established (T. T. Y. Tan, C. K. Yip, D. Beydoun and R Amal, *Effects of nano-Ag particles loading on $TiO_2$ photocatalytic reduction of selenate ions*, Chem. Eng. J. 95 (2003), pp. 179-186; T. T. Y. Tan, M. Zaw, D. Beydoun, and R. Amal, *The formation of nano-sized selenium-titanium dioxide composite semiconductors by photocatalysis*, J. Nan. Res. 4 (2002), pp. 541-552—each incorporated herein by reference in its entirety). Higher adsorption typically results in higher valence band $h^+$ scavenging efficiency, which in turn yields higher conduction band electrons ($e^-$) availability for photoreduction of selenium ions. Hence the above discussion shows that a simultaneous occurrence of both photo-reduction and photo-oxidation processes are important for efficient removal of selenium oxyanions and also EDTA. However, different from the pH 4 and pH 6 findings we note insignificant selenite and selenate removal at pH 12 (FIG. 9 and FIG. 10). FIG. 10 is a graph of the effect of pH on UV-light photocatalytic reduction of selenate (20 ppm selenate, 300 ppm EDTA). Lower selenite removal at pH 12 could result because of decreased adsorption of EDTA at that pH (FIG. 6). As EDTA acts as hole scavenger, any reduction in its adsorption onto TiO2 surface will result in reduced $h^+$ consumption and in turn enhanced $e^-/h^+$ recombination, thus leaving fewer $e^-$ species for selenite/selenate reduction; similar has been noted for other $h^+$ scavenging compounds.

Figure 11:
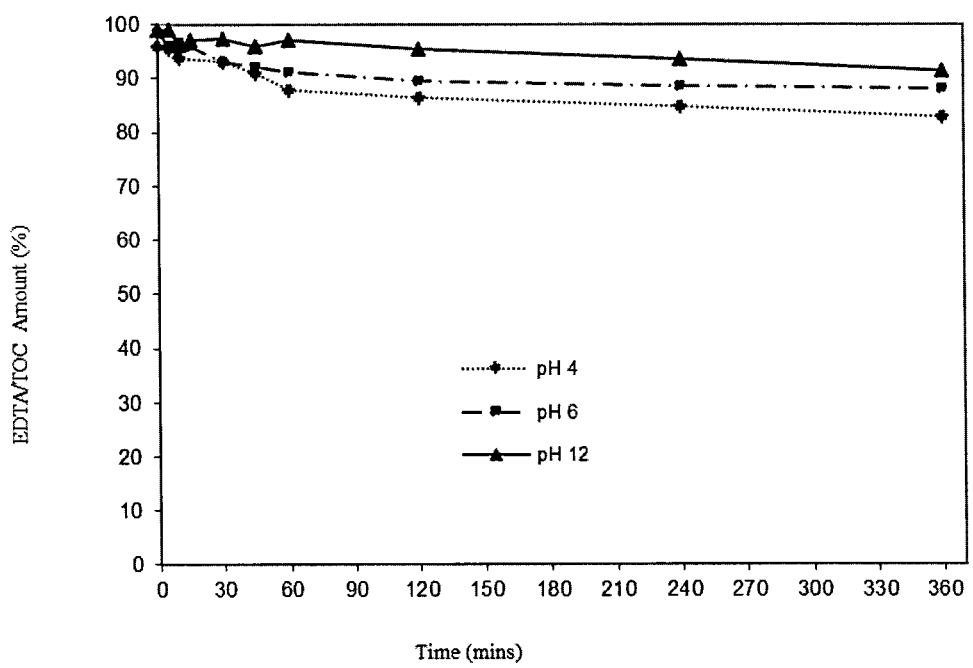
FIG. 11 is a graph of the effect of pH on UV-light photocatalytic oxidation of EDTA.
Figure 12:
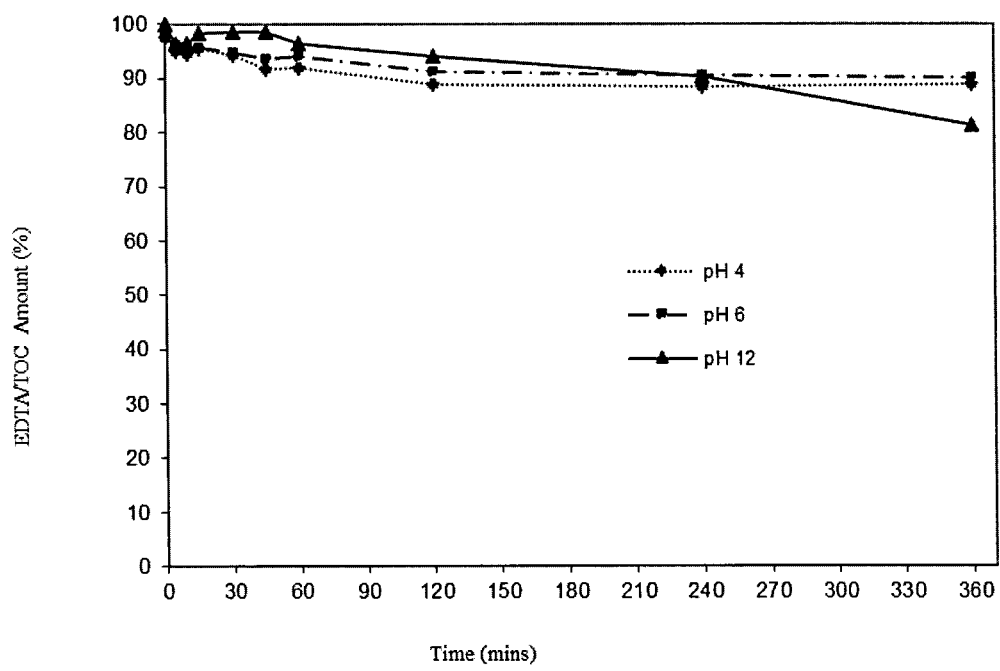
FIG. 12 is a graph of the effect of pH on UV-light photocatalytic oxidation of EDTA.

FIG. 11 and FIG. 12 also show that the photocatalytic oxidation of EDTA (quantified as TOC) also decreases with an increase in pH. FIG. 11 is a graph of the effect of pH on UV-light photocatalytic oxidation of EDTA (20 ppm selenite, 300 ppm EDTA). FIG. 12 is a graph of the effect of pH on UV-light photocatalytic oxidation of EDTA (20 ppm selenate, 300 ppm EDTA). Nevertheless at pH 4 and pH 6, we note higher TOC removal which is indicative of higher EDTA removal. Comparing results from FIG. 9 and FIG. 11, the pH trend of pH 4>pH 6>pH >12 is nearly the same (qualitatively) for both selenite and EDTA species.

Similar is noted for selenate and EDTA findings (FIG. 10 and FIG. 12, respectively) though the overall EDTA removal in this case is somewhat lower as compared to the pH4/6 selenite/EDTA systems, which could be explained, based on lower EDTA adsorption at respective pH values. However, unlike selenite and selenate results at pH 12, we do note significant removal of EDTA in FIG. 12. This indicates degradation of EDTA in the bulk solution phase by diffusing .OH radicals. Nevertheless to remove selenite/selenate species from the aqueous phase the process pH must be low, as noted in FIG. 9 and FIG. 10.

Table 5.1 is presented below.

TABLE 5.1

Effect of pH on UV-light photocatalyst photocatalytic reduction of selenite after 6 h irradiation (20 ppm selenite, 300 ppm EDTA).

| pH | Selenite removal (%) | Selenate formation (%) | Overall removal (%) |
|---|---|---|---|
| pH 4 | 98.7804878 | 0 | 98.7804878 |
| pH 6 | 88.37209302 | 0 | 88.37209302 |
| pH 12 | 16.41791045 | 0 | 16.41791045 |

Table 5.2 is presented below.

TABLE 5.2

Effect of pH on UV-light photocatalytic reduction of selenate after 6 h irradiation (20 ppm selenate, 300 ppm EDTA).

| pH | Selenate removal (%) | Selenite formation (%) | Overall removal (%) |
|---|---|---|---|
| pH 4 | 98.14814815 | 0 | 98.1481 |
| pH 6 | 81.83901201 | 0 | 81.839 |
| pH 12 | 9.433962264 | 0 | 9.43396 |

Figure 64:
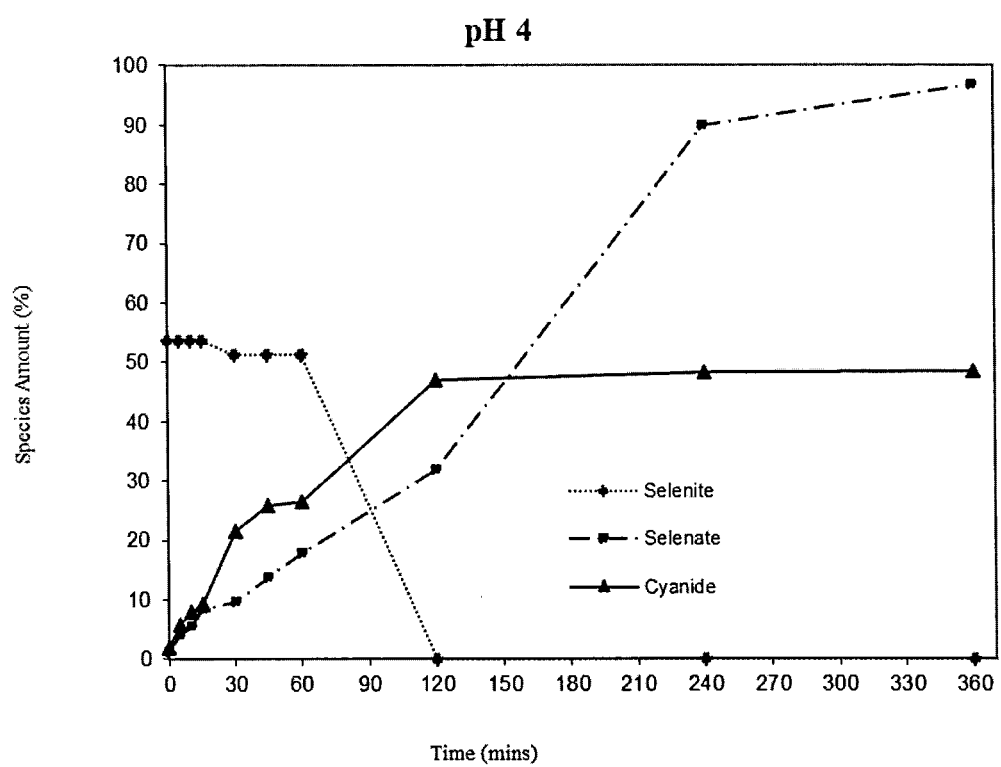
FIG. 64 is a graph of the UV-light photocatalytic reduction of selenite in the presence of thiocyanate at pH 4.
Figure 65:
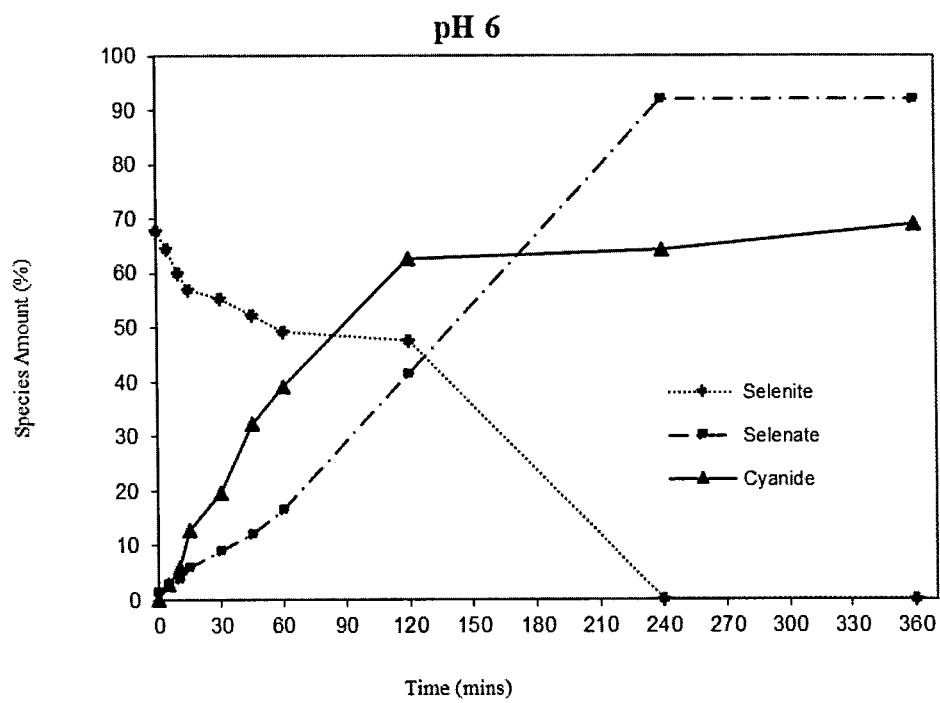
FIG. 65 is a graph of the UV-light photocatalytic reduction of selenite in the presence of thiocyanate at pH 6.
Figure 66:
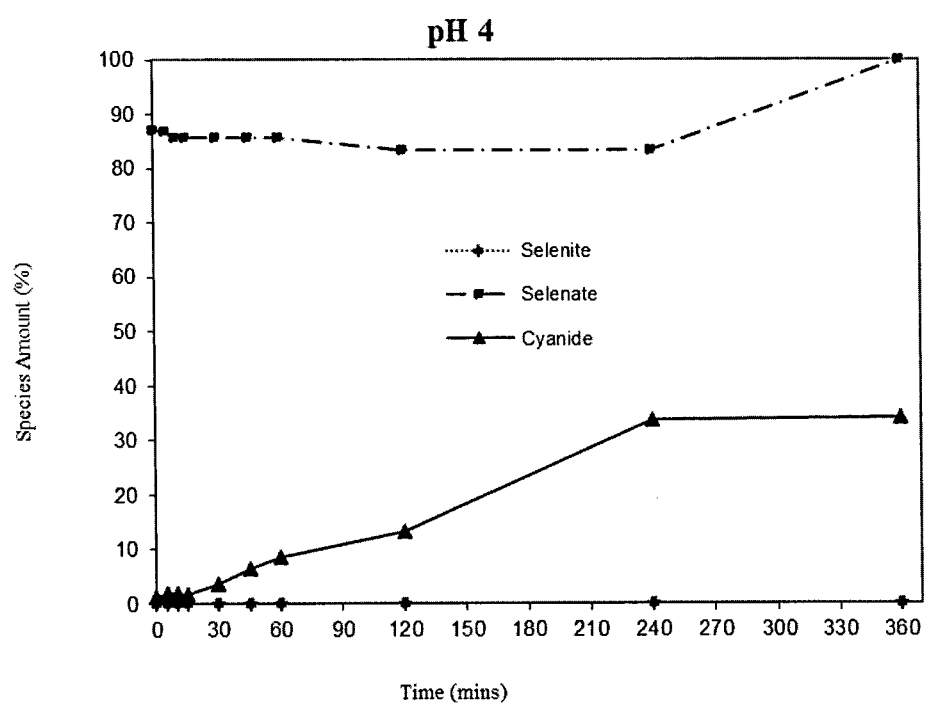
FIG. 66 is a graph of the UV-light photocatalytic reduction of selenate in the presence of thiocyanate at pH 4.
Figure 67:
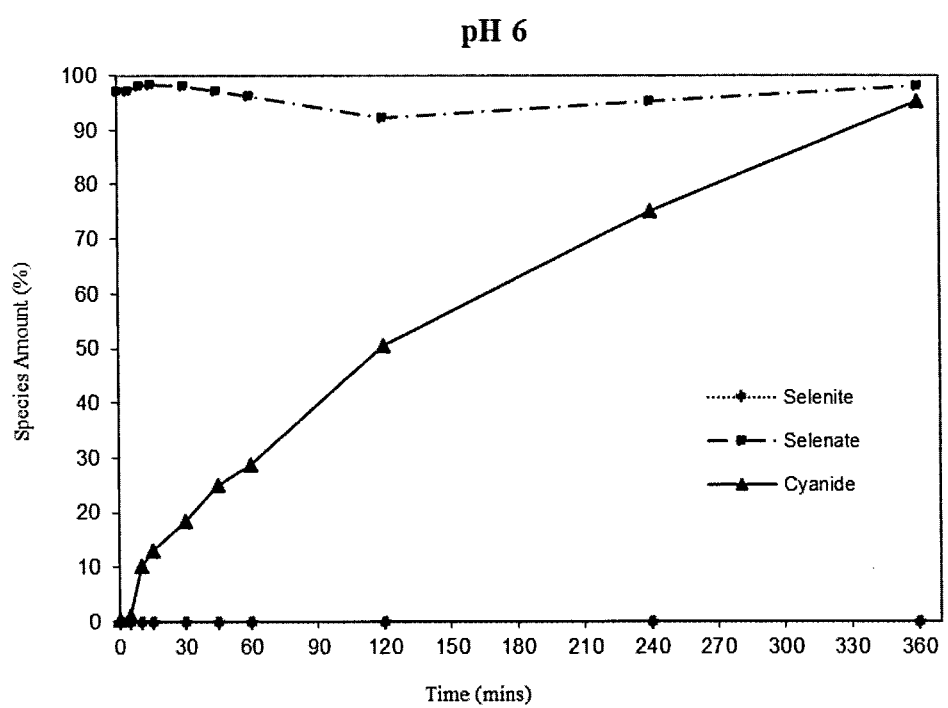
FIG. 67 is a graph of the UV-light photocatalytic reduction of selenate in the presence of thiocyanate at pH 6.

Thiocyanate ($SCN^-$) is also noted as a co-pollutant along with selenium species in effluents from industries such as petroleum refineries. Furthermore role of thiocyanate as h+ species scavenger has also been studied previously (D. Lawless, N. Serpone, and D. Meisel, *Role of hydroxyl radicals and trapped holes in photocatalysis. A pulse radiolysis study*, J. Phys. Chem. 95 (1991), pp. 5166-5170; M. Salmi, N. Tkachenko, V. Vehmanen, R-J Lamminmäki, S. Karvinen, and H. Lemmetyinen, *The effect of calcination on photocatalytic activity of $TiO_2$ particles: femtosecond study*, J. Photochem. and Photobio. A: Chem. 163 (2004), pp. 395-401— each incorporated herein by reference in its entirety). Considering this we further investigated treatment of mixed streams containing both selenium and thiocyanate. The results of the individual experiments for the photocatalytic removal of selenite and selenate at different pH values were reported in FIG. 64-FIG. 67. FIG. 64 is a graph of the UV-light photocatalytic removal of selenite in the presence of thiocyanate (20 ppm selenite, 10 ppm thiocyanate, pH 4). FIG. 65 is a graph of the UV-light photocatalytic removal of selenite in the presence of thiocyanate (20 ppm selenite, 10 ppm thiocyanate, pH 6.) FIG. 66 is a graph of the UV-light photocatalytic removal of selenate in the presence of thiocyanate (20 ppm selenate, 10 ppm thiocyanate, pH 4). FIG. 67 is a graph of the UV-light photocatalytic removal of selenate in the presence of thiocyanate (20 ppm selenate, 10 ppm thiocyanate, pH 6).

Figure 13:
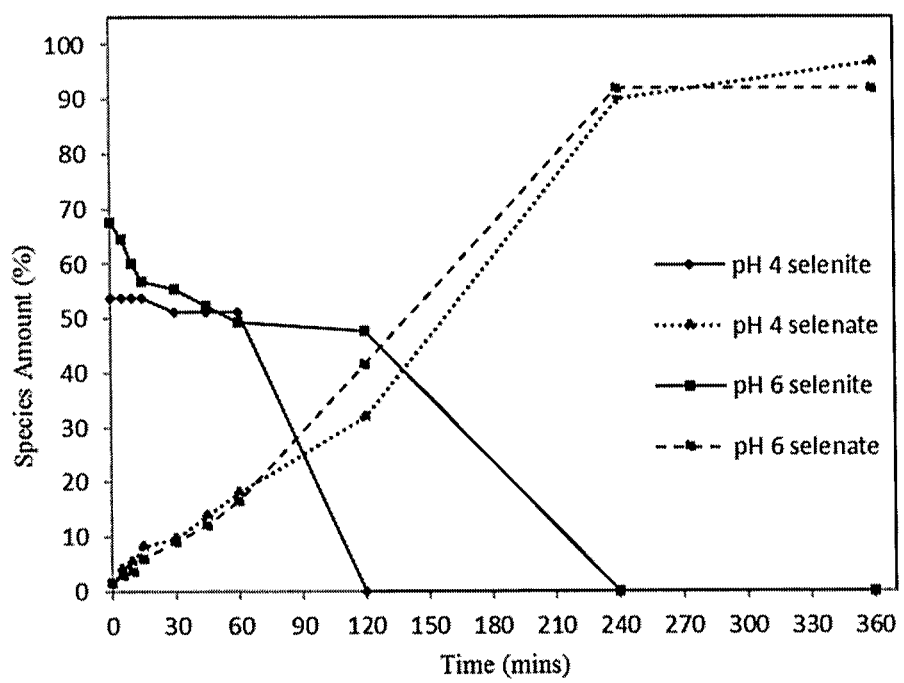
FIG. 13 is a graph of UV-light photocatalytic removal of selenite in the presence of thiocyanate.
Figure 14:
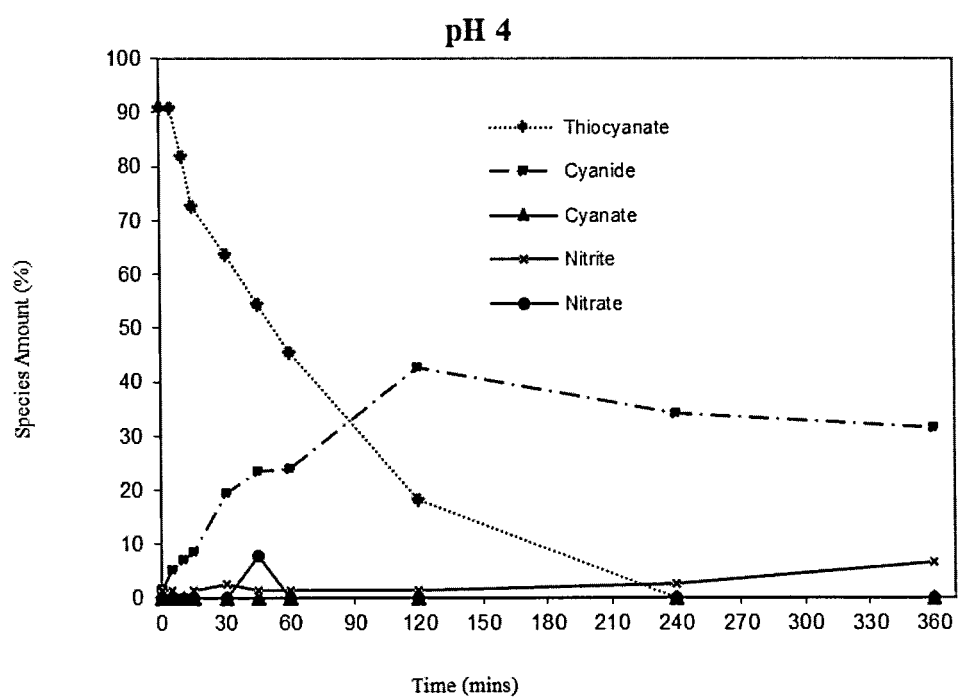
FIG. 14 is a graph of UV-light photocatalytic oxidation of thiocyanate.
Figure 15:
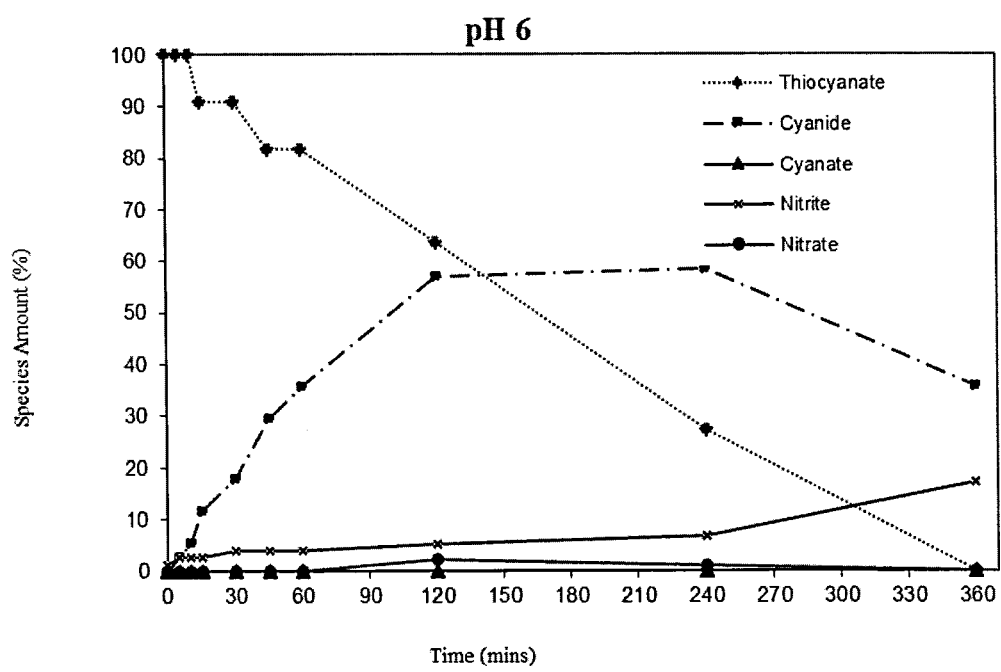
FIG. 15 is a graph of UV-light photocatalytic oxidation of thiocyanate.
Figure 16:
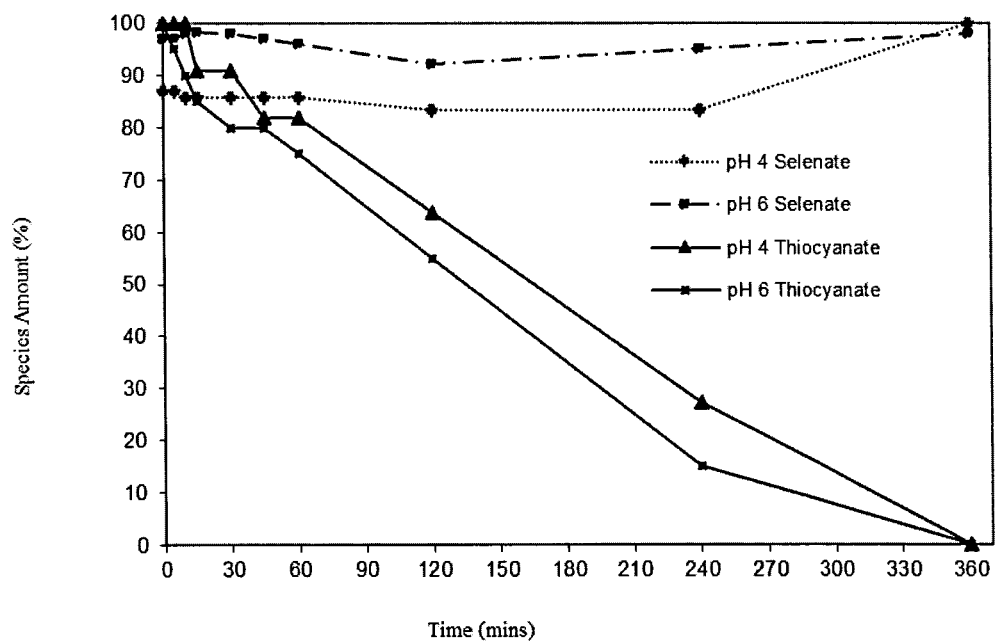
FIG. 16 is a graph of UV-light photocatalytic removal of selenate in the presence of thiocyanate.

FIG. 13 and Table 5.3 which discusses respective systems at pH 4 and pH 6 shows that selenite is rather oxidized to selenate though thiocyanate is also noted to be completely removed at both pH 4 and pH 6 (FIG. 14 and FIG. 15 respectively) possibly via an oxidation path as noted from respective reaction intermediates trends. FIG. 13 is a graph of the UV-light photocatalytic removal of selenite in the presence of thiocyanate (20 ppm selenite, 10 ppm thiocyanate), pH 4 and pH 6. FIG. 14 is a graph of the UV-light photocatalytic oxidation of thiocyanate (20 ppm selenite, 10 ppm thiocyanate, pH 4). FIG. 15 is a graph of the UV-light photocatalytic oxidation of thiocyanate (20 ppm selenite, 10 ppm thiocyanate, pH 6). For example at pH 6, decrease in thiocyanate is followed by an initial increase in intermediate cyanide; however as reaction proceeds cyanide is further converted to $NO_3$ (FIG. 15). Furthermore, it should also be noted that selenite oxidation (to selenate) begins after partial thiocyanate oxidation, indicating a preferential competitive degradation of thiocyanate during the initial phase. Additionally, Table 5.4 and FIG. 16 which provides results for thiocyanate & selenate systems shows negligible selenate removal, whereas thiocyanate is completely removed from the aqueous phase. FIG. 16 is a graph of the UV-light photocatalytic removal of selenate in the presence of thiocyanate (20 ppm selenate, 10 ppm thiocyanate, pH 4 and pH 6).

Table 5.3 is presented below.

TABLE 5.3

Effect of pH on UV-light photocatalytic removal of selenite in the presence of thiocyanate after 6 h irradiation (20 ppm selenite, 10 ppm thiocyanate, pH 4 and pH 6).

| pH | Selenite removal (%) | Selenate formation (%) | Overall removal (%) |
|---|---|---|---|
| 4 | 100 | 96.74916 | 3.250841 |
| 6 | 100 | 92.03603 | 7.96397 |

Table 5.4 is presented below.

TABLE 5.4

Effect of pH on UV-light photocatalytic removal of selenate in the presence of thiocyanate after 6 h irradiation (20 ppm selenate, 10 ppm thiocyanate, pH 4 and pH 6).

| pH | Selenate removal (%) | Selenite formulation (%) | Over all removal (%) |
|---|---|---|---|
| 4 | 0 | 0 | 0 |
| 6 | 1.941748 | 0 | 1.941747573 |

Figure 17:
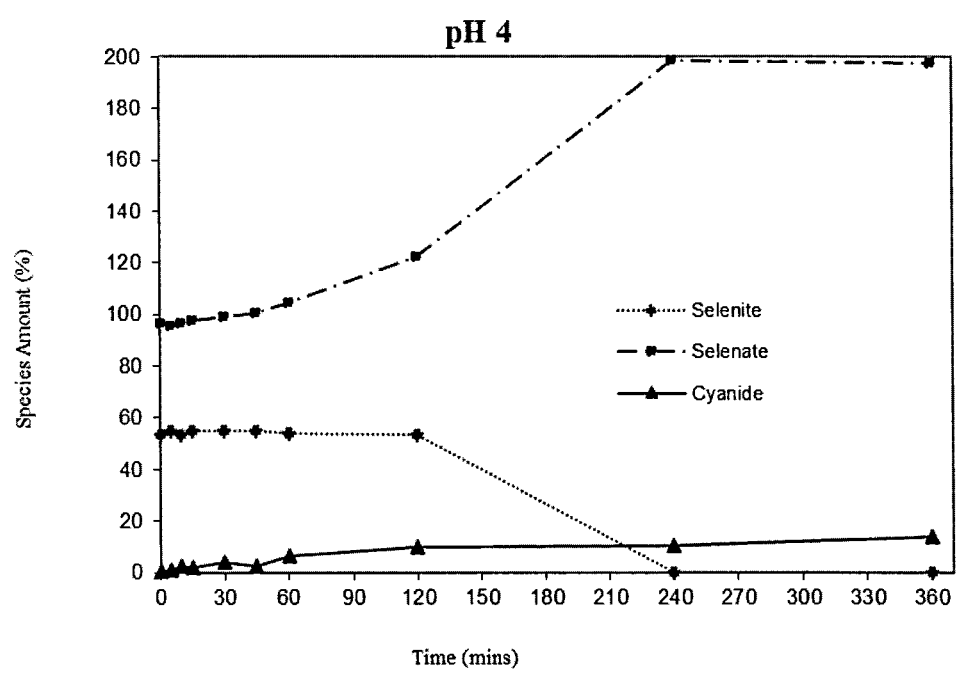
FIG. 17 is a graph of UV-light photocatalytic removal of selenite and selenate in a tertiary system.
Figure 18:
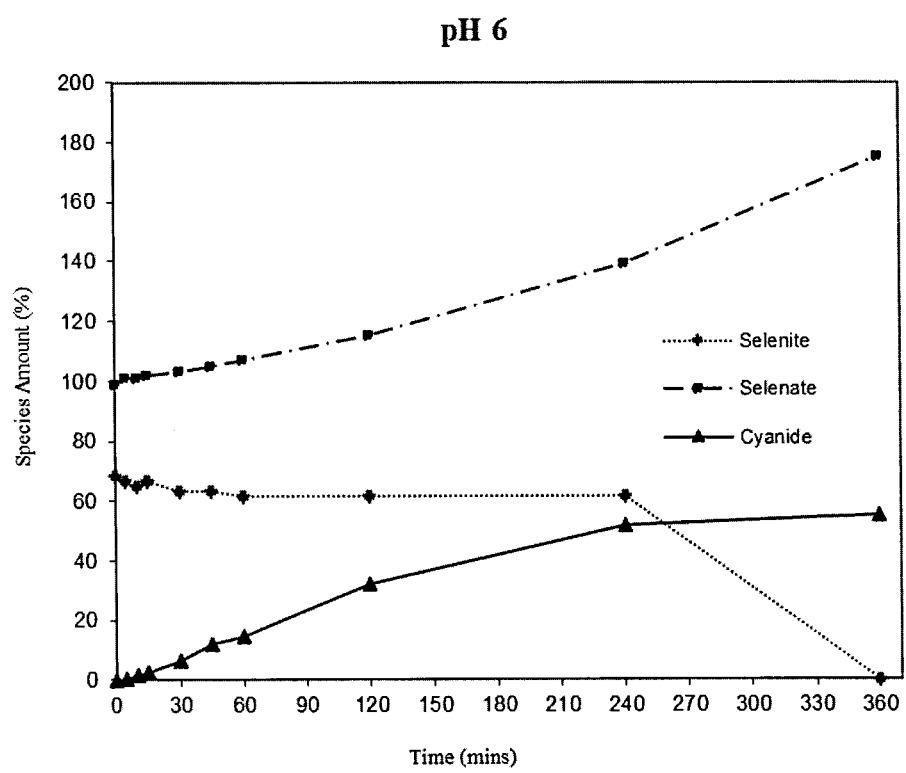
FIG. 18 is a graph of UV-light photocatalytic removal of selenite and selenate in a tertiary system.
Figure 19:
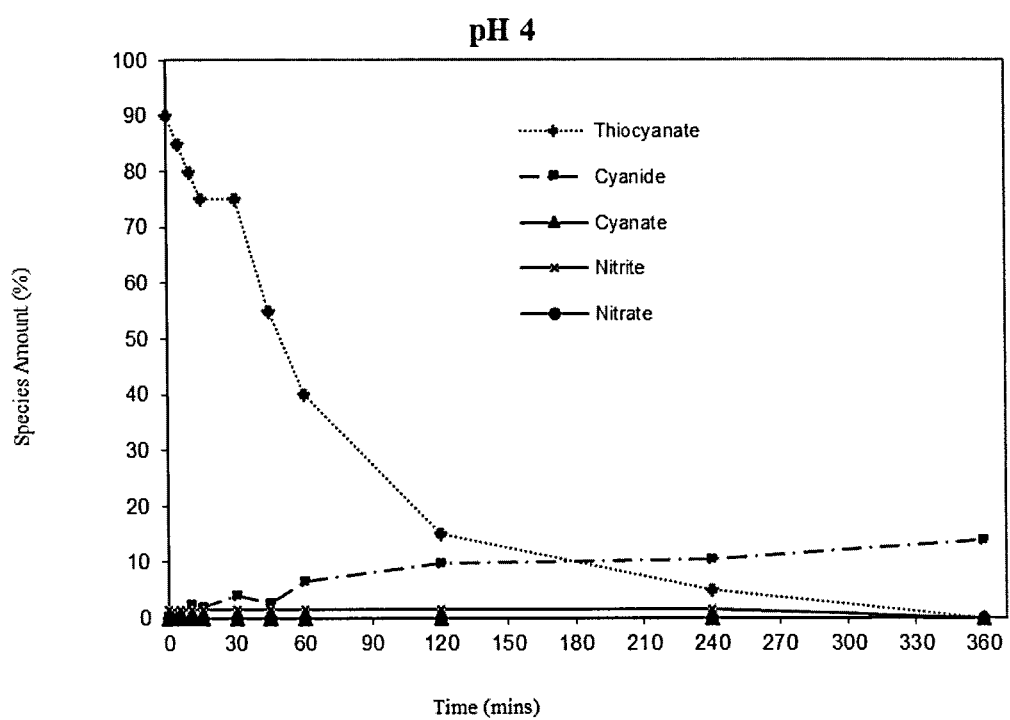
FIG. 19 is a graph of UV-light photocatalytic oxidation of thiocyanate.
Figure 20:
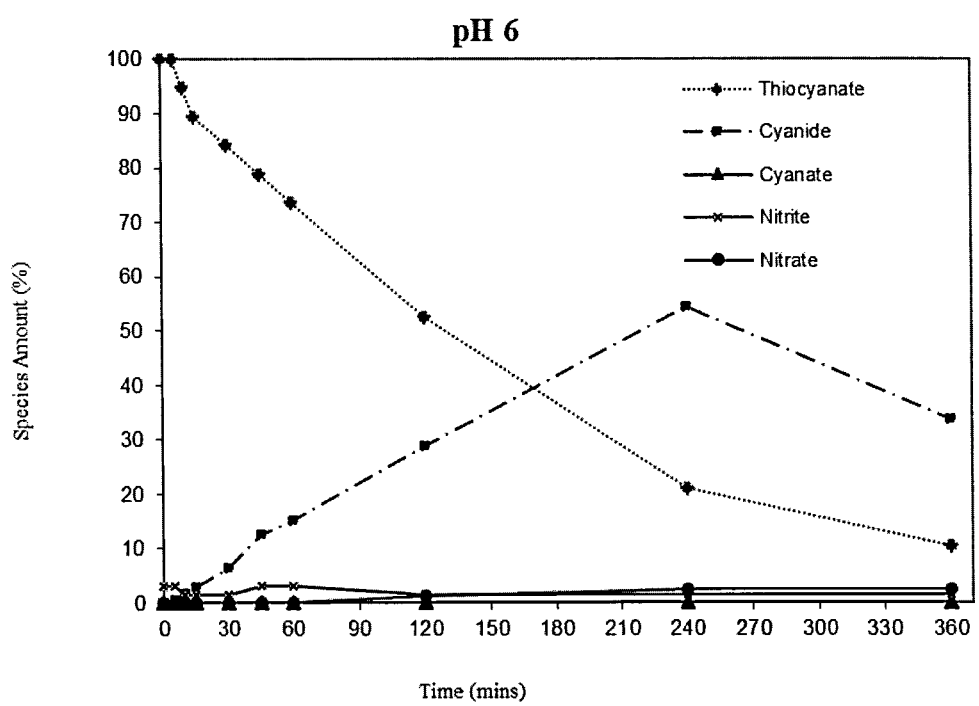
FIG. 20 is a graph of UV-light photocatalytic oxidation of thiocyanate.

We also explored tertiary selenite-selenate-thiocyanate system at pH 4 and pH 6. However similar to the binary systems, role of thiocyanate as a hole scavenger for selenite & selenate reduction initiated removal is not evident though significant thiocyanate removal is noted (FIG. 17, FIG. 18, FIG. 19, and FIG. 20)). FIG. 17 is a graph of the UV-light photocatalytic removal of selenite and selenate in a tertiary system (20 ppm selenite, 20 ppm selenate, 10 ppm thiocyanate, pH 4). FIG. 18 is a graph of the UV-light photocatalytic removal of selenite and selenate in a tertiary system (20 ppm selenite, 20 ppm selenate, 10 ppm thiocyanate, pH 6). FIG. 19 is a graph of the UV-light photocatalytic oxidation of thiocyanate (20 ppm selenite, 20 ppm selenate, 10 ppm thiocyanate, pH 4). FIG. 20 is a graph of the UV-light photocatalytic oxidation of thiocyanate (20 ppm selenite, 20 ppm selenate, 10 ppm thiocyanate, pH 6).

The minimal role of thiocyanate for selenite/selenate reduction could be attributed to its insignificant adsorption on to $TiO_2$ surface. It should be noted that selenate values higher than 100% result because of selenite oxidation to selenate (Table 5.5). Furthermore though delayed oxidation of selenite (to selenate) was noted for the binary systems as well but selenite oxidation did start after partial thiocyanate degradation (FIG. 13, FIG. 14, and FIG. 15). However, in case of tertiary systems (FIG. 17, FIG. 18, FIG. 19, and FIG. 20), selenite conversion starts only after a near complete thiocyanate removal. Hence these tertiary system trends (in conjunction with the binary system findings (FIG. 13, FIG. 14, and FIG. 15) also indicate a preferential thiocyanate oxidation. Nevertheless we conclude that the role of thiocyanate as a h+ scavenger for the reduction of selenite/selenate species, is not feasible. Table 5.5 is presented below.

TABLE 5.5

Effect of pH on UV-light photocatalytic removal of selenite and selenate in a tertiary system after 6 h irradiation (20 ppm selenite, 20 ppm selenate, 10 ppm thiocyanate, pH 4).

| pH | Selenite remaining (%) | Selenate remaining % | Overall removal (%) |
|---|---|---|---|
| 4 | 0 | 197.9116 | 2.088392 |
| 6 | 0 | 175 | 25 |

Figure 68:
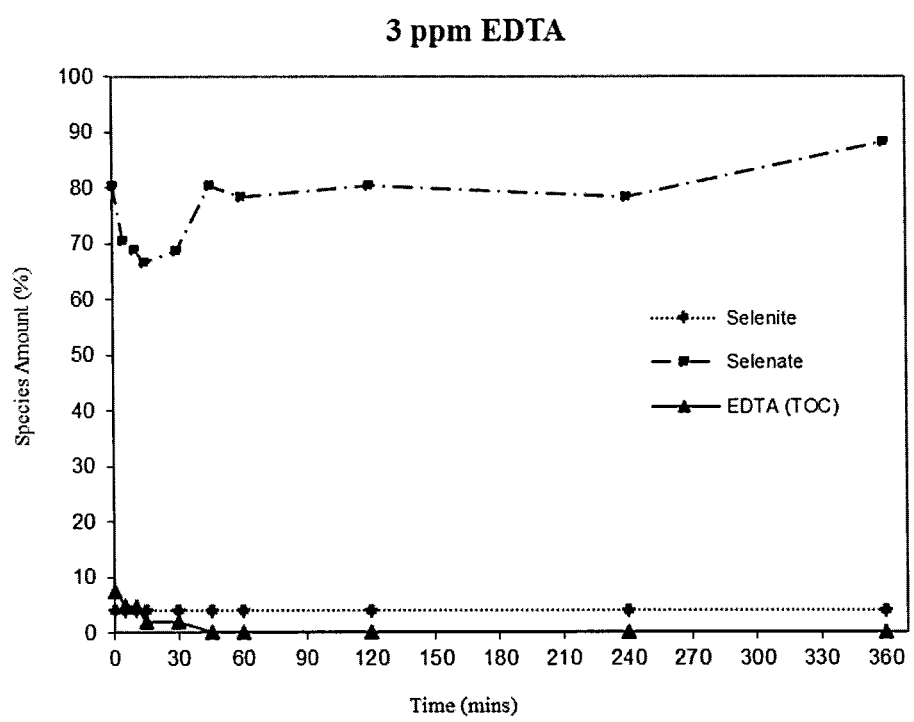
FIG. 68 is a graph of the UV-light photocatalytic reduction of selenite.
Figure 69:
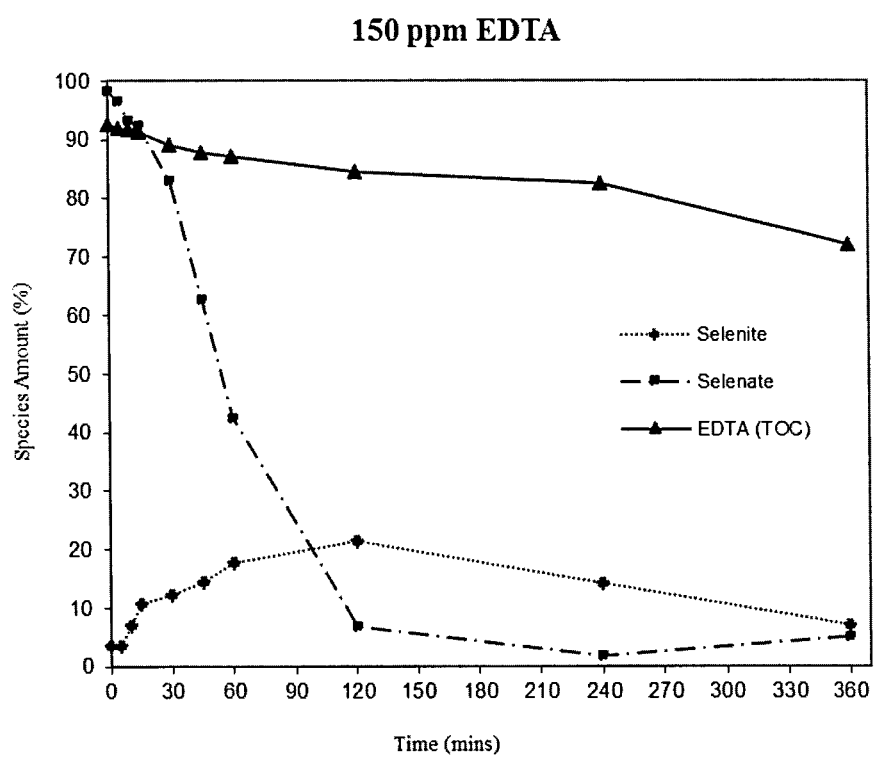
FIG. 69 is a graph of the UV-light photocatalytic reduction of selenite.
Figure 70:
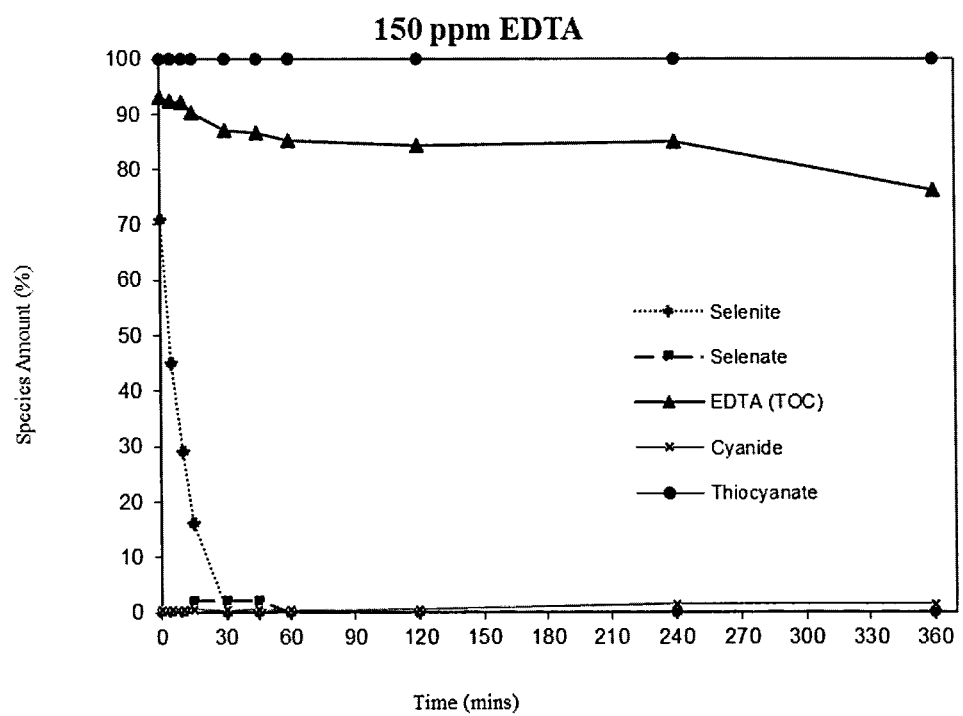
FIG. 70 is a graph of the UV-light photocatalytic reduction of selenite in the presence of thiocyanate.
Figure 71:
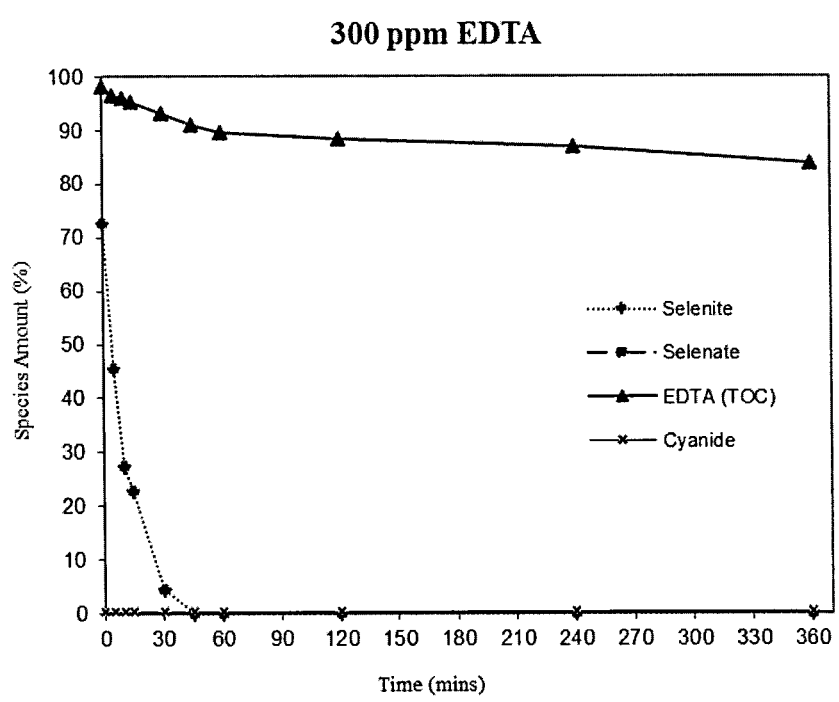
FIG. 71 is a graph of the UV-light photocatalytic reduction of selenite in the presence of thiocyanate.
Figure 72:
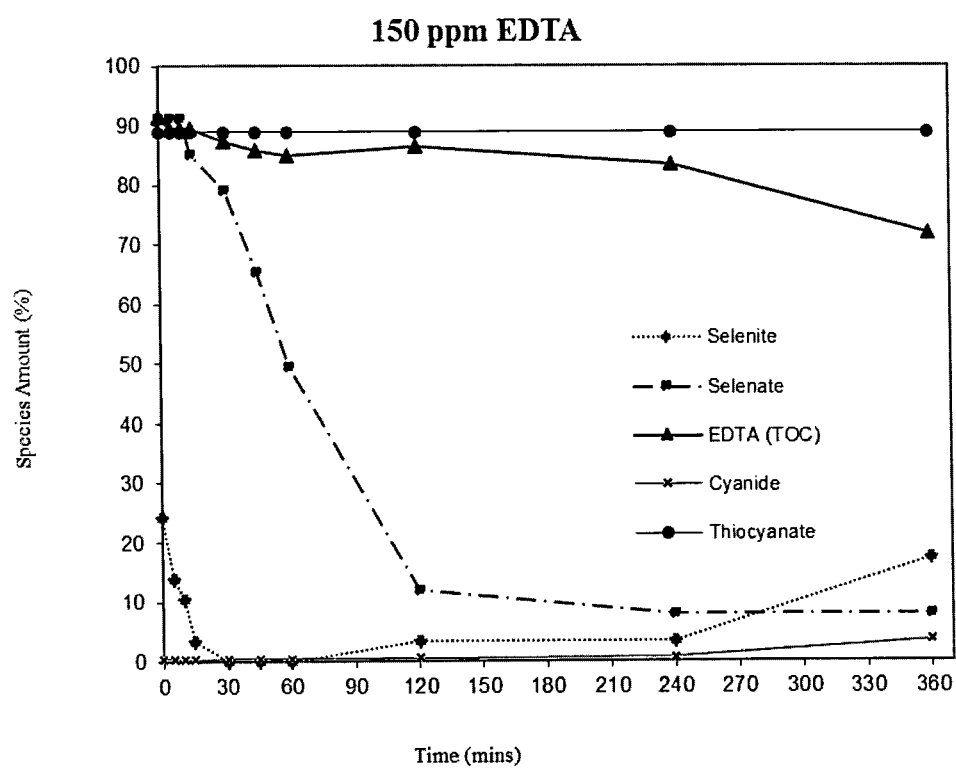
FIG. 72 is a graph of the UV-light photocatalytic reduction of selenate in the presence of thiocyanate.
Figure 73:
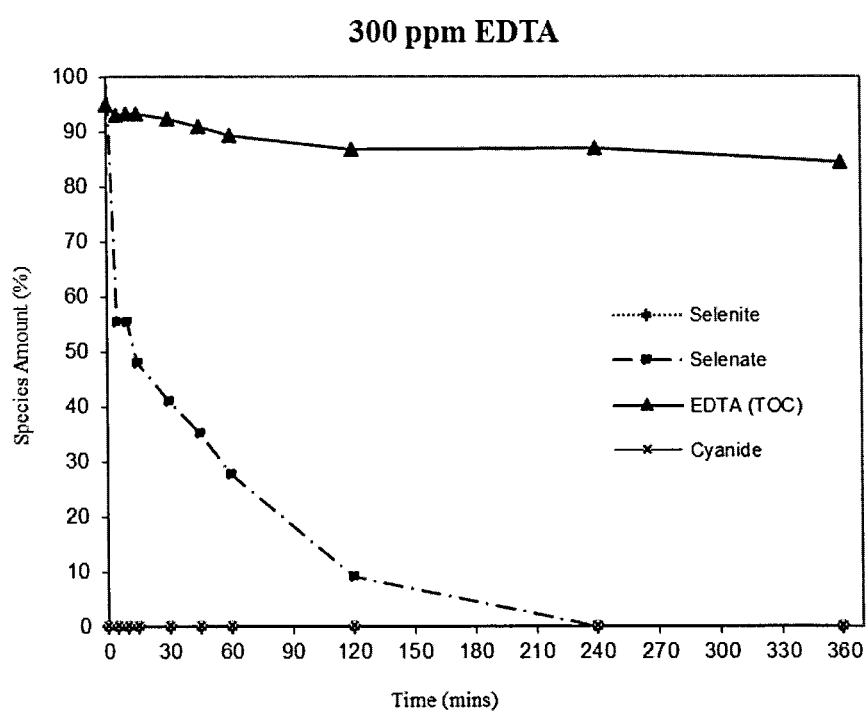
FIG. 73 is a graph of the UV-light photocatalytic reduction of selenate in the presence of thiocyanate.
Figure 74:
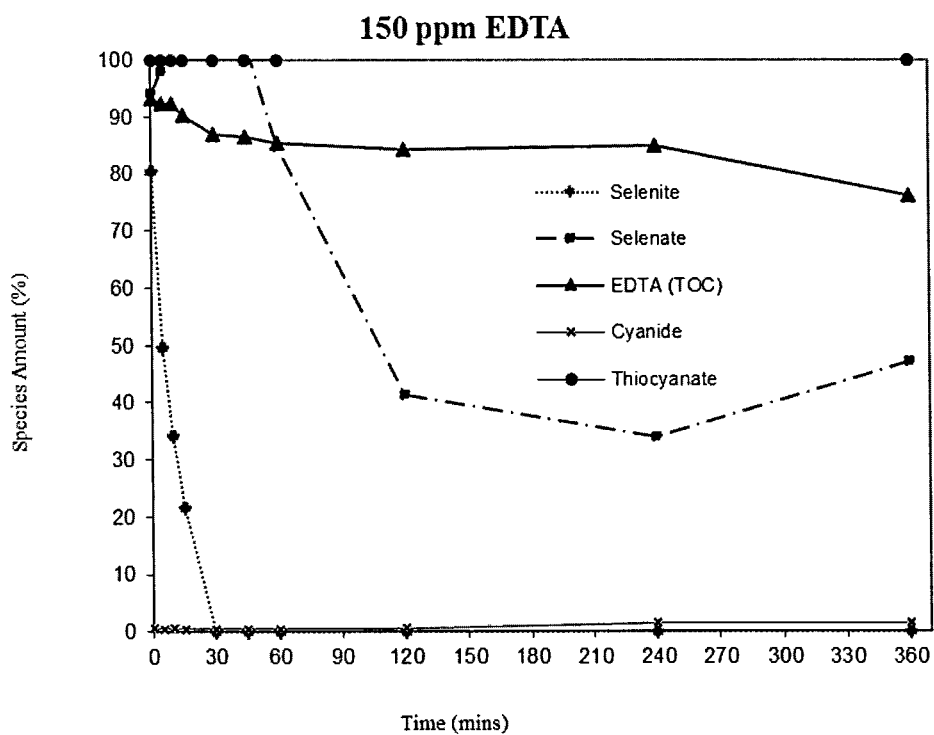
FIG. 74 is a graph of the UV-light photocatalytic removal of selenite and selenate in a mixed system.
Figure 75:
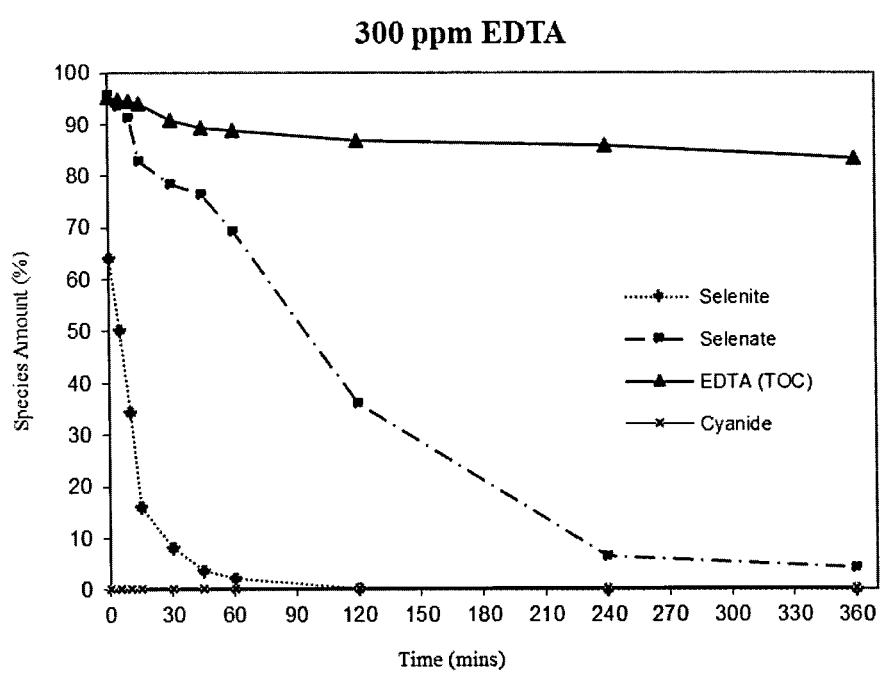
FIG. 75 is a graph of the UV-light photocatalytic removal of selenite and selenate in a mixed system.
Figure 76:
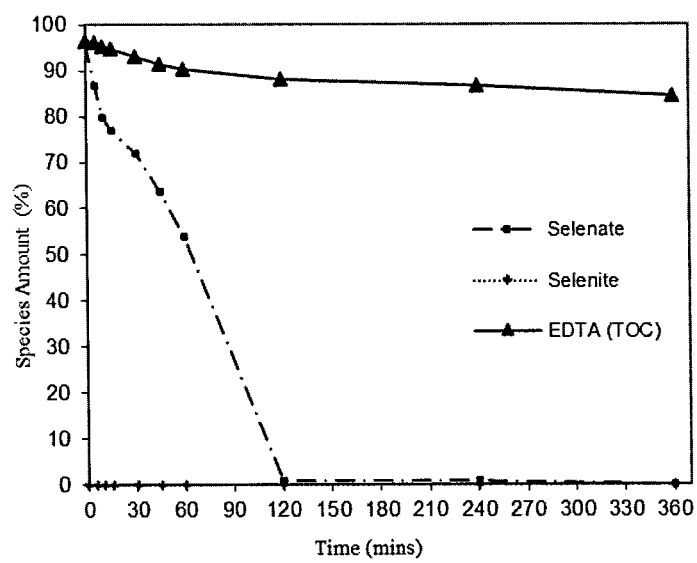
FIG. 76 is a graph of the UV-light photocatalytic reduction of selenate.

The effect of EDTA concentration onto selenate reduction was also explored, to gain further insight into respective process. These experiments were completed at the optimum pH value of 4 and the results are shown in FIG. 68-FIG. 76. FIG. 68 is a graph of the UV-light photocatalytic reduction of selenate (20 ppm selenate, 3 ppm EDTA, pH 4). FIG. 69 is a graph of the UV-light photocatalytic reduction of selenate (20 ppm selenate, 150 ppm EDTA, pH 4). FIG. 70 is a graph of the UV-light photocatalytic reduction of selenite in the presence of thiocyanate (20 ppm selenite, 150 ppm EDTA, 10 ppm thiocyanate, pH 4). FIG. 71 is a graph of the UV-light photocatalytic reduction of selenite in the presence of thiocyanate (20 ppm selenite, 300 ppm EDTA, 10 ppm thiocyanate, pH 4). FIG. 72 is a graph of the UV-light photocatalytic reduction of selenate in the presence of thiocyanate (20 ppm selenate, 150 ppm EDTA, 10 ppm thiocyanate, pH 4). FIG. 73 is a graph of the UV-light photocatalytic reduction of selenate in the presence of thiocyanate (20 ppm selenate, 300 ppm EDTA, 10 ppm thiocyanate, pH 4). FIG. 74 is a graph of the UV-light photocatalytic removal of selenite and selenate in a mixed system (20 ppm selenite, 20 ppm selenate, 150 ppm EDTA, 10 ppm thiocyanate, pH 4). FIG. 75 is a graph of the UV-light photocatalytic removal of selenite and selenate in a mixed system (20 ppm selenite, 20 ppm selenate, 300 ppm EDTA, 10 ppm thiocyanate, pH 4). FIG. 76 is a graph of the UV-light photocatalytic reduction of selenate (100 ppm selenate, 300 ppm EDTA, pH 4).

Figure 21:
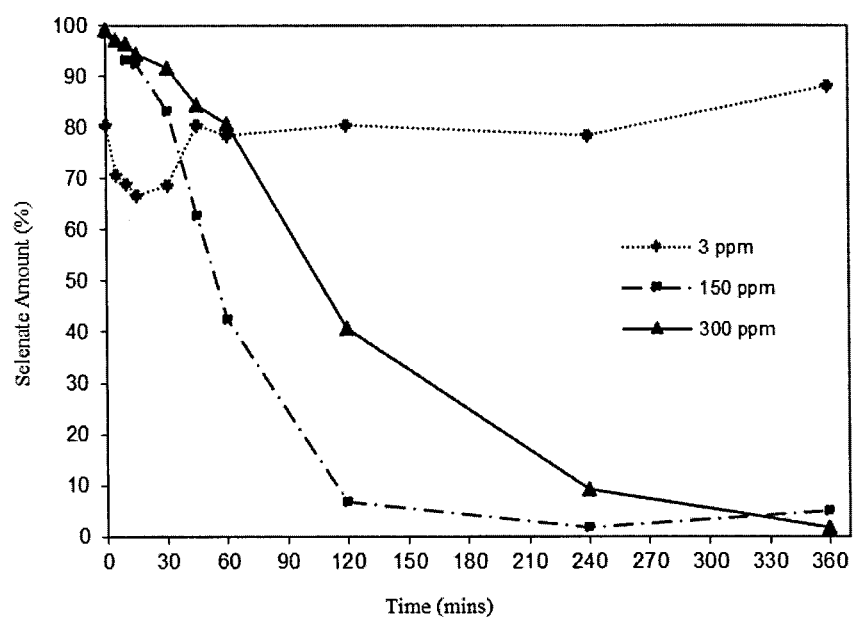
FIG. 21 is a graph of the effect of EDTA concentration on UV-light photocatalytic reduction of selenate.
Figure 22:
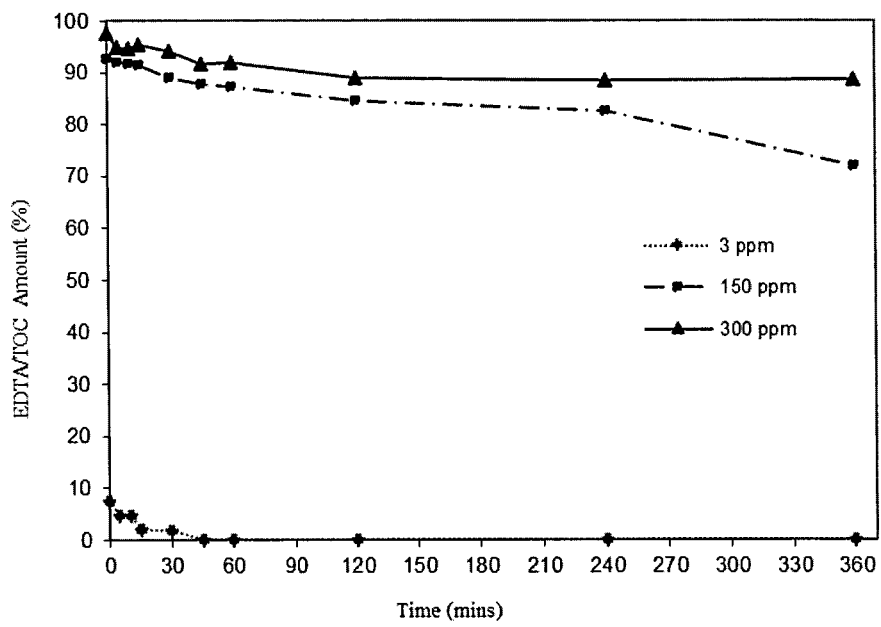
FIG. 22 is a graph of UV-light photocatalytic oxidation of EDTA.

FIG. 21 is a graph of the effect of EDTA concentration on UV-light photocatalytic reduction of selenate (20 ppm selenate, pH 4). FIG. 21 which summarizes the respective findings shows that approximately 33% selenate reduction at 3 ppm initial EDTA concentration after 15 minutes irradiation; the photoreduction was reversed as EDTA is almost completely oxidized leading to a negligible reduction at 6 h reaction time. The rate of the photoreduction however increases as the EDTA concentration is increased from 3 to 150 ppm with near complete removal noted at 6 hour. A Further increase in the EDTA concentration from 150 to 300 ppm leads to slower selenate removal kinetics, though near complete selenate removal is noted at higher reaction time. This possibly results because of increased occupation of $TiO_2$ surface sites by the EDTA species at the expense of selenate thus resulting in latter's slower removal. Table 5.6 shows that overall selenate removal at 3, 150 and 300 ppm initial EDTA concentrations are 7.67%, 87.79% and 98.14% respectively after 6 h irradiation. The respective TOC removal trends (FIG. 22) indicate complete oxidation in case of 3 ppm EDTA within 30 min. FIG. 22 is a graph of the UV-light photocatalytic oxidation of EDTA: Effect of initial EDTA concentration (20 ppm selenate, pH 4). However the percent EDTA removal decreases with an increase in its initial concentration. Still on a mass basis, higher EDTA removal does transpire at higher EDTA initial concentration.

Table 5.6 is presented below.

TABLE 5.6

Effect of EDTA concentration on UV-light photocatalytic removal selenate after 6 h reaction time (20 ppm selenate, pH 4).

| EDTA Concentration (ppm) | Selenate removal (%) | Selenite formation (%) | Overall removal (%) |
|---|---|---|---|
| 3 ppm | 11.76470588 | 4.099272032 | 7.66543385 |
| 150 ppm | 94.91525424 | 7.127864322 | 87.78738992 |
| 300 ppm | 98.14814815 | 0 | 98.14814815 |

Figure 23:
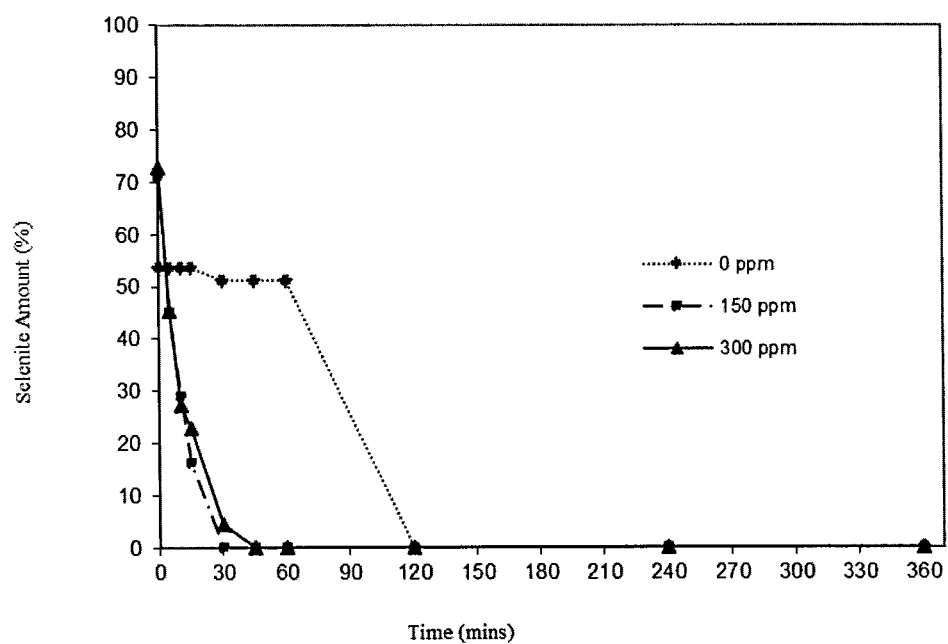
FIG. 23 is a graph of the effect of EDTA concentration on UV-light photocatalytic reduction of selenite in selenite-EDTA-thiocyanate systems.
Figure 24:
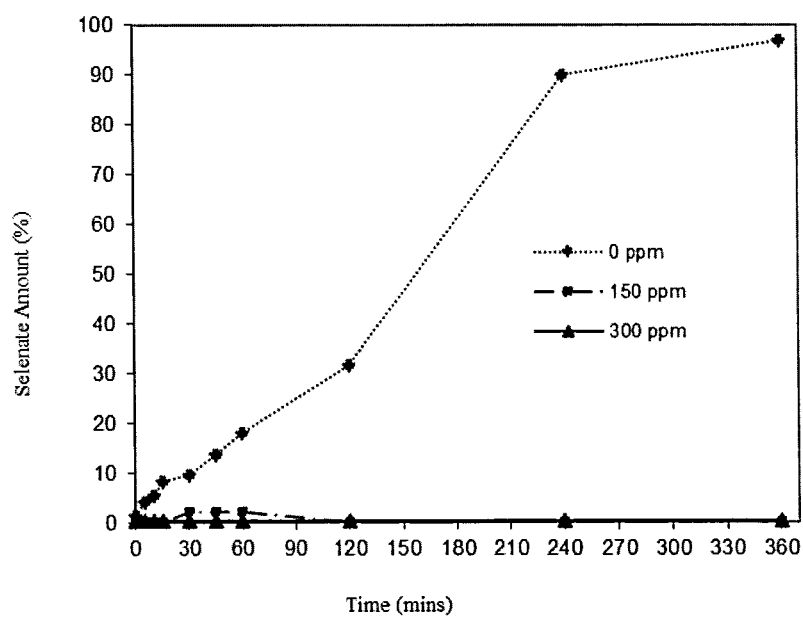
FIG. 24 is a graph of the effect of EDTA concentration on UV-light photocatalytic selenate formation in selenite-EDTA-thiocyanate systems.

We further explore the effect of initial EDTA concentration on the removal of the anions in the presence of thiocyanate. These experiments were also conducted at the optimum pH value of 4 and initial thiocyanate concentration of 10 ppm. FIG. 23 and FIG. 24 show that at 0 ppm initial EDTA concentration, selenite is oxidized to selenate as discussed earlier. FIG. 23 is a graph of the effect of EDTA concentration on UV-light photocatalytic reduction of selenite in selenite-EDTA-thiocyanate systems (20 ppm selenite, 10 ppm thiocyanate, pH 4). FIG. 24 is a graph of the effect of EDTA concentration on UV-light photocatalytic selenate formation in selenite-EDTA-thiocyanate systems (20 ppm selenite, 10 ppm thiocyanate, pH 4). An introduction of 150 ppm EDTA concentration lead to near complete selenite removal within 30 minutes of irradiation. An increase in the EDTA concentration from 150 to 300 ppm leads to slower selenite removal kinetics, though near complete selenate removal is noted at higher reaction time (45 minutes). Overall selenite removal (Table 5.7) at 0, 150 and 300 ppm initial EDTA concentrations are 3.25%, 100% and 99.70% respectively.

Figure 25:
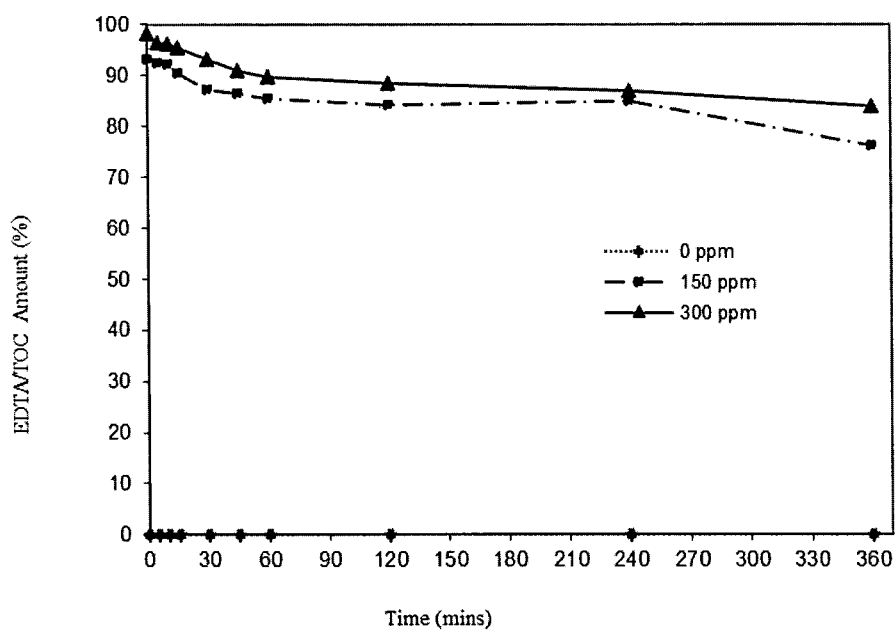
FIG. 25 is a graph of UV-light photocatalytic oxidation of EDTA in selenite-EDTA-thiocyanate systems.

FIG. 25 is a graph of the UV-light photocatalytic oxidation of EDTA in selenite-EDTA-thiocyanate systems: Effect of initial EDTA concentration (20 ppm selenite, 10 ppm thiocyanate, pH 4). FIG. 25 shows that percent EDTA (TOC) removal decreases with an increase in its initial concentration. Similar to the earlier findings, on mass bases, higher EDTA removal transpires at higher initial concentrations. Though thiocyanate is almost completely removed in the case of 0 ppm initial EDTA concentration, its concentration is almost unchanged in the case of 150 ppm and 300 ppm initial EDTA concentration. This is because of competitive removal of the organics which favors EDTA removal because of its higher adsorption comparatively. However, increase in the initial EDTA concentration lead to an increase in selenate removal in contrast to the case of selenite as shown in FIG. 26.

Figure 26:
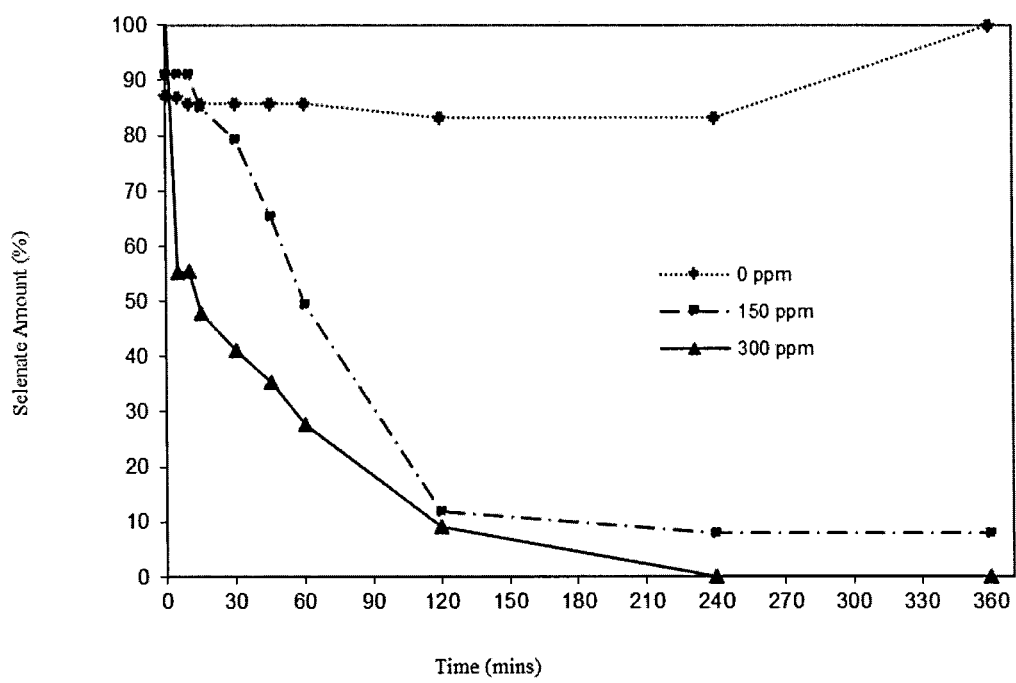
FIG. 26 is a graph of the effect of EDTA concentration on UV-light photocatalytic reduction of selenate in selenate-EDTA-thiocyanate systems.

FIG. 26 is a graph of the effect of EDTA concentration on UV-light photocatalytic reduction of selenate in selenate-EDTA-thiocyanate system (20 ppm selenate, 10 ppm thiocyanate, pH 4). This might be as a result of the fact that selenate adsorption is negligible and hence its reduction is not affected by the increase in the adsorption of EDTA. As discussed earlier, negligible selenate removal transpires at 0 ppm initial EDTA concentration. Approximately 92% selenate removal transpires at 150 ppm initial EDTA concentration and increasing the concentration from 150 ppm to 300 ppm lead to near complete removal of selenate after 6 h irradiation. However, taking selenite formation into account, the overall selenate removal (Table 5.8) at 0, 150, and 300 ppm initial EDTA concentrations were 0%, 74.82% and 100% respectively.

Figure 27:
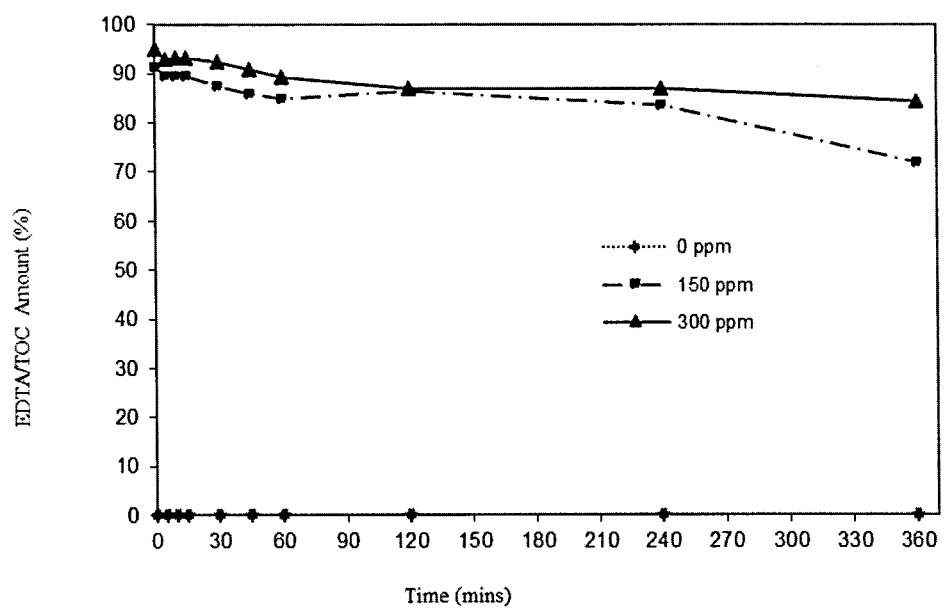
FIG. 27 is a graph of UV-light photocatalytic oxidation of EDTA in selenate-EDTA-thiocyanate system.

FIG. 27 is a graph of the UV-light photocatalytic oxidation of EDTA in selenate-EDTA-thiocyanate systems: Effect of initial EDTA concentration (20 ppm selenate, 10 ppm thiocyanate, pH 4). FIG. 27 also shows similar trend in EDTA (TOC) removal to that observed in FIG. 25 in the case of selenite. The effect of initial EDTA concentration on selenite-selenate-thiocyanate system was also investigated. The findings were similar to the individual selenite-thiocyanate and selenate-thiocyanate systems. At 0 ppm initial EDTA concentration, selenite oxidizes to selenate there by increasing selenate concentration to almost 200% at 6 h irradiation as shown in FIG. 28.

Figure 28:
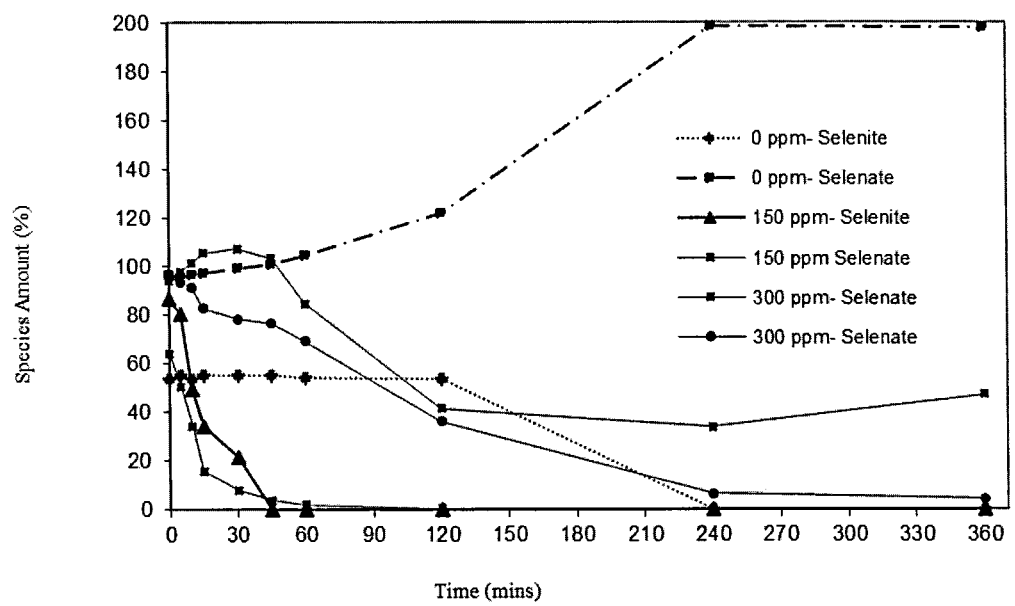
FIG. 28 is a graph of the effect of EDTA concentration on UV-light photocatalytic reduction of tertiary system.

FIG. 28 is a graph of the effect of EDTA concentration on UV-light photocatalytic reduction of tertiary system (20 ppm selenite, 20 ppm selenate, 10 ppm thiocyanate, pH 4). Upon the addition of 150 ppm initial EDTA concentration, selenite was completely removed within 30 minutes while selenate was partially removed. A lag in selenate reduction was noticed in this case; with selenate reduction only noticed after disappearance of selenite. This testify that competitive removal exist between the anions. Increase in the initial EDTA concentration from 150 ppm to 300 ppm lead to decreased selenite reduction and increased selenate reduction as in the case of the individual systems. However, overall removal at 0, 150 and 300 ppm initial EDTA concentrations were 1.04%, 76.47% and 97.87% respectively.

Figure 29:
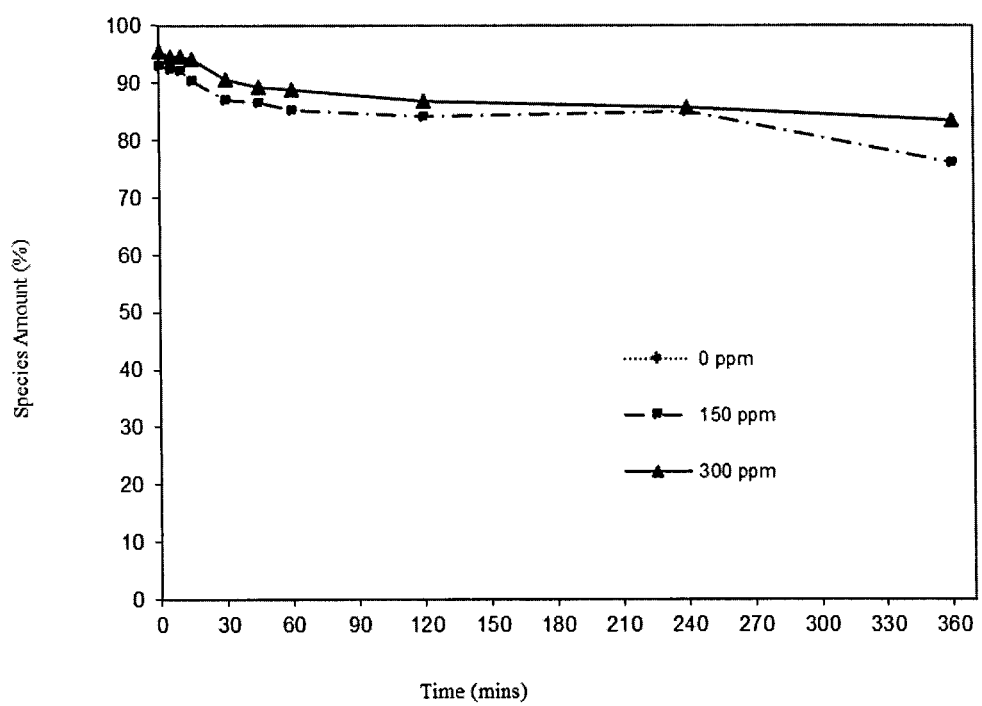
FIG. 29 is a graph of UV-light photocatalytic oxidation of EDTA in tertiary system.

FIG. 29 is a graph of the UV-light photocatalytic oxidation of EDTA in tertiary system: Effect of initial EDTA concentration (20 ppm selenite, 20 ppm selenate, 300 ppm EDTA, 10 ppm thiocyanate, pH 4). FIG. 29 that EDTA (TOC) removal also follows similar trend to the ones observed in the selenite-thiocyanate and selenate-thiocyanate systems.

Table 5.7 is presented below.

TABLE 5.7

Effect of EDTA concentration on UV-light photocatalytic removal of selenite in selenite-EDTA-thiocyanate systems after 6 hours irradiation (20 ppm selenite, 10 ppm thiocyanate, pH 4).

| EDTA concentration (ppm) | Selenite removal (%) | Selenate formation (%) | Overall removal (%) |
|---|---|---|---|
| 0 | 100 | 96.74916 | 3.250841175 |
| 150 | 100 | 0 | 100 |
| 300 | 100 | 0.310209 | 99.68979107 |

Table 5.8 is presented below.

TABLE 5.8

Effect of EDTA concentration on UV-light photocatalytic removal of selenate in selenate-EDTA-thiocyanate systems after 6 hours irradiation (20 ppm selenate, 10 ppm thiocyanate, pH 4).

| EDTA concentration (ppm) | Selenate removal (%) | Selenite formation (%) | Over all removal (%) |
|---|---|---|---|
| 0 | 0 | 0 | 0 |
| 150 | 92.07674 | 17.25437 | 74.82237856 |
| 300 | 100 | 0 | 100 |

Table 5.9 is presented below.

TABLE 5.9

Effect of EDTA concentration on UV-light photocatalytic reduction of tertiary system after 6 h irradiation (20 ppm selenite, 20 ppm selenate, 10 ppm thiocyanate, pH 4).

| EDTA concentration (ppm) | Selenite remaining (%) | Selenate remaining (%) | Overall removal (%) |
|---|---|---|---|
| 0 | 0 | 197.9116 | 1.044196 |
| 150 | 0 | 47.05912 | 76.47044 |
| 300 | 0 | 4.255319 | 97.87234 |

The effect of initial selenate concentration is now disclosed. Additional experiment was conducted at 100 ppm initial selenate concentration. A. As discussed earlier, about 98% selenate removal transpires at 20 ppm initial selenate concentration. Increasing the initial concentration to 100 ppm increases the photoreduction rate thereby leading to near complete removal as shown in FIG. 30 and Table 5.10.

Figure 30:
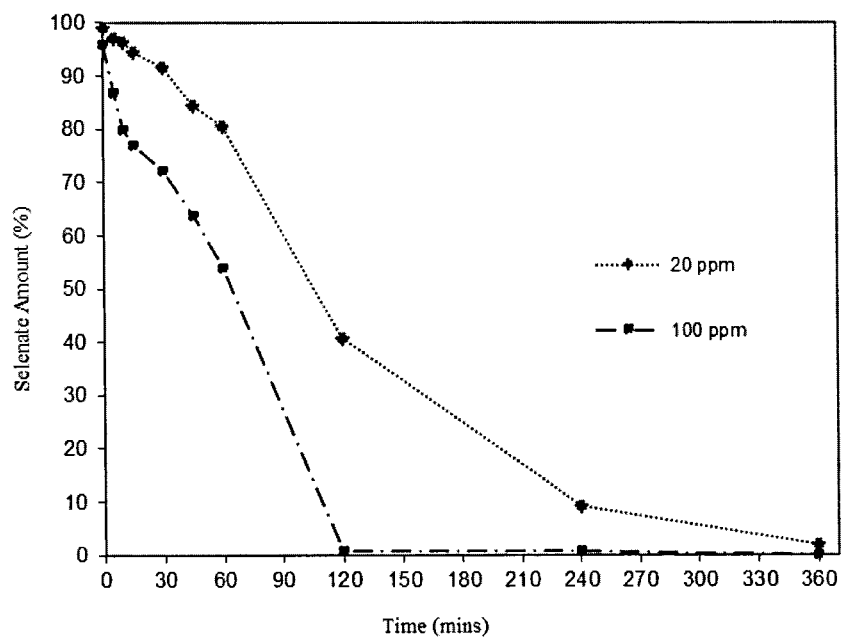
FIG. 30 is a graph of the effect of initial selenate concentration on UV-light photocatalytic reduction of selenate.

FIG. 30 is a graph of the effect of initial selenate concentration on UV-light photocatalytic reduction of selenate (300 ppm EDTA, pH 4). The photo-reduction rate is observed to be high at elevated initial selenate concentration. A similar observation was made by Sanuki et al when selenate concentration was increased from 50 to 100 ppm. They attributed the noted higher reduction to increased adsorption of the selenate ions. High selenate removal as noted in FIG. 30 even at 100 ppm initial concentration indicates that the methodology presented and discussed in this paper is highly efficient.

Figure 31:
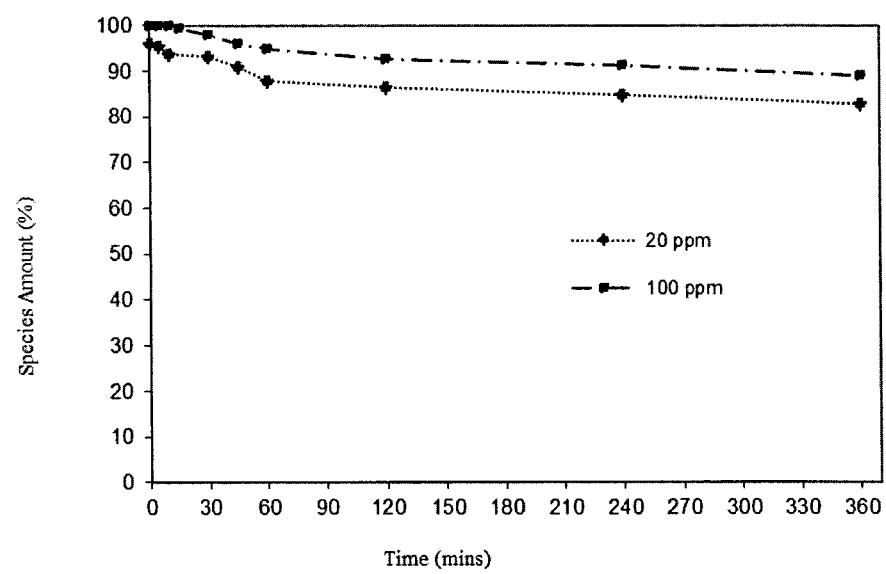
FIG. 31 is a graph of the effect of initial selenate concentration on UV-light photocatalytic oxidation of EDTA.

FIG. 31 is a graph of the effect of initial selenate concentration on UV-light photocatalytic oxidation of EDTA (300 ppm EDTA, pH 4). The corresponding EDTA (TOC) removal (FIG. 31) indicated higher adsorption for 20 ppm and hence overall higher removal. This is as a result of increased competitive adsorption between EDTA and selenate at elevated selenate concentration. In summary, results from the current UV light work show that both selenite and selenate can be successfully removed from the respective wastewater streams using EDTA as a hole scavenger under a varying set of conditions.

Table 5.10 is presented below.

TABLE 5.10

Effect of initial selenate concentration on UV-light photocatalytic reduction of selenate after 6 h irradiation (300 ppm EDTA, pH 4).

| Initial selenate concentration (ppm) | Selenate removal (%) | Selenite formation (%) | Overall removal (%) |
|---|---|---|---|
| 20 | 100 | 0 | 100 |
| 100 | 98.14815 | 0 | 98.14815 |

Using the solar energy and the respective findings from photocatalytic removal of selenite are disclosed. Initially, the photoreduction of selenite was studied at three different pH values and the respective results are given in FIG. 77-FIG. 79.

Figure 77:
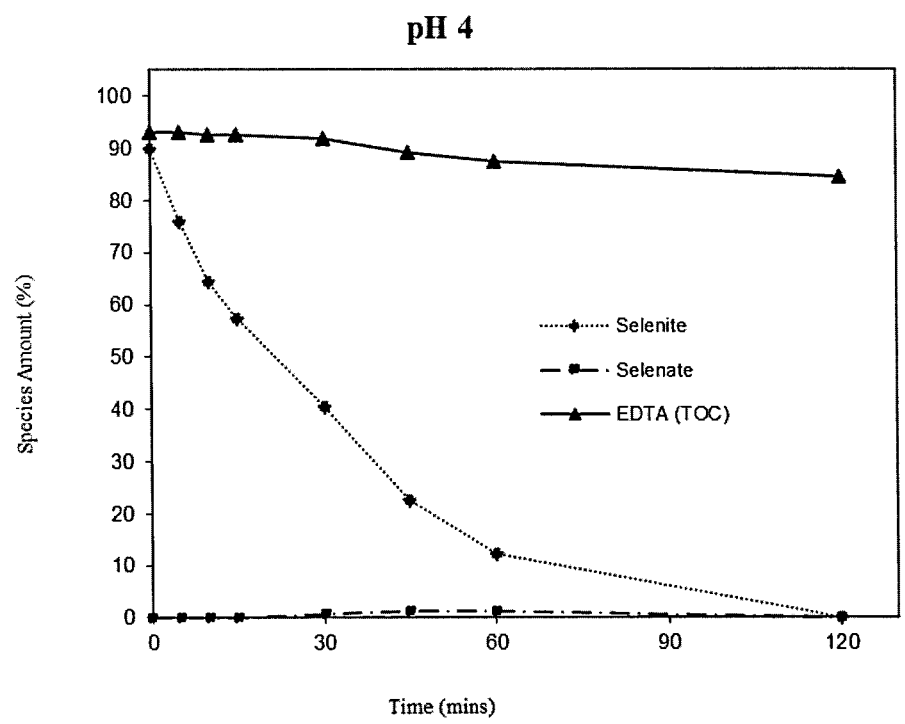
FIG. 77 is a graph of the 'Species remaining' trends as noted during solar photocatalysis of selenite/EDTA system at pH 4.
Figure 78:
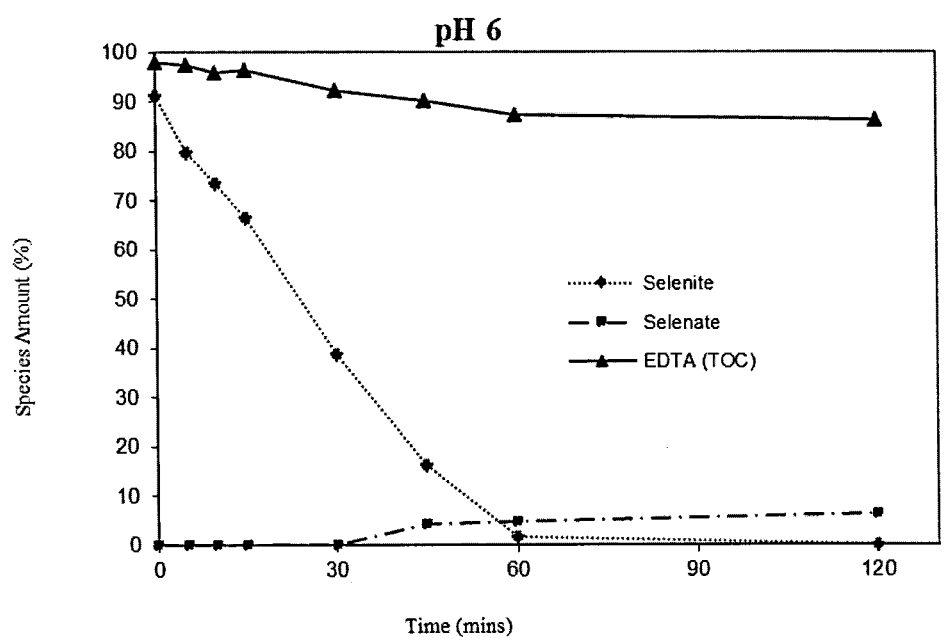
FIG. 78 is a graph of the 'Species remaining' trends as noted during solar photocatalysis of selenite/EDTA system at pH 6.
Figure 79:
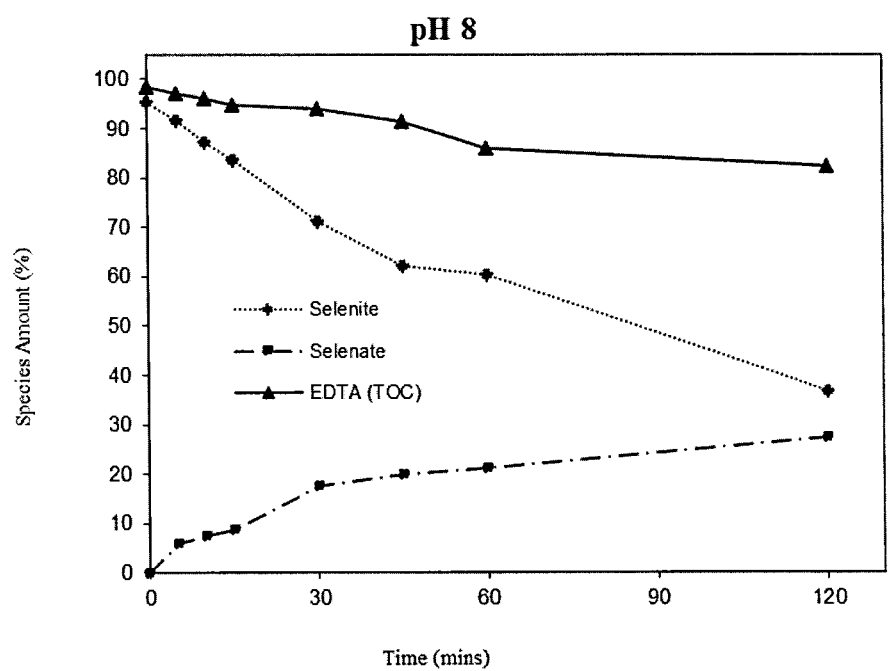
FIG. 79 is a graph of the 'Species remaining' trends as noted during solar photocatalysis of selenite/EDTA system at pH 8.

FIG. 77 is a graph of the 'Species remaining' trends as noted during solar photocatalysis of selenite/EDTA system at pH 4 (20 ppm selenite, 150 ppm EDTA, 0.25 g/L $TiO_2$, pH 4.) FIG. 78 is a graph of the 'Species remaining' trends as noted during solar photocatalysis of selenite/EDTA system at pH 6 (20 ppm selenite, 150 ppm EDTA, 0.25 g/L $TiO_2$, pH 6.) FIG. 79 is a graph of the 'Species remaining' trends as noted during solar photocatalysis of selenite/EDTA system at pH 8 (20 ppm selenite, 150 ppm EDTA, 0.25 g/L $TiO_2$, pH 8).

Figure 32:
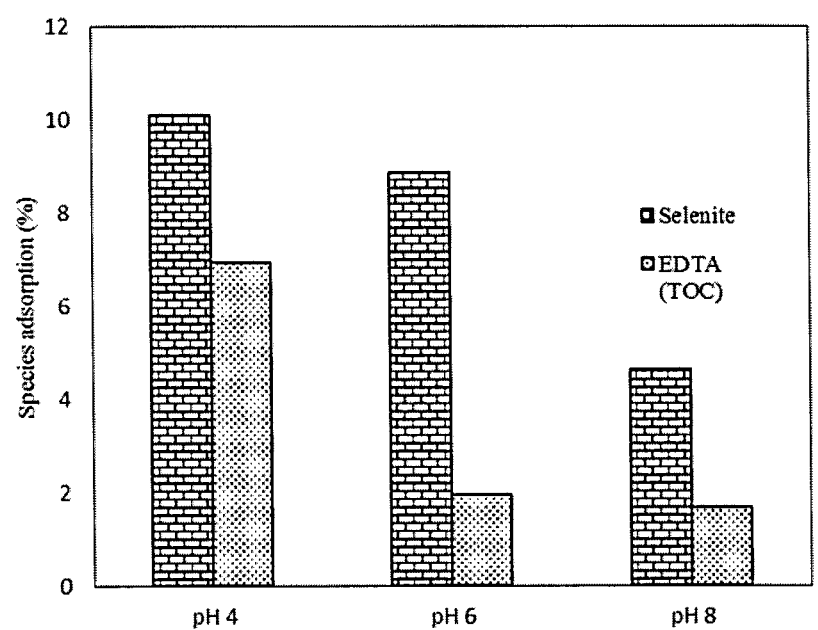
FIG. 32 is a graph of the effect of pH onto initial adsorption (at time zero) onto $TiO_2$ for selenite/EDTA system.

FIG. 32 is a graph of the effect of pH onto initial adsorption (at time zero) onto $TiO_2$ for selenite/EDTA system (20 ppm selenite, 150 ppm EDTA, 0.25 g/L $TiO_2$). FIG. 32 shows the effect of pH onto initial selenite and EDTA removal. Similar to the findings in the case of UV-energized experiments, the initial removal of both selenite and EDTA decreases with an increase in initial pH from pH 4/6 to 8. The respective removals at time zero corresponds to % adsorbed on the $TiO_2$ surface. Selenite shows relatively higher initial adsorption compared to EDTA at all pH values. As already described earlier in FIG. 8, the surface of $TiO_2$ (Degussa P25) is predominantly negatively charged at pH values above 6.25 and predominantly positively charged at pH values below 6.25. This results into an electrostatic attraction between $TiO_2$ particles and anionic species at lower pH values and vice versa thereby typically resulting into higher adsorption in the acidic pH range. Furthermore with competitive adsorption of OH ions is i also expected at higher pH values. Hence the above mentioned electrostatic interactions and competitive $OH^-$ adsorption leads to decreased selenite and EDTA adsorption and in turn decreased reduction of selenite oxidation of EDTA results at elevated pH.

Figure 33:
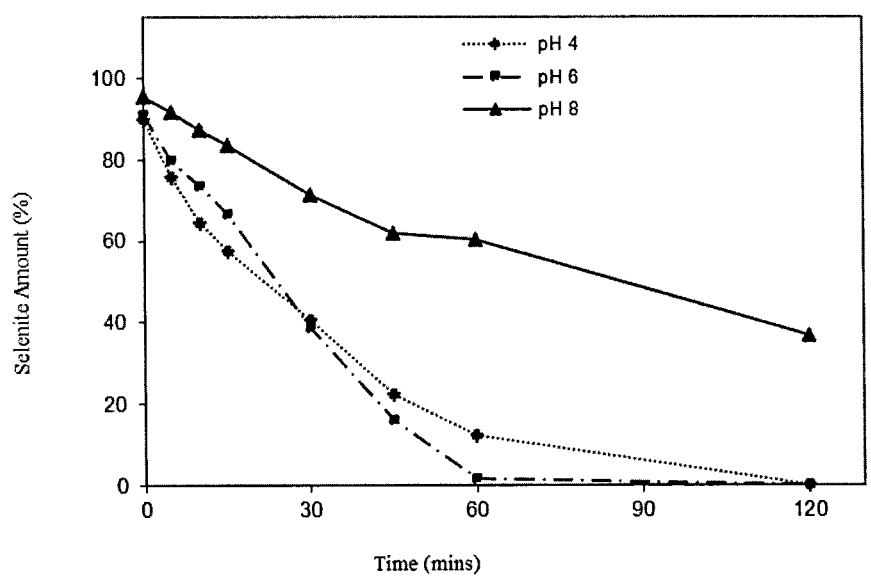
FIG. 33 is a graph of the effect of pH onto photocatalytic removal of selenite.

FIG. 33 is a graph of the effect of pH onto photocatalytic removal of selenite (20 ppm selenite, 150 ppm EDTA, 0.25 g/L TiO2). FIG. 33 summarizes the respective solar PCD results for selenite at pH 4, 6 and 8. Near complete selenite removal is achieved at 2 hours irradiation both at pH 4 and pH 6. Though decreased adsorption of both selenite and EDTA is noted as the pH is increased from 4 to 6 however this does not seem to have a significant effect onto selenite removal. It should also be noted that the available solar light intensity at pH 6 is higher than at pH 4 (FIG. 36), which may compensate for the respective low adsorption at pH 6 and yield high selenite removal at pH 6.

Figure 34:
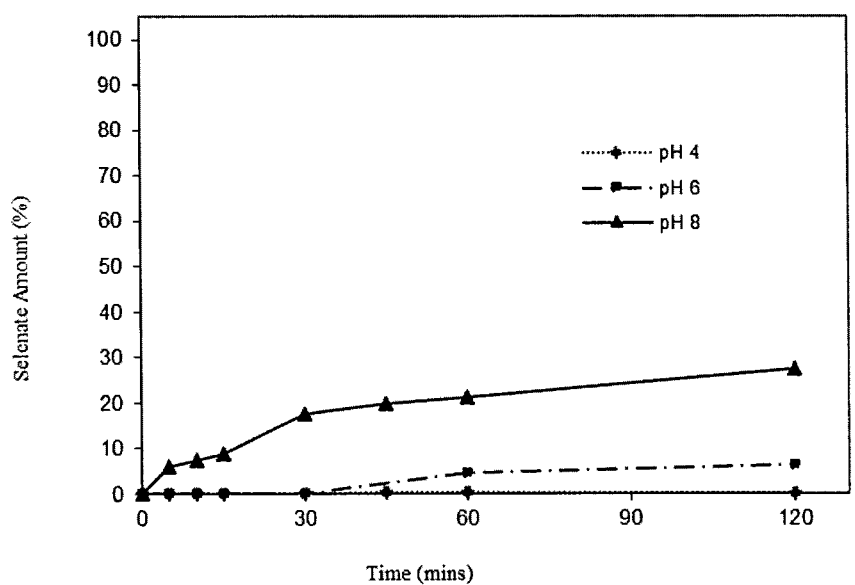
FIG. 34 is a graph of the effect of pH onto selenate formation during photocatalytic removal of selenite.
Figure 35:
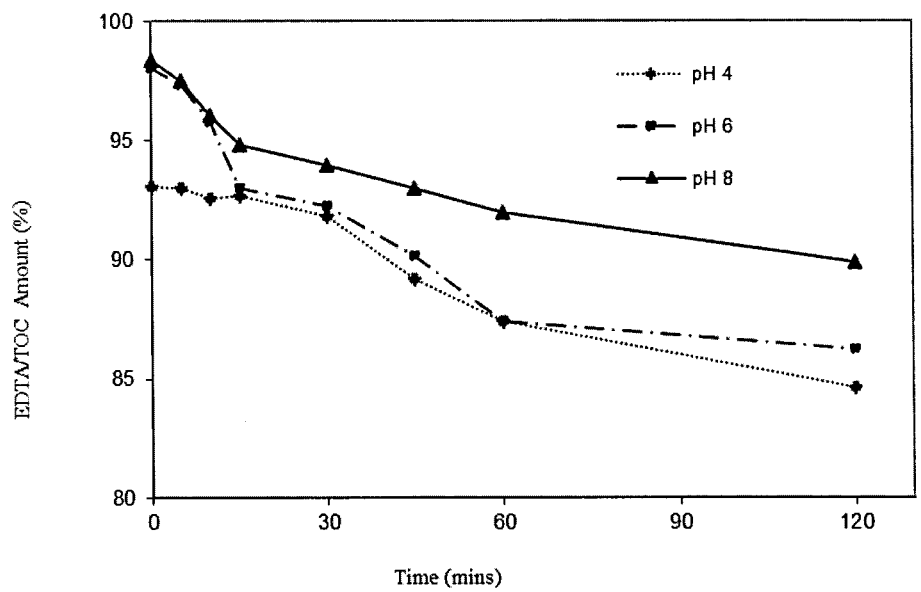
FIG. 35 is a graph of the effect of pH onto EDTA (TOC) degradation during photocatalytic removal of selenite.
Figure 36:
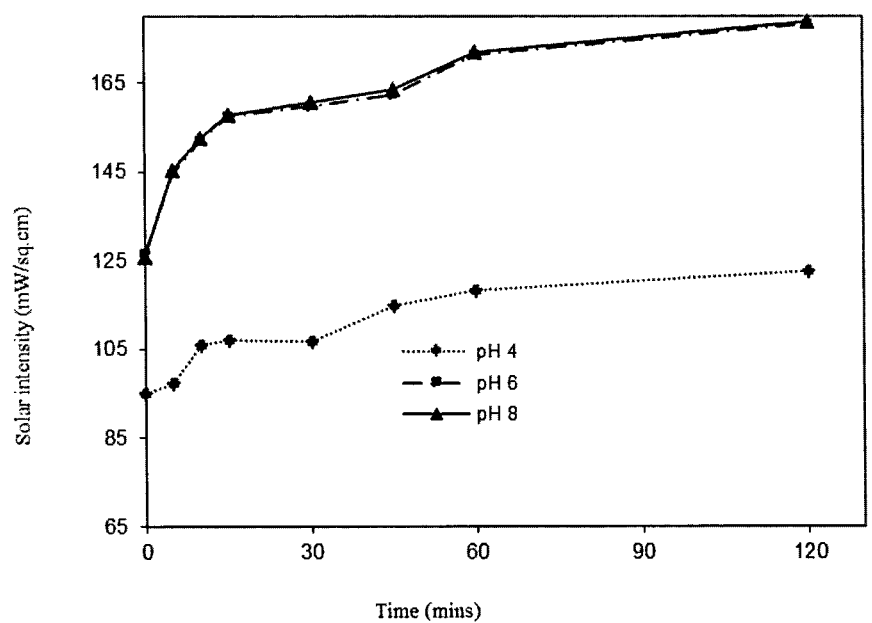
FIG. 36 is a graph of the solar intensity ($mW/cm^2$) variations during photocatalytic removal of selenite.

FIG. 36 is a graph of the solar intensity ($mW/cm^2$) variations during photocatalytic removal of selenite (20 ppm selenite, 150 ppm EDTA, 0.25 g/L $TiO_2$). As shown in FIG. 33, the higher photoreduction rate after 30 minutes irradiation at pH 6 is accompanied by partial oxidation of selenite to selenate which certainly is not desirable and also not noted at pH 4. Also a further increase to pH 8 results in a decreased selenite reduction to elemental selenium and an increase in its oxidation to selenate (FIG. 32 and FIG. 33 respectively). Therefore overall selenite removal (Table 5.11) at pH 4, 6 and 8 were 100%, 93.73% and 35.79% respectively. The removal of EDTA (TOC) also decreases with an increase in initial pH as shown in FIG. 35. FIG. 34 is a graph of the effect of pH onto selenate formation during photocatalytic removal of selenite (20 ppm selenite, 150 ppm EDTA, 0.25 g/L TiO2). At 2 h, approximately 15, 14 and 10% EDTA removal transpires at pH 4, 6 and 8 respectively. Higher removal at acidic pH is due to higher adsorption at their respective pH values as shown in FIG. 32.

Table 5.11 is presented below.

TABLE 5.11

Effect of pH onto photocatalytic removal of selenite after 2 h irradiation (20 ppm selenite, 150 ppm EDTA, 0.25 g/L, $TiO_2$).

| pH | Selenite removal (%) | Selenate formation (%) | Overall removal (%) |
|---|---|---|---|
| 4 | 100 | 0 | 100 |
| 6 | 100 | 6.270493 | 93.72951 |
| 8 | 63.20802 | 27.41385 | 35.79417 |

Figure 37:
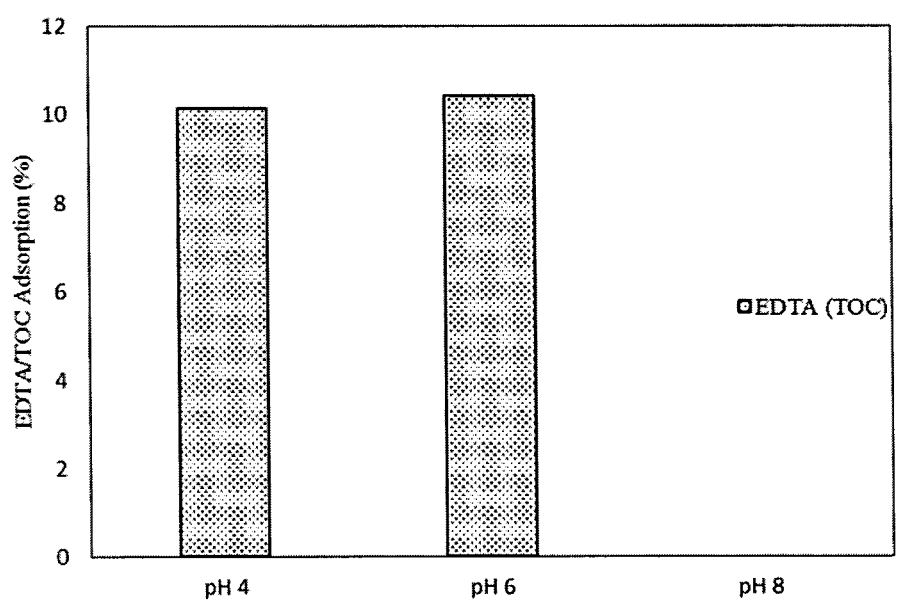
FIG. 37 is a graph of the effect of pH onto initial adsorption (at time zero) onto $TiO_2$ for selenate/EDTA system.
Figure 38:
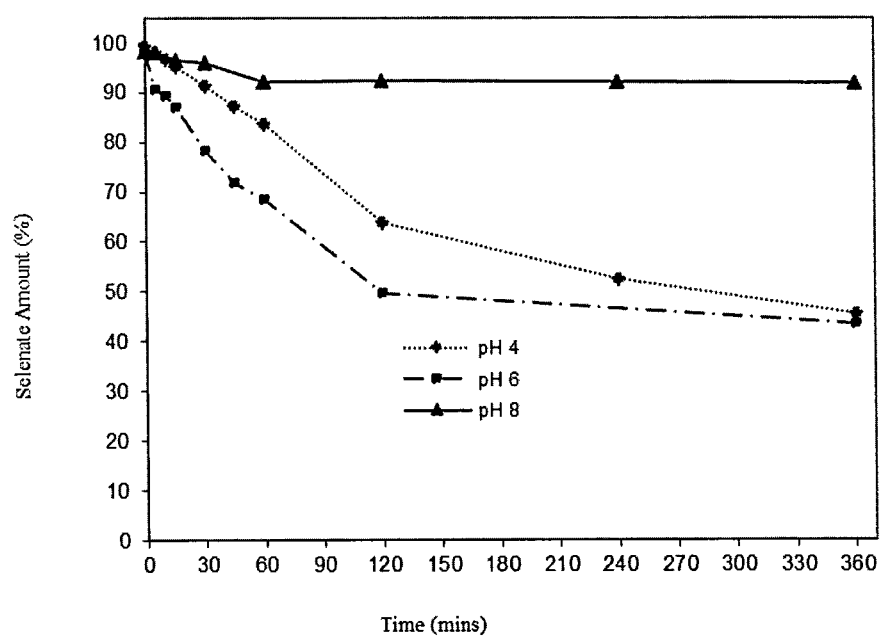
FIG. 38 is a graph of the effect of pH onto photocatalytic removal of selenate.
Figure 80:
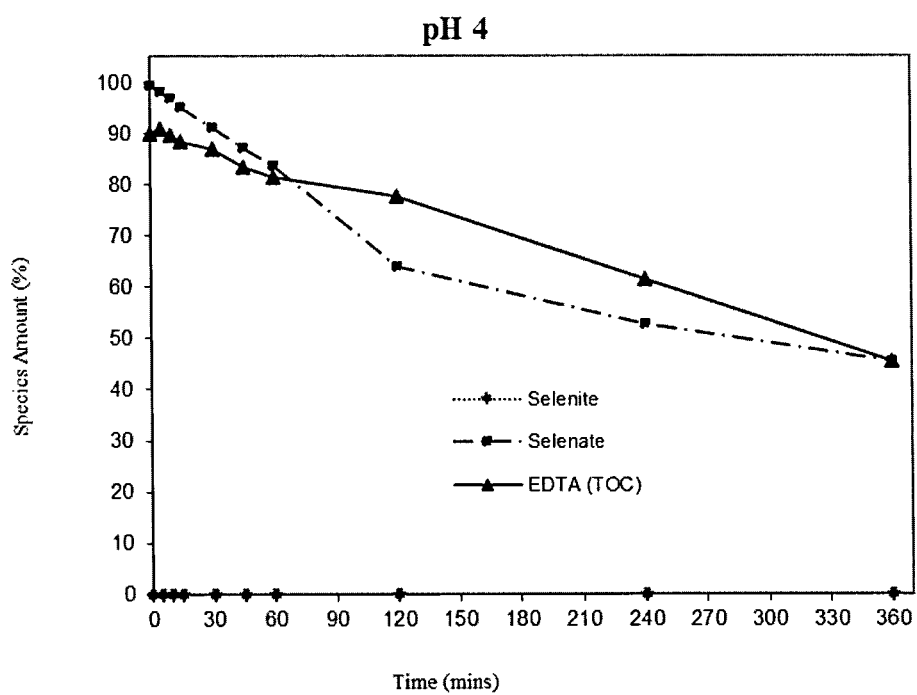
FIG. 80 is a graph of the 'Species remaining' trends as noted during solar photocatalysis of selenate/EDTA system at pH 4.
Figure 81:
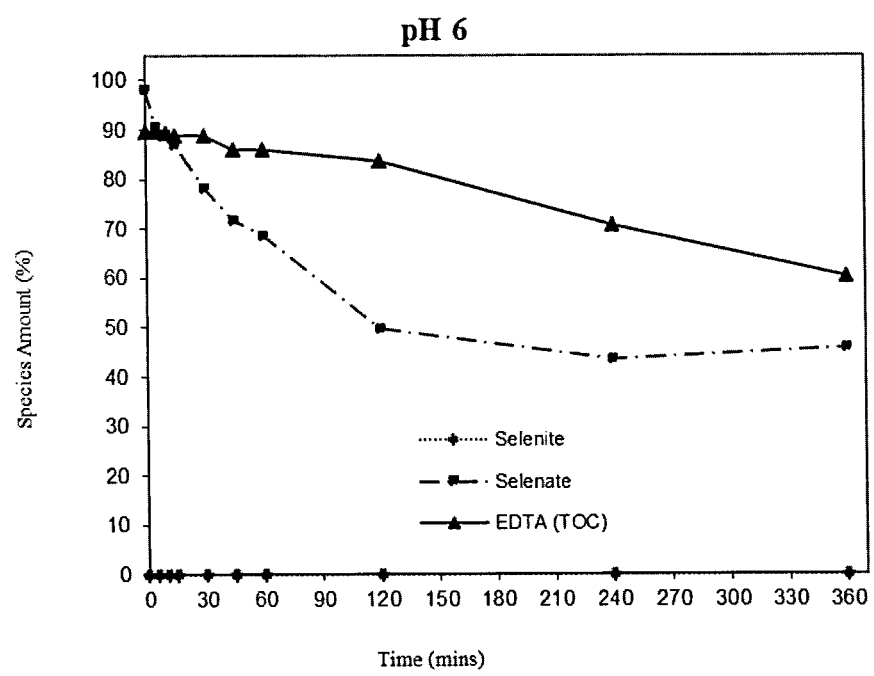
FIG. 81 is a graph of the 'Species remaining' trends as noted during solar photocatalysis of selenate/EDTA system at pH 6.
Figure 82:
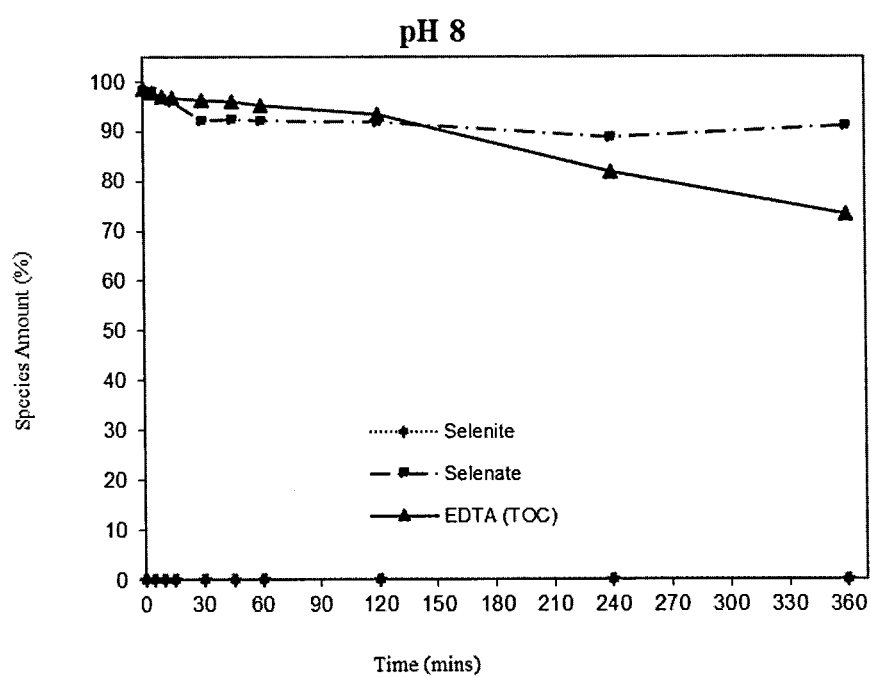
FIG. 82 is a graph of the 'Species remaining' trends as noted during solar photocatalysis of selenate/EDTA system at pH 8.

The effect of pH onto selenate solar photocatalytic removal was also studied. The respective results are shown in FIG. 80-FIG. 82. FIG. 80 is a graph of the 'Species remaining' trends as noted during solar photocatalysis of selenate/EDTA system at pH 4 (20 ppm selenate, 150 ppm EDTA, 0.25 g/L $TiO_2$, pH 4). FIG. 81 is a graph of the 'Species remaining' trends as noted during solar photocatalysis of selenate/EDTA system at pH 6 (20 ppm selenate, 150 ppm EDTA, 0.25 g/L $TiO_2$, pH 6). FIG. 82 is a graph of the 'Species remaining' trends as noted during solar photocatalysis of selenate/EDTA system at pH 8 (20 ppm selenate, 150 ppm EDTA, 0.25 g/L $TiO_2$, pH 8) Though EDTA does show adsorption, however initial adsorption of selenate onto $TiO_2$ surface was not noted (FIG. 37). FIG. 37 is a graph of the effect of pH onto initial adsorption (at time zero) onto $TiO_2$ for selenate/EDTA system (20 ppm selenate, 150 ppm EDTA, 0.25 g/L $TiO_2$). Photocataytic reduction of selenate shows an increased followed by decrease with an increase in pH as shown in FIG. 38. FIG. 38 is a graph of the effect of pH onto photocatalytic removal of selenate (20 ppm selenite, 150 ppm EDTA, 0.25 g/L $TiO_2$). At pH values lower than pHzpc (pH 4 and pH 6), the surface of $TiO_2$ degussa P25 is positively charged and hence the adsorption of hole scavenger EDTA is higher in acidic medium. Therefore, about 54.51% and 54.29% selenate removal transpires at pH 4 and pH 6 whereas 8.88% selenate removal is achieved at pH 8.

Figure 39:
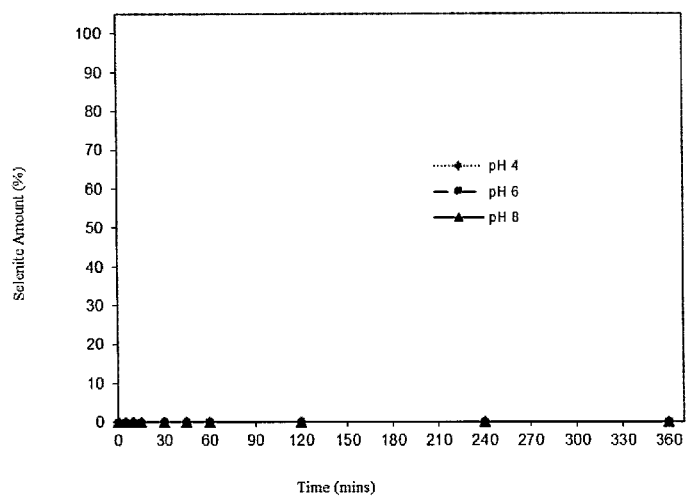
FIG. 39 is a graph of the effect of pH onto selenite formation during photocatalytic removal of selenate.
Figure 40:
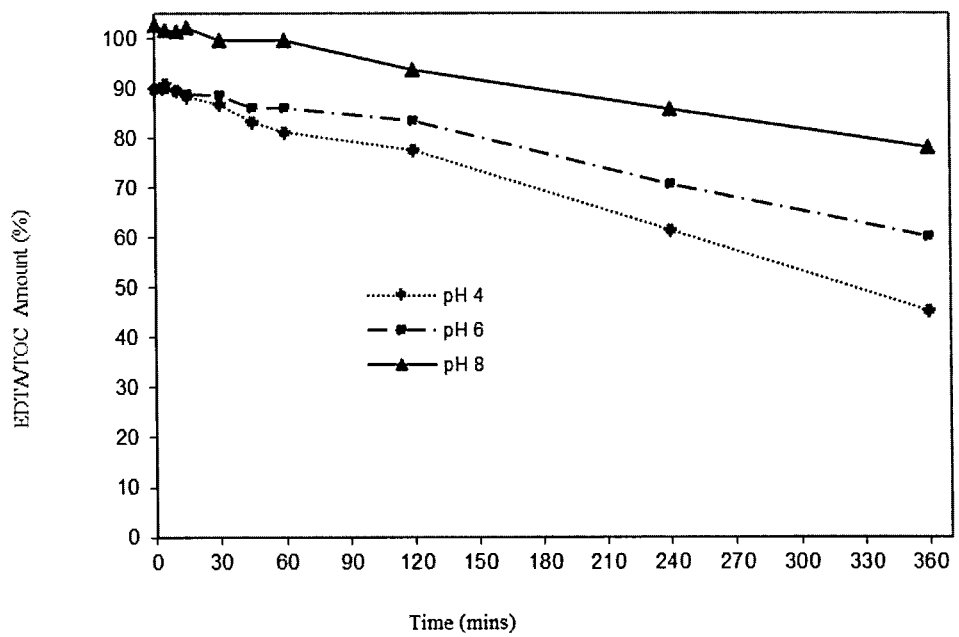
FIG. 40 is a graph of the effect of pH onto EDTA (TOC) degradation during photocatalytic removal of selenate.
Figure 41:
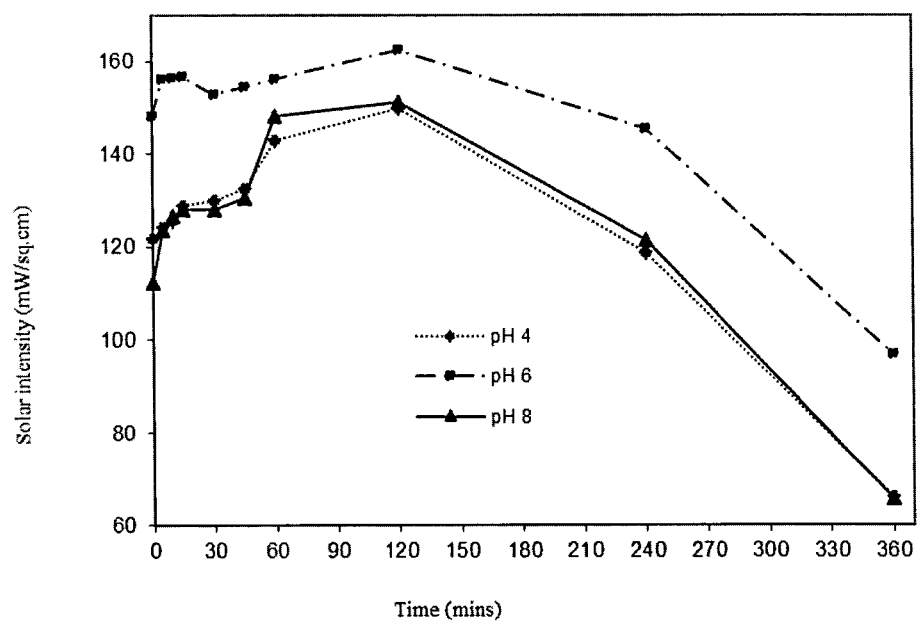
FIG. 41 is a graph of the solar intensity ($mW/cm^2$) variations during photocatalytic removal of selenate.

FIG. 41 is a graph of the solar intensity ($mW/cm^2$) variations during photocatalytic removal of selenate (20 ppm selenate, 150 ppm EDTA, 0.25 g/L TiO2). Higher solar light intensity (Table 5.12 and FIG. 41) at pH 6 compared to pH 4 may explain near equal selenate removal at pH 4 and pH 6. Although a similar selenite removal trend was noticed before, selenite removal was still higher and faster because of its superior adsorption. Furthermore, two step selenate reduction process as explained earlier under UV-lamp studies section, may explain the noted differences. Also no partial reduction of selenate to selenite transpires at all pH as shown in FIG. 39. FIG. 39 is a graph of the effect of pH onto selenite formation during photocatalytic removal of selenate (20 ppm selenite, 150 ppm EDTA, 0.25 g/L $TiO_2$. EDTA removal (FIG. 40) however shows a constant decreasing trend with an increase in pH. FIG. 40 is a graph of the effect of pH onto EDTA (TOC) degradation during photocatalytic removal of selenate (20 ppm selenate, 150 ppm EDTA, 0.25 g/L $TiO_2$). Higher EDTA adsorption (FIG. 37) at time zero at lower pH results into faster EDTA oxidation at respective pH. The overall EDTA removal at pH 4, 6 and 8 are 22, 16 and 6% respectively (FIG. 40) Comparing these to findings given in (FIG. 35) shows high photocatalytic removal of EDTA transpiring in case of selenate. FIG. 35 is a graph of the effect of pH onto EDTA (TOC) degradation during photocatalytic removal of selenite (20 ppm selenite, 150 ppm EDTA, 0.25 g/L $TiO_2$).

This difference could be explained by higher initial EDTA adsorption (FIG. 37) in case of selenate/EDTA system. Reduced EDTA adsorption at pH 8 may dictate its photocatalysis mostly transpiring in the aqueous phase, which require diffusion of OH. radicals into bulk aqueous phase. This may also explain reduced selenite removal at pH 8 (FIG. 33). Also comparing the selenite and selenate removal from FIGS. 33 and 38 shows a plateau type trend for the latter. It is suggested that under UV-irradiation conditions, selenate may attach to the $TiO_2$ surface and get reduced, as long as EDTA keeps, scavenging the hole species. Nevertheless as EDTA degrades (FIG. 40) buildup of reaction intermediate may limit selenate interaction with the $TiO_2$ surface sites, thus limiting its reduction initiated removal (via $e^-$ species).

Table 5.12 is presented below.

TABLE 5.12

Effect of pH onto photocatalytic removal of selenate after 6 h irradiation (20 ppm selenite, 150 ppm EDTA, 0.25 g/L $TiO_2$).

| pH | Selenate removal (%) | Selenite formation (%) | Overall removal (%) |
|---|---|---|---|
| 4 | 54.51008 | 0 | 54.51008 |
| 6 | 54.29029 | 0 | 54.29029 |
| 8 | 8.883958 | 0 | 8.883958 |

Figure 83:
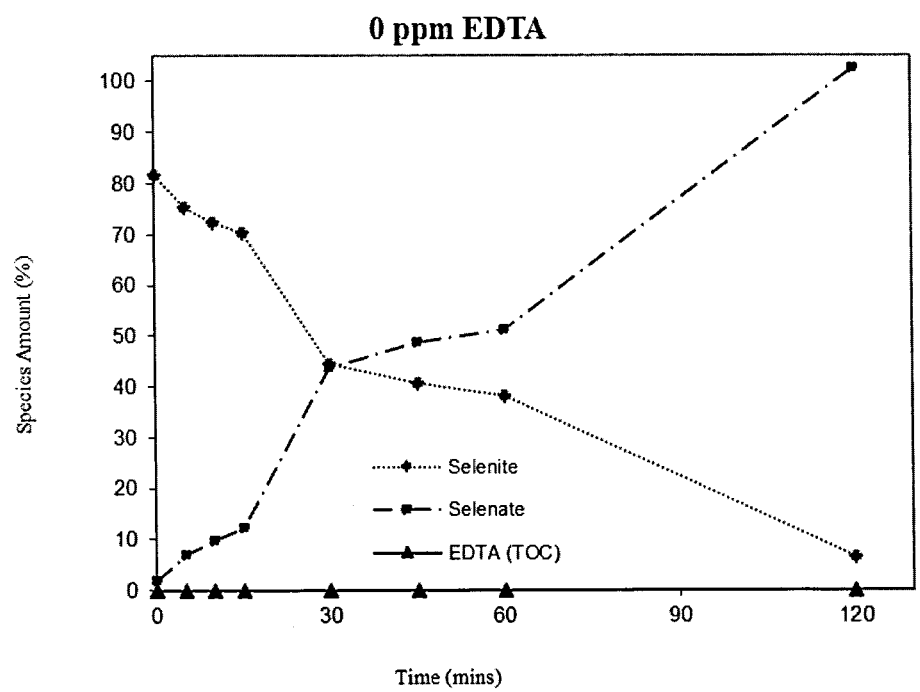
FIG. 83 is a graph of the 'Species Remaining' trends as noted during solar photocatalysis of selenite/EDTA system at 0 ppm EDTA concentration.
Figure 84:
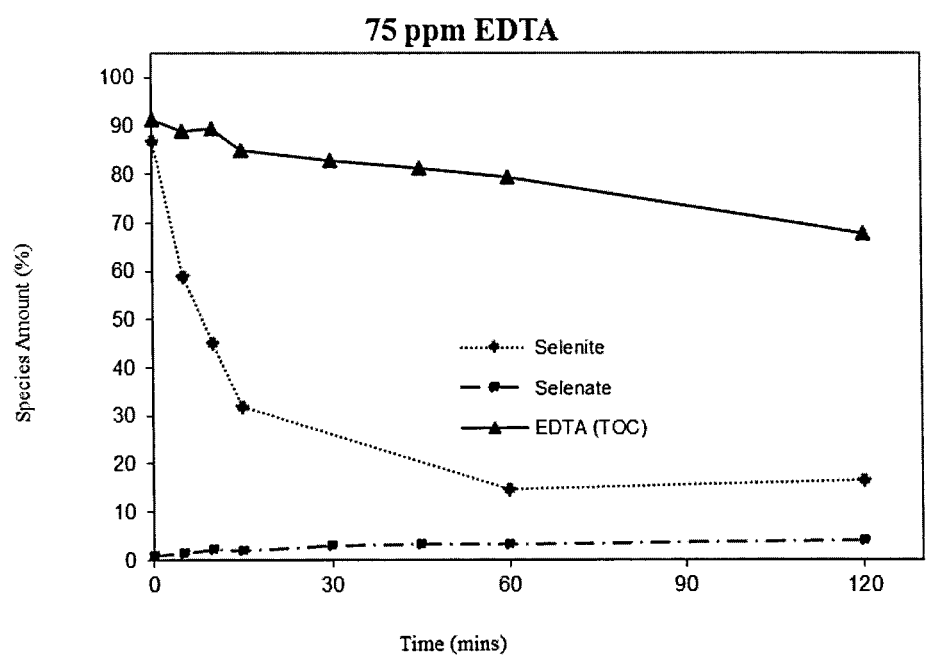
FIG. 84 is a graph of the 'Species Remaining' trends as noted during solar photocatalysis of selenite/EDTA system at 75 ppm EDTA concentration.
Figure 85:
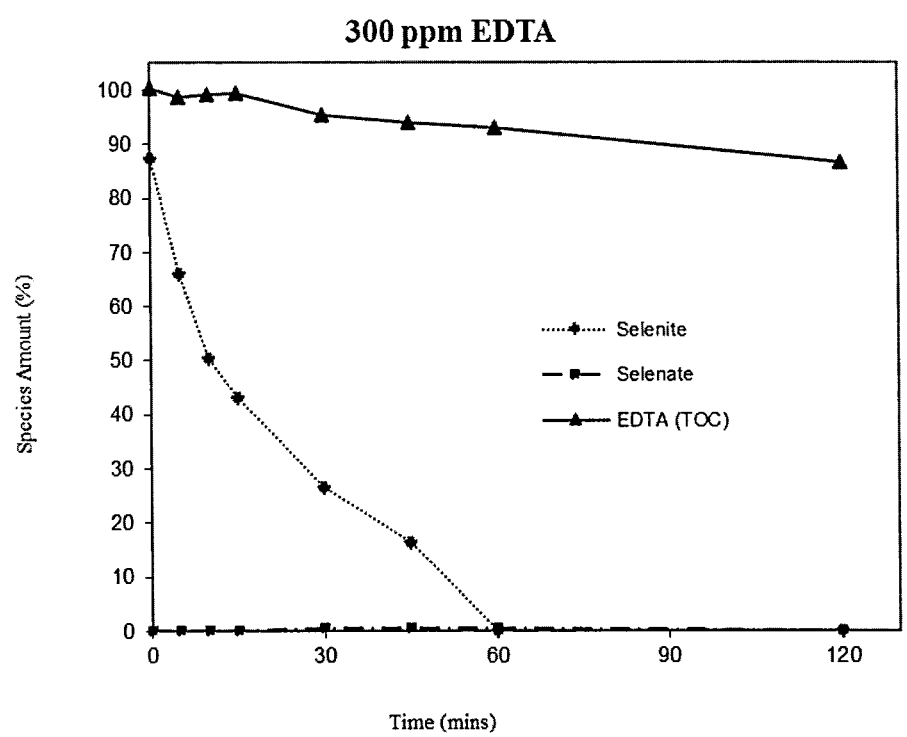
FIG. 85 is a graph of the 'Species Remaining' trends as noted during solar photocatalysis of selenite/EDTA system at 300 ppm EDTA concentration.
Figure 86:
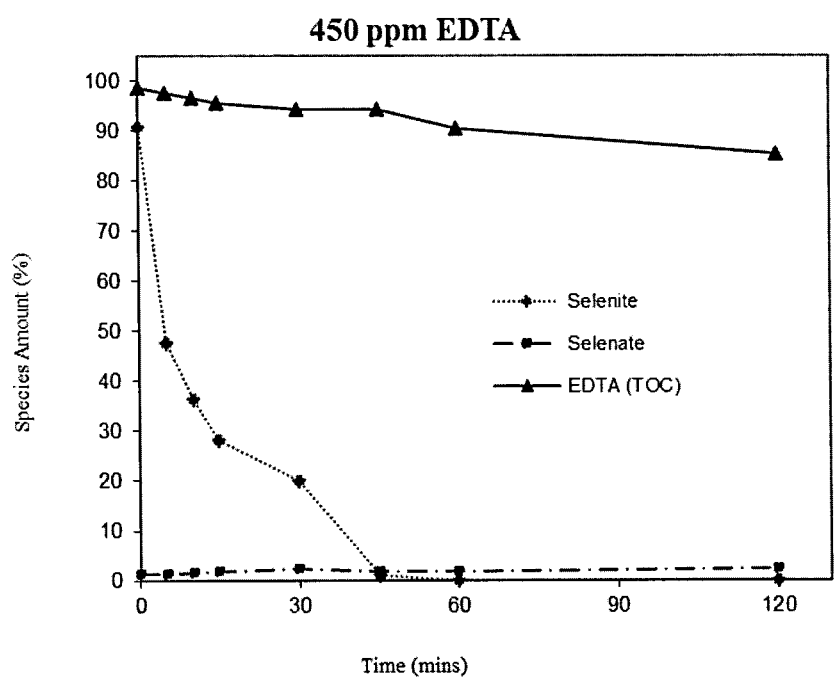
FIG. 86 is a graph of the 'Species Remaining' trends as noted during solar photocatalysis of selenite/EDTA system at 450 ppm EDTA concentration.

After completing the effect of pH studies, the photocatalytic reduction of selenite and selenate was evaluated at different EDTA concentrations. The results from solar photocatalysis experiments for selenite at different EDTA concentrations are given in FIG. 83-FIG. 86. FIG. 83 is a graph of the 'Species Remaining' trends as noted during solar photocatalysis of selenite/EDTA system at 0 ppm EDTA concentration (20 ppm selenite, 0 ppm EDTA, 0.25 g/L $TiO_2$, pH 4). FIG. 84 is a graph of the 'Species Remaining' trends as noted during solar photocatalysis of selenite/EDTA system at 75 ppm EDTA concentration (20 ppm selenite, 75 ppm EDTA, 0.25 g/L $TiO_2$, pH 4). FIG. 85 is a graph of the 'Species Remaining' trends as noted during solar photocatalysis of selenite/EDTA system at 300 ppm EDTA concentration (20 ppm selenite, 300 ppm EDTA, 0.25 g/L $TiO_2$, pH 4). FIG. 86 is a graph of the 'Species Remaining' trends as noted during solar photocatalysis of selenite/EDTA system at 450 ppm EDTA concentration (20 ppm selenite, 450 ppm EDTA, 0.25 g/L $TiO_2$, pH 4).

Figure 42:
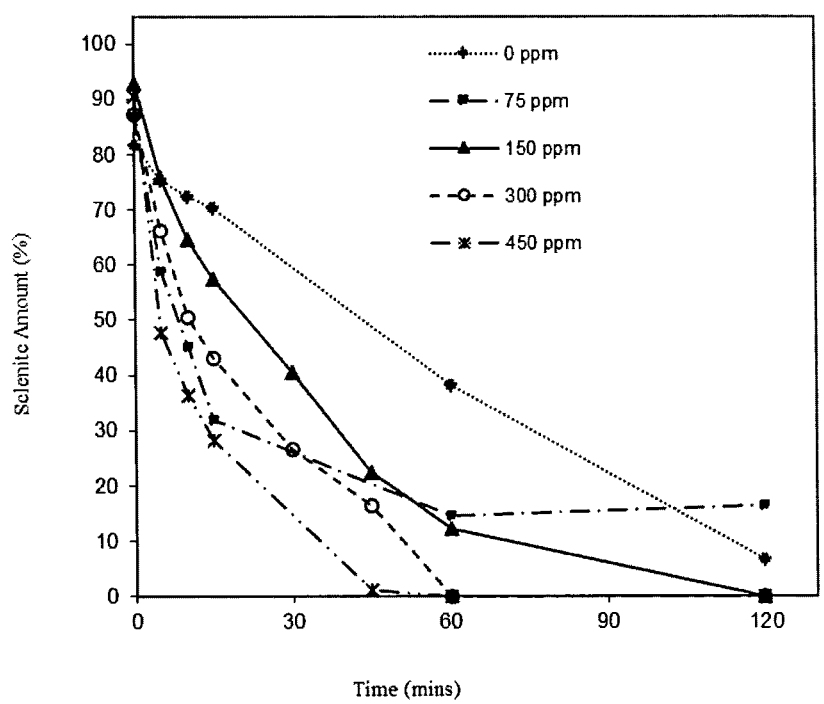
FIG. 42 is a graph of the effect of EDTA concentration onto photocatalytic removal of selenite.
Figure 43:
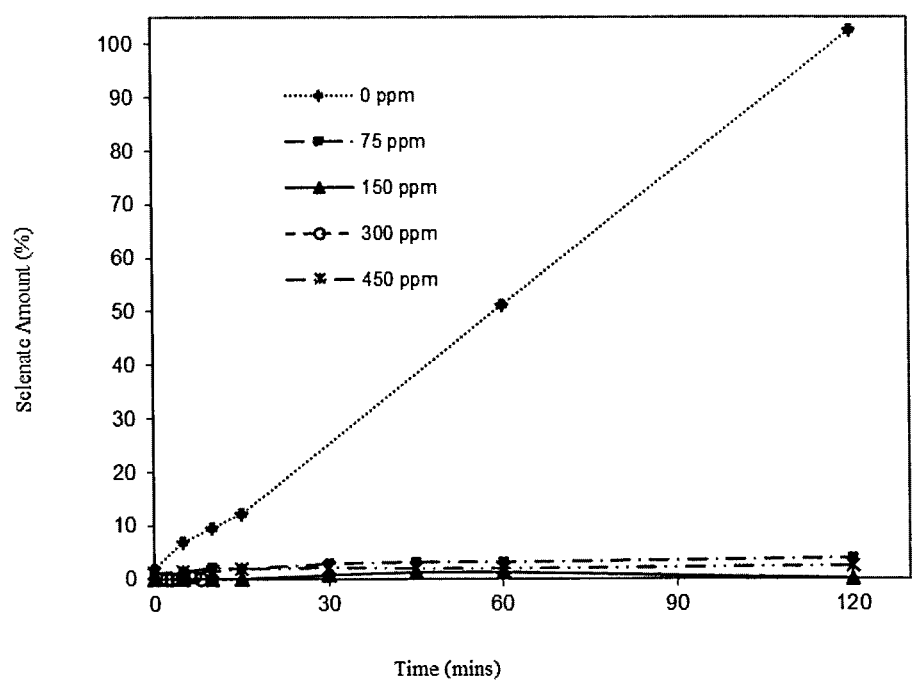
FIG. 43 is a graph of the effect of EDTA concentration onto selenate formation during photocatalytic removal of selenite.

Initially, an experiment for the removal of selenite was conducted without EDTA. In the absence of EDTA, selenite reacts with photo-generated holes and oxidized to selenate (FIG. 42 and FIG. 43). FIG. 42 is a graph of the effect of EDTA concentration onto photocatalytic removal of selenite (20 ppm selenite, pH 4, 0.25 g/L $TiO_2$). FIG. 43 is a graph of the effect of EDTA concentration onto selenate formation during photocatalytic removal of selenite (20 ppm selenite, pH 4, 0.25 g/L $TiO_2$).

Figure 44:
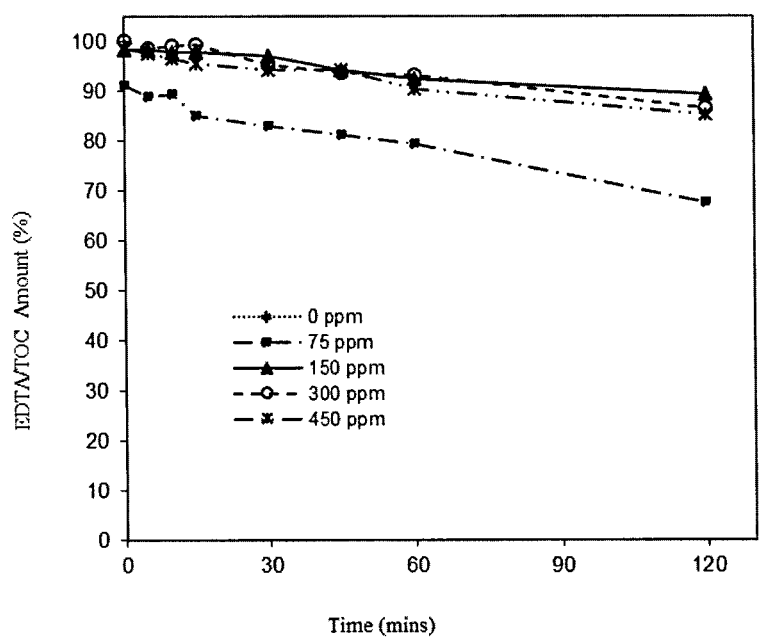
FIG. 44 is a graph of the effect of EDTA concentration onto EDTA (TOC) degradation during photocatalytic removal of selenite.
Figure 45:
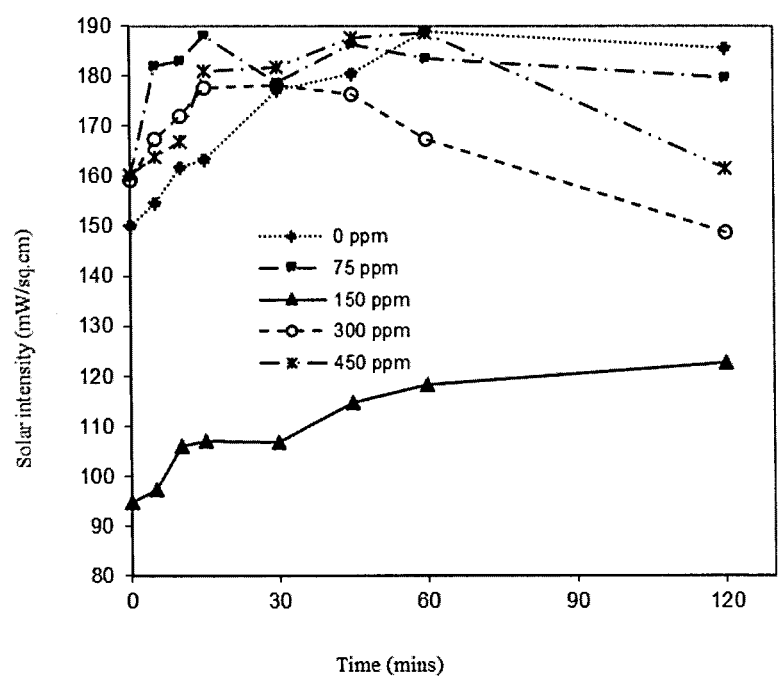
FIG. 45 is a graph of the solar intensity ($mW/cm^2$) variations during photocatalytic removal of selenite.

As explained earlier, the EDTA species consumes the VB holes and this leave enough CB electrons that could be utilized to reduce the selenite species (Equation 5-1 and 5-2). In the absence of EDTA, this is not possible thus resulting in oxidation of selenite. However, it is seen from FIG. 42 that the addition of 75 ppm EDTA significantly enhances selenite removal to 84% though with slight oxidation to selenate (FIG. 43). This is despite a lower light intensity at 75 ppm EDTA concentration compared to 0 ppm EDTA concentration (FIG. 45). FIG. 45 is a graph of the solar intensity ($mW/cm^2$) variations during photocatalytic removal of selenite (20 ppm selenite, pH 4, 0.25 g/L $TiO_2$). The photoreduction increases from approx. 84% to almost 100% as the initial EDTA concentration is increased from 75 to 150 ppm (FIG. 42). This is associated with negligible selenate formation (FIG. 43) indicating that most of selenite is reduced to elemental selenium. An increase in EDTA concentration to 300 ppm maintains selenite removal at 100% (FIG. 42) with minimum selenate formation (FIG. 43). An increase in EDTA concentration to 450 ppm further increases selenite reduction (FIG. 42) again with minimal selenate formation (FIG. 43). Table 5.13 shows that overall selenite removal of 0%, 79.60%, 100%, 100% and 97.70% was achieved after 2 hours irradiation at 0, 75, 150, 300 and 450 ppm initial EDTA concentrations respectively. Using lesser EDTA amount of 150 ppm reduces selenite in a reasonable time period without any significant conversion to selenate. The initial increase in selenite removal efficiency with increased EDTA is because of enhanced trapping of the photo-generated holes, which subsequently reduces $e^-/h^+$ recombination. However, an increase in initial EDTA concentration also increases the competitive adsorption between selenite and EDTA. As stated earlier, the adsorption of anions is significant for their photocatalytic reduction. FIG. 44 is a graph of the effect of EDTA concentration onto EDTA (TOC) degradation during photocatalytic removal of selenite (20 ppm selenite, pH 4, 0.25 g/L $TiO_2$). Considering the trend given in FIG. 44, on mass bases, the following trend apply for EDTA removal 75 ppm<150 ppm<300 ppm<450 ppm. This results because of increased adsorption of EDTA (on mass basis) as its concentration increases.

Table 5.13 is presented below.

TABLE 5.13

Effect of EDTA concentration onto photocatalytic removal of selenite after 2 h irradiation (20 ppm selenite, pH 4, 0.25 g/L $TiO_2$).

| EDTA concentration (ppm) | Selenite removal (%) | Selenate formation (%) | Overall removal (%) |
|---|---|---|---|
| 0 | 93.42574 | 102.6252 | 0 |
| 75 | 83.56487 | 3.963655 | 79.60122 |
| 150 | 100 | 0 | 100 |
| 300 | 100 | 0 | 100 |
| 450 | 100 | 2.298543 | 97.70146 |

Figure 46:
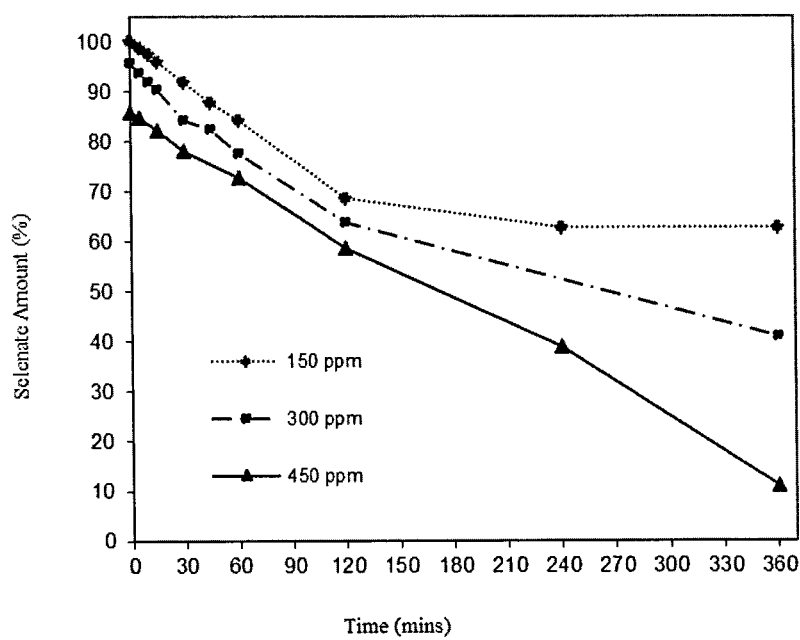
FIG. 46 is a graph of the effect of EDTA concentration onto photocatalytic removal of selenate.
Figure 47:
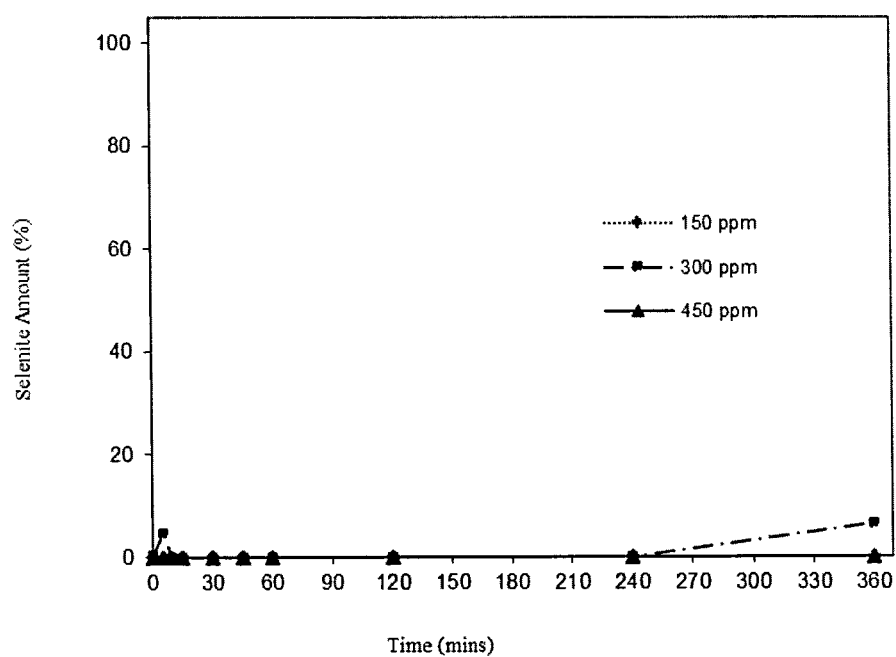
FIG. 47 is a graph of the effect of EDTA concentration onto selenite formation during photocatalytic removal of selenate.
Figure 48:
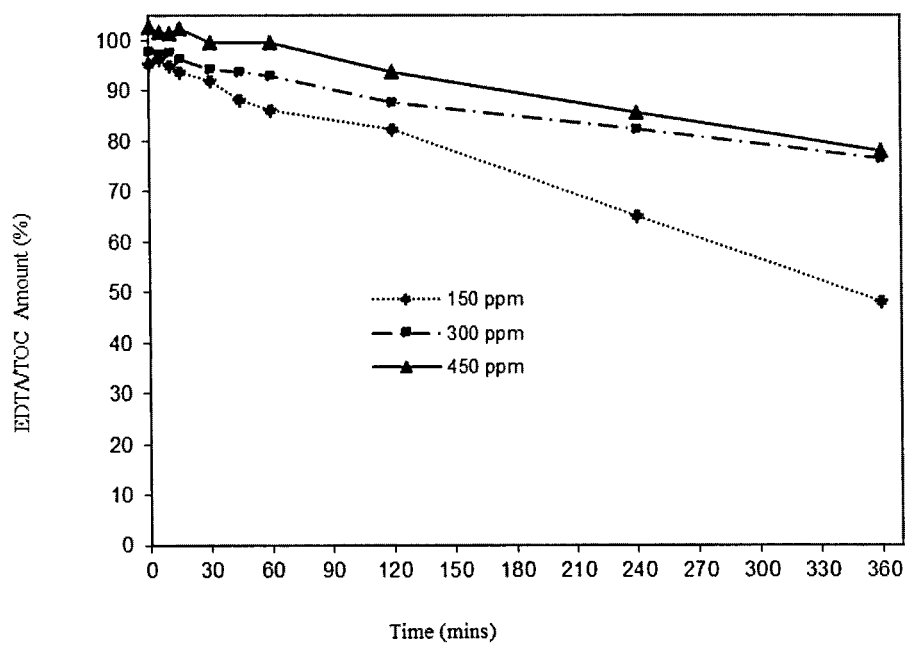
FIG. 48 is a graph of the effect of EDTA concentration onto EDTA (TOC) degradation during photocatalytic removal of selenate.
Figure 87:
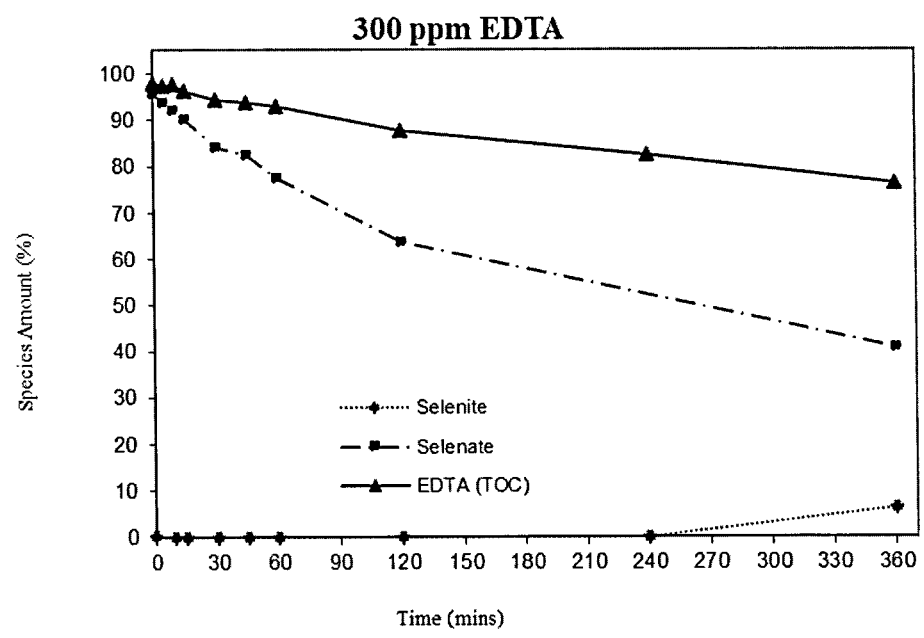
FIG. 87 is a graph of the 'Species Remaining' trends as noted during solar photocatalysis of selenate/EDTA system at 300 ppm EDTA concentration.
Figure 88:
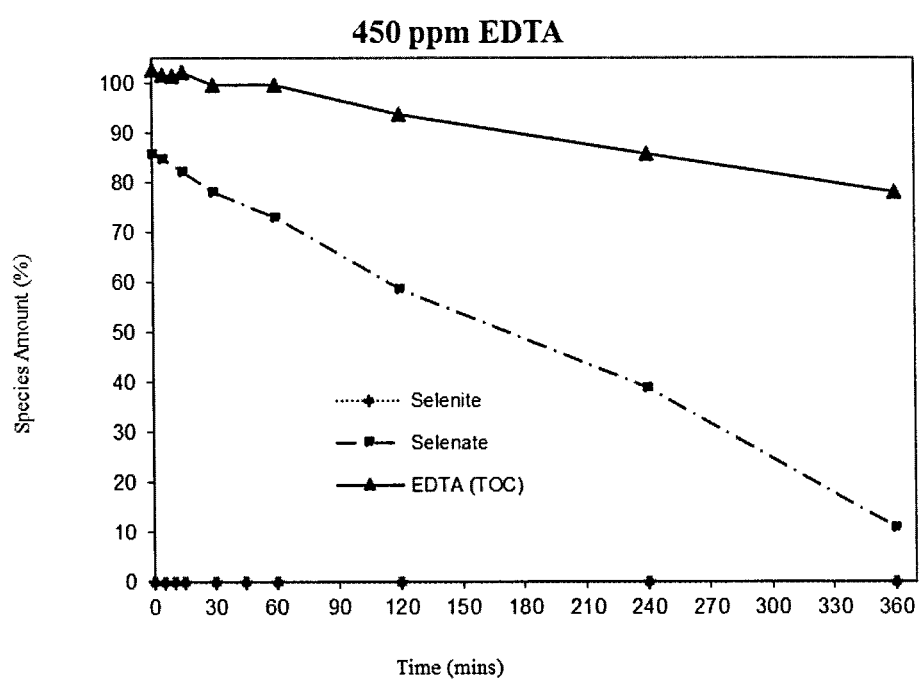
FIG. 88 is a graph of the 'Species Remaining' trends as noted during solar photocatalysis of selenate/EDTA system at 450 ppm EDTA concentration.

The investigation into the effect of EDTA concentration was extended for selenate and the results of the solar photocatalysis experiments are given in FIG. 87 and FIG. 88. FIG. 87 is a graph of the 'Species Remaining' trends as noted during solar photocatalysis of selenate/EDTA system at 300 ppm EDTA concentration (20 ppm selenate, 300 ppm EDTA, 0.25 g/L $TiO_2$, pH 4). FIG. 88 is a graph of the 'Species Remaining' trends as noted during solar photocatalysis of selenate/EDTA system at 450 ppm EDTA concentration (20 ppm selenate, 450 ppm EDTA, 0.25 g/L $TiO_2$, pH 4). Similar to selenite findings, selenate removal also increases with an increase in initial EDTA concentration as summarized in FIG. 46. FIG. 46 is a graph of the effect of EDTA concentration onto photocatalytic removal of selenate (20 ppm selenate, pH 4, 0.25 g/L $TiO_2$). About 54% selenate removal transpires at 150 ppm EDTA concentration. Approximately 59% selenate reduction (FIG. 46) with and 6% selenite formation (FIG. 47) respectively is noted at initial EDTA concentration of 300 ppm. FIG. 47 is a graph of the effect of EDTA concentration onto selenite formation during photocatalytic removal of selenate (20 ppm selenate, pH 4, 0.25 g/L $TiO_2$). Further increase from 300 to 450 ppm leads to approximately 90% selenate removal. Therefore an overall selenate removal (Table 5.14) of 54.51%, 52.62% and 89.05% transpires at 150, 300 and 450 ppm initial EDTA concentration after 6 hours irradiation. Though selenate also shows an increase in its reduction with an increase in EDTA concentration, the change is slower compared to selenite and EDTA systems. Hence, the overall removal is lower for selenate in comparison to selenite. It is suggested that the noted trend is because of two steps, i.e., reduction (in case of selenate) from selenate to selenite and then to elemental selenium. However, the first step is not needed in case of selenite. FIG. 48 is a graph of the effect of EDTA concentration onto EDTA (TOC) degradation during photocatalytic removal of selenate (20 ppm selenate, pH 4, 0.25 g/L $TiO_2$).

FIG. 48 shows that % EDTA removal also decreases with an increase in initial EDTA concentration. However, on mass basis, 450 ppm EDTA concentration shows higher removal as compared to 150 ppm and 300 ppm EDTA removal. Nevertheless, we do note significant selenate reduction with minimum conversion to selenite at high EDTA amount, indicating that solar photocatalytic degradation is promising technology to remove selenate via the reduction route using solar energy.

Figure 49:
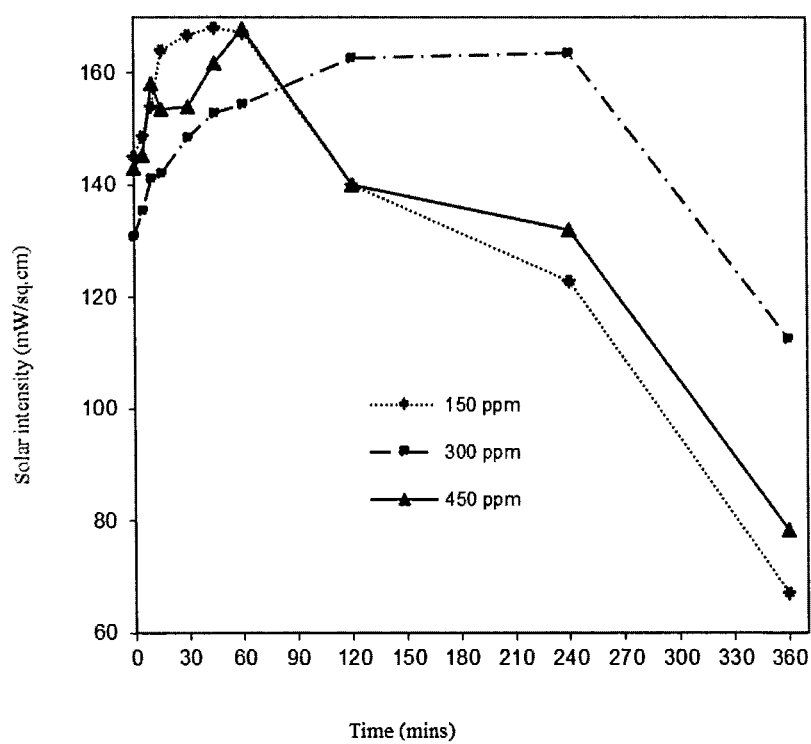
FIG. 49 is a graph of the solar intensity ($mW/cm^2$) variations during photocatalytic removal of selenate.

FIG. 49 is a graph of the solar intensity ($mW/cm^2$) variations during photocatalytic removal of selenate (20 ppm selenate, pH 4, 0.25 g/L $TiO_2$). FIG. 49 shows that despite variation in solar intensity for different initial EDTA concentration at different time, the average is however close.

Table 5.14 is presented below.

TABLE 5.14

Effect of EDTA concentration onto photocatalytic removal of selenate after 6 h irradiation (20 ppm selenate, pH 4, 0.25 g/L $TiO_2$).

| EDTA concentration (ppm) | Selenate removal (%) | Selenite formation (%) | Overall removal (%) |
|---|---|---|---|
| 150 | 54.51008 | 0 | 54.51008 |
| 300 | 59.08993 | 6.4695 | 52.62043 |
| 450 | 89.04723 | 0 | 89.04723 |

Figure 89:
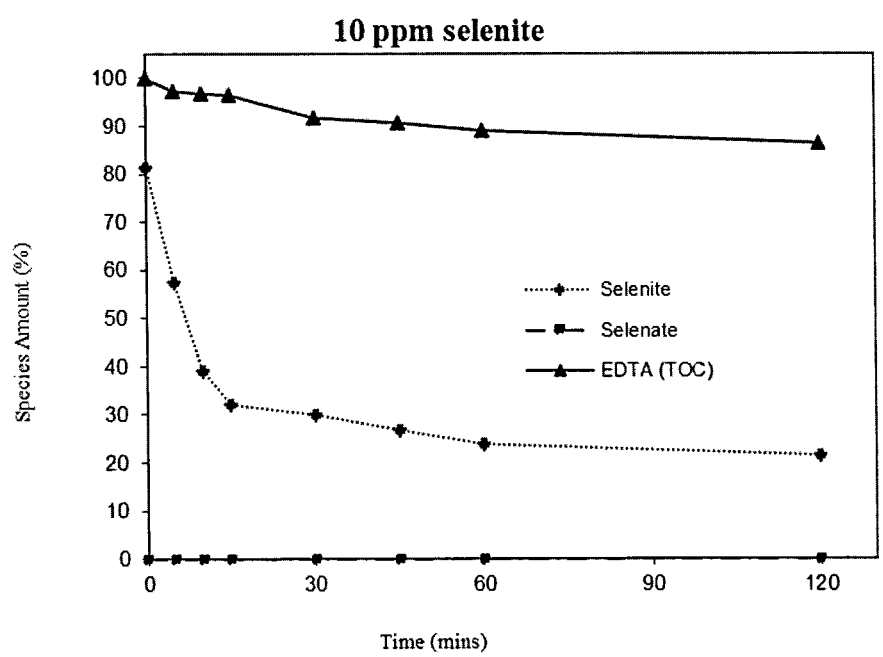
FIG. 89 is a graph of the 'Species remaining' trends as noted during solar photocatalysis of selenite/EDTA system at 10 ppm selenite concentration.
Figure 90:
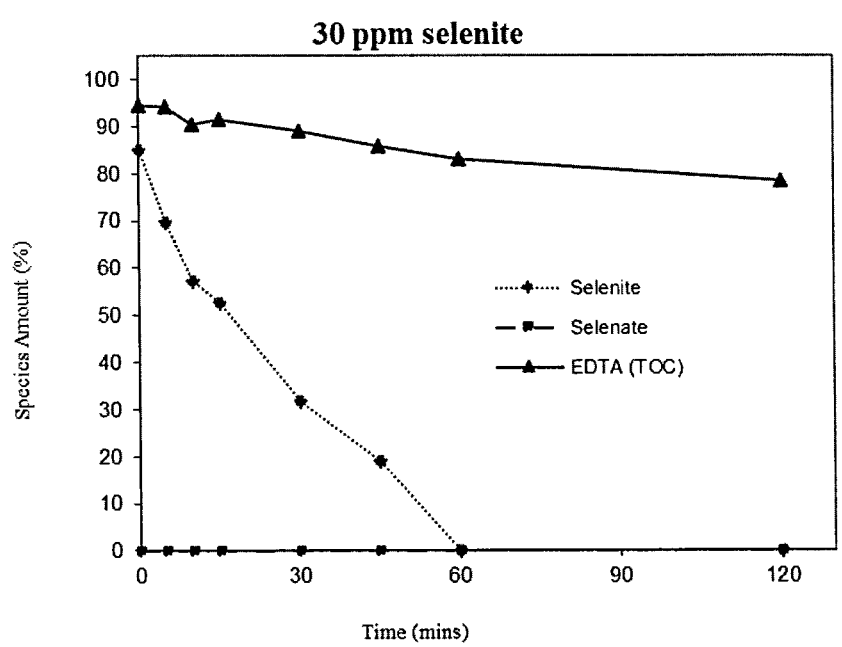
FIG. 90 is a graph of the 'Species remaining' trends as noted during solar photocatalysis of selenite/EDTA system at 30 ppm selenite concentration.

Investigation into the effect of initial solute concentration was also studied. Photocatalytic removal of 20 ppm selenite is shown in FIG. 77-FIG. 79 and results for 10 and 30 ppm initial selenite concentrations are also shown in FIG. 89 and FIG. 90. FIG. 89 is a graph of the 'Species remaining' trends as noted during solar photocatalysis of selenite/EDTA system at 10 ppm selenite concentration (10 ppm selenite, 150 ppm EDTA, 0.25 g/L $TiO_2$, pH 4). FIG. 90 is a graph of the 'Species remaining' trends as noted during solar photocatalysis of selenite/EDTA system at 30 ppm selenite concentration (30 ppm selenite, 150 ppm EDTA, 0.25 g/L $TiO_2$, pH 4).

Figure 50:
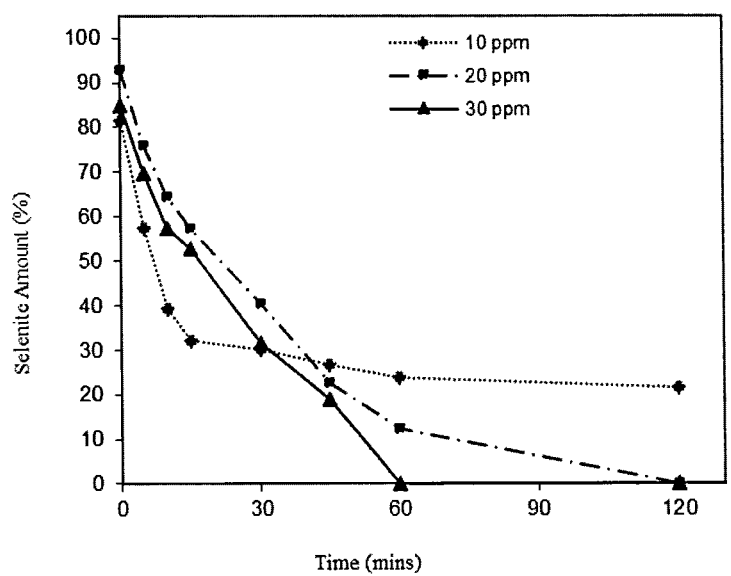
FIG. 50 is a graph of the effect of initial selenite concentration onto photocatalytic removal of selenite.
Figure 51:
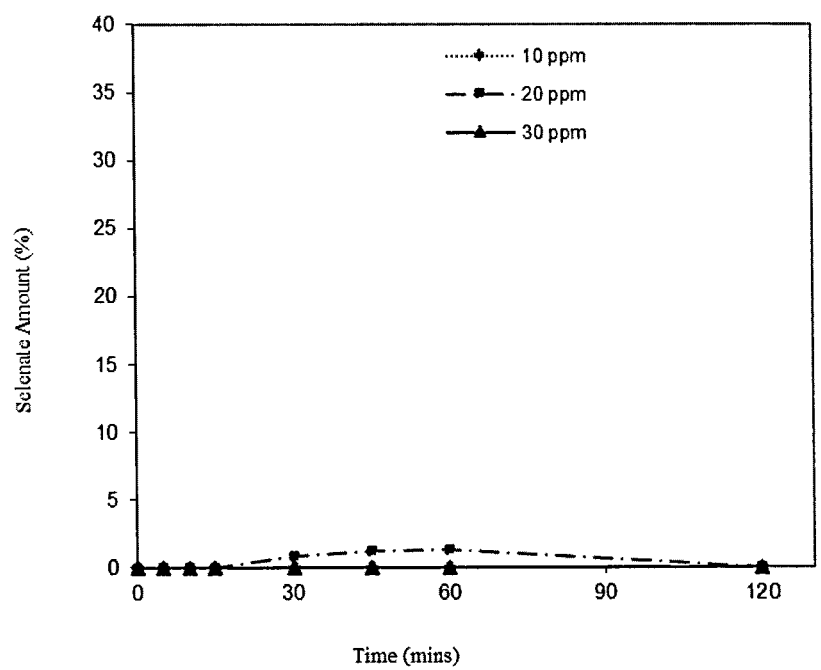
FIG. 51 is a graph of the effect of initial selenite concentration onto selenate formation during photocatalytic removal of selenite.
Figure 52:
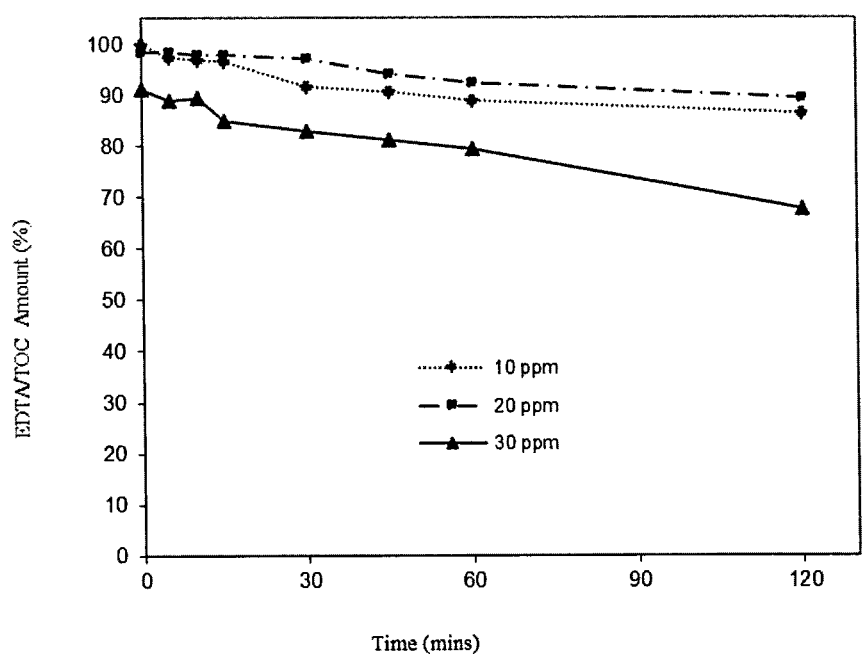
FIG. 52 is a graph of the effect of initial selenite concentration onto EDTA (TOC) degradation during photocatalytic removal of selenite.
Figure 53:
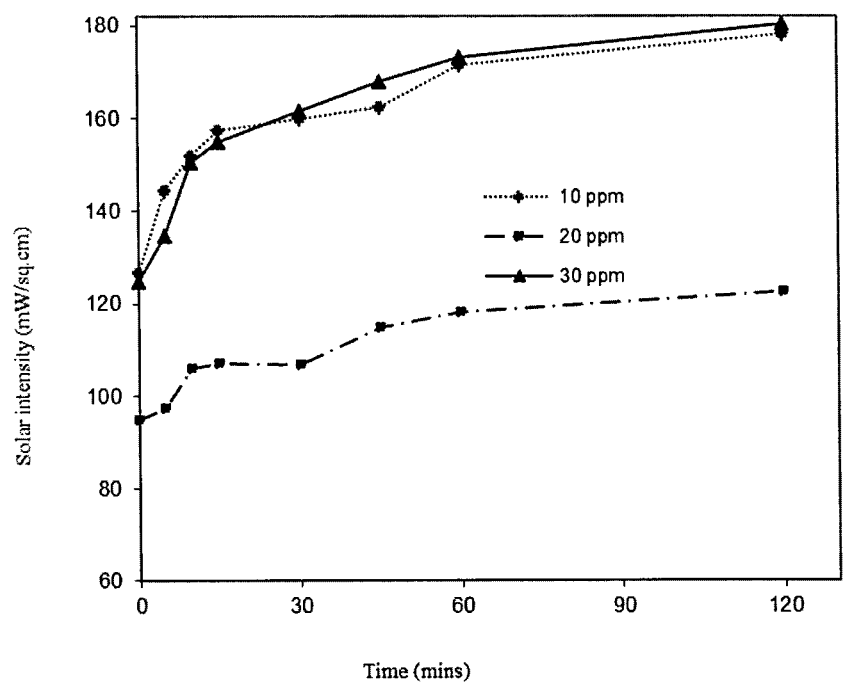
FIG. 53 is a graph of the solar intensity ($mW/cm^2$) variations during photocatalytic removal of selenite.

Nearly 80% selenite removal was attained for 10 ppm selenite concentration after 2 hours irradiation whereas near complete selenite removal was achieved both for 20 ppm and 30 ppm selenite concentration after 2 and 1 hours irradiation time respectively (FIG. 50 and Table 5.15). FIG. 50 is a graph of the effect of initial selenite concentration onto photocatalytic removal of selenite (150 ppm EDTA, pH 4, 0.25 g/L $TiO_2$). As discussed earlier, increased adsorption might be responsible for faster photoreduction at higher initial selenite concentration. FIG. 51 is a graph of the effect of initial selenite concentration onto selenate formation during photocatalytic removal of selenite (150 ppm EDTA, pH 4, 0.25 g/L $TiO_2$. FIG. 51 shows slight oxidation of selenite to selenate at 20 ppm initial selenite concentration. FIG. 52 is a graph of the effect of initial selenite concentration onto EDTA (TOC) degradation during photocatalytic removal of selenite (150 ppm EDTA, pH 4, 0.25 g/L $TiO_2$). The EDTA removal trend as given in FIG. 52 also shows increasing EDTA oxidation (as TOC) with an increase in initial selenite concentration, which is also supported by previously discussed $e^-/h^+$ scavenging mechanism, i.e., as more $e^-$ species are scavenged by selenite species more $h^+$ species will be left for EDTA oxidation. In any case there is enough EDTA remaining in the suspension to derive the photo reduction of selenite species. Nevertheless, lower solar intensity (FIG. 53) for 20 ppm selenite experiment could also contribute to low oxidation of EDTA. FIG. 53 is a graph of the solar intensity ($mW/cm^2$) variations during photocatalytic removal of selenite (150 ppm EDTA, pH 4, 0.25 g/L $TiO_2$).

Table 5.15 is presented below.

TABLE 5.15

Effect of initial selenite concentration onto photocatalytic removal of selenite after 2 h irradiation (150 ppm EDTA, pH 4, 0.25 g/L TiO$_2$)

| Initial selenite concentration | Selenite removal (%) | Selenate formation (%) | Overall removal (%) |
| --- | --- | --- | --- |
| 10 | 78.56117 | 0 | 78.56117 |
| 20 | 100 | 0 | 100 |
| 30 | 100 | 0 | 100 |

Figure 91:
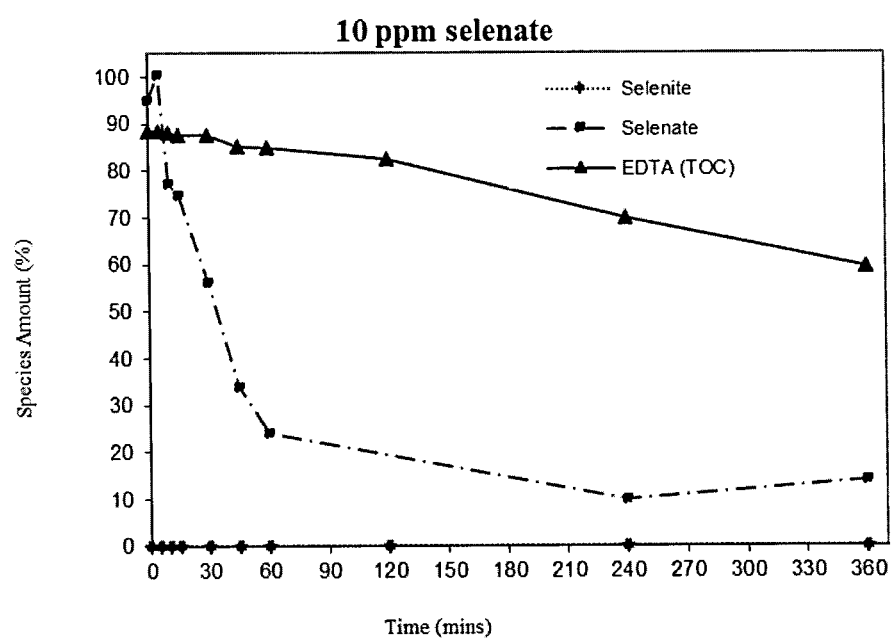
FIG. 91 is a graph of the 'Species remaining' trends as noted during solar photocatalysis of selenate/EDTA system at 10 ppm selenate concentration.
Figure 92:
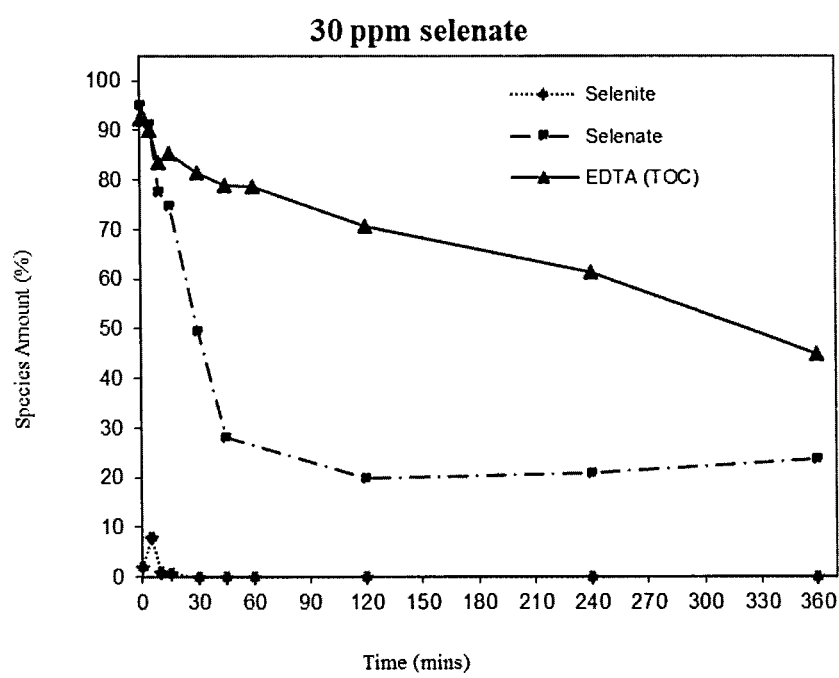
FIG. 92 is a graph of the 'Species remaining' trends as noted during solar photocatalysis of selenate/EDTA system at 30 ppm selenate concentration.

The effect of initial concentration was also briefly looked into for selenate by completing experiments at 10 and 30 ppm selenate and the results are shown in FIG. 91 and FIG. 92. FIG. 91 is a graph of the 'Species remaining' trends as noted during solar photocatalysis of selenate/EDTA system at 10 ppm selenate concentration (10 ppm selenate, 150 ppm EDTA, 0.25 g/L TiO$_2$, pH 4). FIG. 92 is a graph of the 'Species remaining' trends as noted during solar photocatalysis of selenate/EDTA system at 30 ppm selenate concentration (30 ppm selenate, 150 ppm EDTA, 0.25 g/L TiO$_2$, pH 4).

Figure 54:
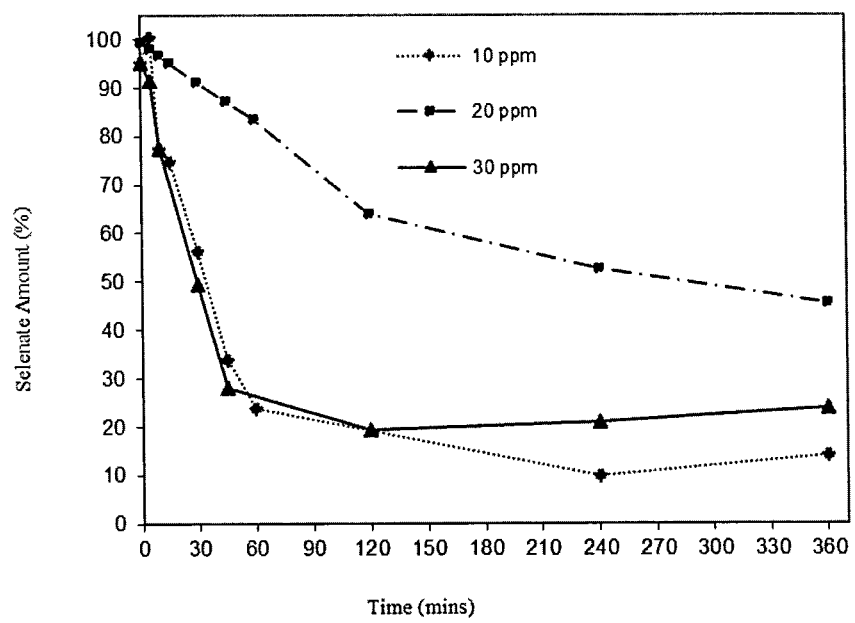
FIG. 54 is a graph of the effect of initial selenate concentration onto photocatalytic removal of selenate.

Similar to previously mentioned findings for selenite, we note increased selenate removal as its initial concentration is increased from 20 to 30 ppm (Table 5.16 and FIG. 54). FIG. 54 is a graph of the effect of initial selenate concentration onto photocatalytic removal of selenate (150 ppm EDTA, pH 4, 0.25 g/L TiO$_2$). At initial concentration of 20 ppm, percent selenate removal is approximately 55%, at 6 h reaction time. An increase to 30 ppm increases the percent removal to 76% also at 6 h reaction time. Selenate removal for 30 ppm study higher than 20 ppm study, follows selenite removal trend. No partial selenate reduction to selenite (FIG. 55) was observed at all initial selenate concentration values after 6 h irradiation time. Furthermore, as noted for selenite studies, EDTA oxidation also increases with an increase in initial selenate concentration (FIG. 56), which can also be explained based on the $e^-/h^+$ scavenging effects.

Figure 55:
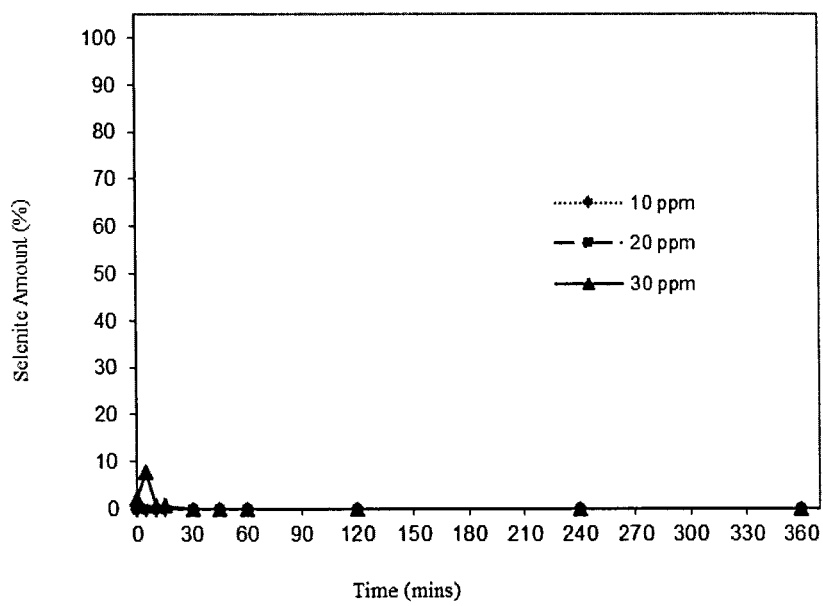
FIG. 55 is a graph of the effect of initial selenate concentration onto selenite formation during photocatalytic removal of selenate.
Figure 56:
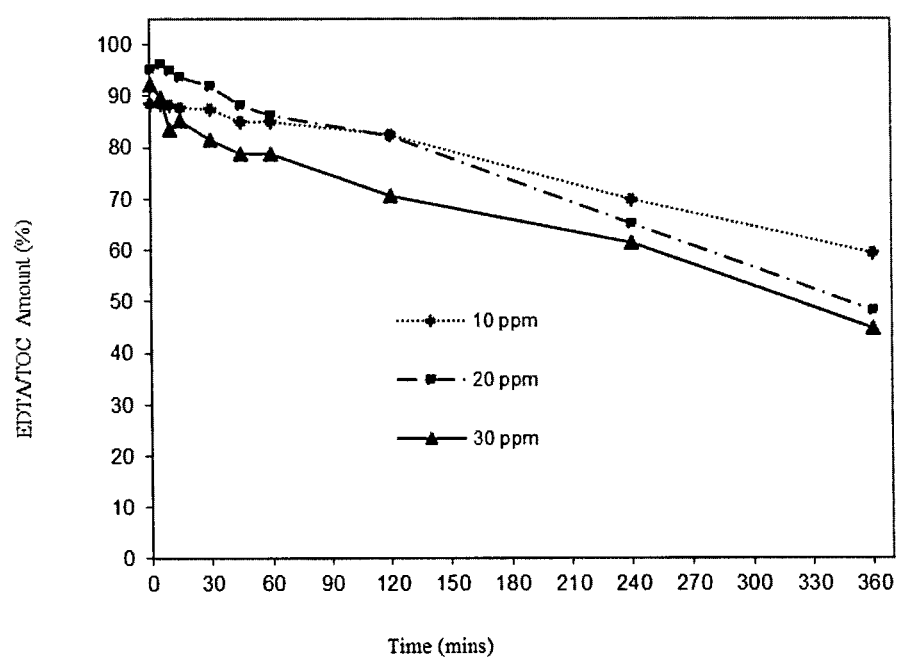
FIG. 56 is a graph of the effect of initial selenate concentration onto EDTA (TOC) degradation during photocatalytic removal of selenate.
Figure 57:
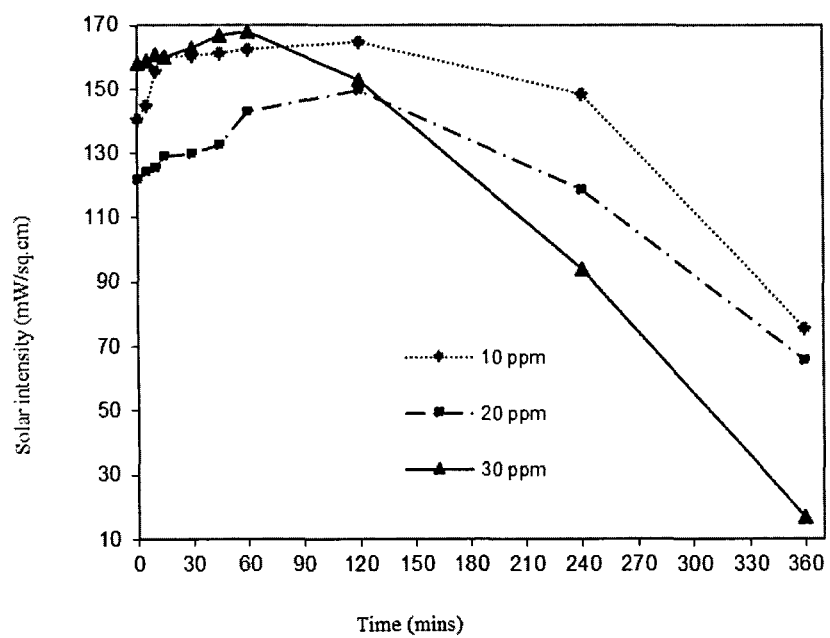
FIG. 57 is a graph of the solar intensity ($mW/cm^2$) variations during photocatalytic removal of selenate.

FIG. 55 is a graph of the effect of initial selenate concentration onto selenite formation during photocatalytic removal of selenate (150 ppm EDTA, pH 4, 0.25 g/L TiO$_2$). FIG. 56 is a graph of the effect of initial selenate concentration onto EDTA (TOC) degradation during photocatalytic removal of selenate (150 ppm EDTA, pH 4, 0.25 g/L TiO$_2$). FIG. 57 is a graph of the solar intensity (mW/cm$^2$) variations during photocatalytic removal of selenate (150 ppm EDTA, pH 4, 0.25 g/L TiO$_2$).

Overall, selenate removal compared to selenite is lower, which is consistent with the earlier noted trends either at different pH or varying EDTA concentrations. Nevertheless, findings from the present work indicate that both the selenite and selenate species can be removed and reduced (with EDTA being oxidized), with a careful control of process conditions including pH and EDTA concentration, using either UV lamp artificial light source or solar powered reactions, during the studied advanced oxidation.

Table 5.16 is presented below.

TABLE 5.16

Effect of initial selenate concentration onto photocatalytic removal of selenate after 6 h irradiation (150 ppm EDTA, pH 4, 0.25 g/L TiO$_2$).

| Initial selenate concentration (ppm) | Selenate removal (%) | Selenite formation (%) | Overall removal (%) |
| --- | --- | --- | --- |
| 10 | 85.9543 | 0 | 85.9543 |
| 20 | 54.51008 | 0 | 54.51008 |
| 30 | 76.28197 | 0 | 76.28197 |

Selenite and selenate species can be successfully removed from the aqueous phase using respective advanced oxidation processes employing EDTA as a hole scavenger. For the TiO$_2$ assisted photocatalysis, faster selenite, selenate, and EDTA removal was achieved in the acidic pH range with selenite showing faster removal comparatively. Thiocyanate alone could not initiate the reduction of both selenite and selenate possibly because of its insignificant adsorption onto the TiO$_2$ surface. The removal of selenite was promising, with near complete removal at optimum conditions. Among all the parameters studied, initial EDTA concentration had the most significant effect on process efficiency. Therefore, the process can be employed for effective removal of selenite from the aqueous phase. The present work shows that TiO$_2$ mediated photocatalysis in conjunction with EDTA as a hole scavenger is efficient technique for the removal of the selenite and selenate species from aqueous solution; the efficiency of the two process follow the following trend: UV-lamp assisted photocatalysis >solar light assisted photocatalysis.

Bashir Alhaji Labaran, "Removal of Aqueous Phase Selenium Using Artificial and Solar Radiation Advanced Oxidation Processes," Master of Science in Civil Engineering, King Fand University of Petroleum and Minerals, Dhahran, Saudi Arabia, May 2013—incorporated herein by reference in its entirety.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for removing selenium-containing materials from an aqueous solution comprising:
    introducing an unmodified TiO$_2$ photocatalyst to an aqueous solution comprising EDTA as a h$^+$ scavenging agent, and selenium-containing materials to form a mixed solution;
    adjusting the pH of the mixed solution with addition of an acid or base additive;
    transferring the mixed solution to a reactor that produces UV light with a 315-400 nm wavelength range;
    exposing the mixed solution to the UV light to induce photocatalytic reduction and removal of selenium oxyanions from the mixed solution in the form of elemental selenium.

2. The method of claim 1, wherein the EDTA h$^+$ scavenging agent is degraded during the exposing and removal of selenium oxyanions by forming CO$_2$.

3. The method of claim 1, wherein the selenium-containing materials include selenite and selenate.

4. The method of claim 1, wherein the reactor is a UV reactor that only produces UV light with a 315-400 nm wavelength range or a solar photocatalytic degradation reactor.

5. The method of claim 1, wherein the selenium-containing materials are reduced and removed when the pH of the mixed solution is equal to or less than 6.

6. The method of claim 1, wherein the acid additive is HCl.

7. The method of claim 1, wherein the base additive is NaOH.

8. The method of claim 1, wherein the EDTA concentration in the mixed solution is 150-300 ppm.

9. The method of claim 4, wherein the UV reactor utilizes a UV lamp with a power of 15 W.

10. The method of claim 9, wherein the UV lamp produces UV light with a peak maximum of about 352 nm.

11. The method of claim 9, wherein the UV reactor is covered with a metal material to block any light source that is not from the UV lamp during the exposing.

12. The method of claim 11, wherein the metal material is aluminum foil.

13. The method of claim 4, wherein the solar photocatalytic degradation reactor is a re-circulating plug flow type reactor.

14. The method of claim 13, wherein the re-circulating plug flow reactor is made from Pyrex glass.

* * * * *